US012207766B2

(12) United States Patent
Brandt et al.

(10) Patent No.: US 12,207,766 B2
(45) Date of Patent: Jan. 28, 2025

(54) CUTTING APPARATUSES

(71) Applicants: Zachary Kevin Brandt, Copley, OH (US); Paul Andrew McMahon, Transfer, PA (US); Ryan Christopher Maloney, Charlottesville, VA (US)

(72) Inventors: Zachary Kevin Brandt, Copley, OH (US); Paul Andrew McMahon, Transfer, PA (US); Ryan Christopher Maloney, Charlottesville, VA (US)

( * ) Notice: Subject to any disclaimer, the term of this patent is extended or adjusted under 35 U.S.C. 154(b) by 315 days.

(21) Appl. No.: 17/691,048

(22) Filed: Mar. 9, 2022

(65) Prior Publication Data

US 2022/0287511 A1   Sep. 15, 2022

Related U.S. Application Data

(60) Provisional application No. 63/202,185, filed on May 30, 2021, provisional application No. 63/201,099, filed on Apr. 12, 2021, provisional application No. 63/200,479, filed on Mar. 9, 2021.

(51) Int. Cl.
| | |
|---|---|
| *A47J 43/18* | (2006.01) |
| *B25B 7/12* | (2006.01) |
| *B26B 13/26* | (2006.01) |
| *B26B 17/02* | (2006.01) |

(52) U.S. Cl.
CPC .............. *A47J 43/18* (2013.01); *B26B 13/26* (2013.01); *B26B 17/02* (2013.01); *B25B 7/12* (2013.01)

(58) Field of Classification Search
CPC .......... A01G 3/021; B25B 7/12; B26D 3/169; B26D 3/26; B26B 13/22; B26B 13/26; B26B 17/02; B23D 21/10; B23D 21/06; A47J 43/18

USPC ........................................ 30/120, 98, 99, 92
See application file for complete search history.

(56) References Cited

U.S. PATENT DOCUMENTS

| 812,528 | A | | 2/1906 | Rohrer | |
|---|---|---|---|---|---|
| 1,597,859 | A | | 8/1926 | Albert | |
| 2,520,905 | A | * | 9/1950 | Borrelli | B23D 29/023 |
| | | | | | 30/237 |
| 3,243,880 | A | | 4/1966 | Weller | |
| 4,084,317 | A | * | 4/1978 | Nakamura | B26B 13/26 |
| | | | | | 30/94 |
| 4,094,064 | A | * | 6/1978 | Nishikawa | B26B 13/26 |
| | | | | | 30/92 |

(Continued)

FOREIGN PATENT DOCUMENTS

| DE | 29801199 U1 | * | 3/1998 | ............. B23D 29/02 |
|---|---|---|---|---|
| JP | S-59193627 | * | 12/1984 | ............. B23D 29/02 |
| JP | 2820357 B2 | * | 11/1998 | ............. B23D 29/02 |

*Primary Examiner* — Laura M Lee
(74) *Attorney, Agent, or Firm* — Jackson Ellis; Jonathan D'Silva; Penn State Law IP Clinic

(57) ABSTRACT

A cutting apparatus having a ratcheting and non-ratcheting configuration for cutting food. The cutting apparatus includes a pair of handles with a cutting blade having a toothed portion and a non-toothed portion. In the ratcheting configuration, the cutting blade is held in position by a position holder, engaging the toothed portion of the cutting apparatus. In the non-ratcheting configuration, the position holder engages a separate non-toothed portion of the cutting blade. Additionally, in the non-ratcheting configuration, a bottom bar and top mechanism bar allows for the cutting apparatus to be locked into the non-ratcheting configuration.

14 Claims, 38 Drawing Sheets

(56) References Cited

U.S. PATENT DOCUMENTS

| | | | |
|---|---|---|---|
| D252,666 S * | 8/1979 | Sakamoto | D8/52 |
| 4,176,450 A * | 12/1979 | Muromoto | B26D 3/169 |
| | | | 30/92 |
| 4,178,682 A | 12/1979 | Sadauskas | |
| 4,186,484 A * | 2/1980 | Tanaka | B23D 29/023 |
| | | | 30/92 |
| 4,312,127 A * | 1/1982 | Tanaka | B23D 21/10 |
| | | | 30/92 |
| 4,378,636 A * | 4/1983 | Wick | B25B 7/12 |
| | | | 30/92 |
| 4,779,342 A * | 10/1988 | Kobayashi | H01R 43/00 |
| | | | 30/192 |
| 5,218,768 A * | 6/1993 | Putsch | B26B 13/26 |
| | | | 30/253 |
| 5,718,051 A * | 2/1998 | Huang | B23D 21/10 |
| | | | 30/92 |
| 5,761,948 A * | 6/1998 | Malagnoux | B25B 7/12 |
| | | | 72/325 |
| 5,950,314 A * | 9/1999 | Chang | A01G 3/0251 |
| | | | 30/244 |
| 6,098,291 A | 8/2000 | Wang | |
| 6,227,081 B1 * | 5/2001 | Bally | B25B 7/12 |
| | | | 81/91.1 |
| 6,305,087 B1 * | 10/2001 | Huang | B25B 7/12 |
| | | | 30/250 |
| 6,860,016 B2 * | 3/2005 | Holcomb | B26D 3/26 |
| | | | 425/281 |
| 7,073,261 B1 | 7/2006 | Collins | |
| RE39,286 E | 9/2006 | Silver | |
| 7,127,819 B1 | 10/2006 | Huang | |
| 7,204,021 B2 * | 4/2007 | Houseman | B25F 1/006 |
| | | | 7/137 |
| 8,024,864 B2 | 9/2011 | Mortensen | |
| 9,066,473 B2 | 6/2015 | Podlesny | |
| 9,282,697 B2 * | 3/2016 | Wu | B26B 17/00 |
| 9,622,422 B2 | 4/2017 | Hsu | |
| 2005/0282481 A1 * | 12/2005 | Banke | A22C 29/046 |
| | | | 452/6 |
| 2006/0248730 A1 * | 11/2006 | Miller | B28D 1/225 |
| | | | 30/175 |
| 2010/0139100 A1 * | 6/2010 | Mortensen | B26B 17/02 |
| | | | 30/92 |
| 2014/0338133 A1 * | 11/2014 | Gonzalez | F42B 3/26 |
| | | | 7/128 |
| 2020/0016670 A1 * | 1/2020 | Wang | B25B 7/12 |
| 2020/0206879 A1 * | 7/2020 | Buchanan | B25B 7/08 |
| 2022/0219342 A1 * | 7/2022 | Hesse | B26B 13/28 |

* cited by examiner

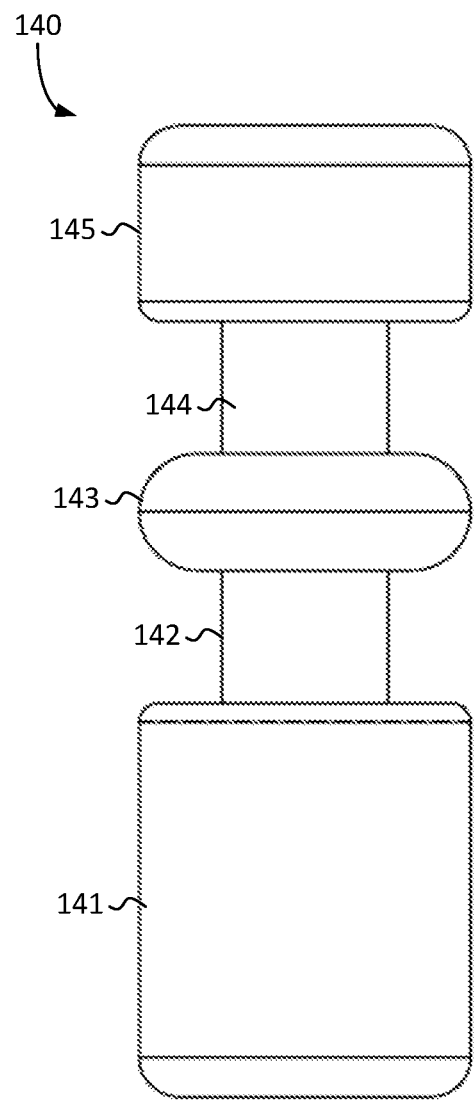 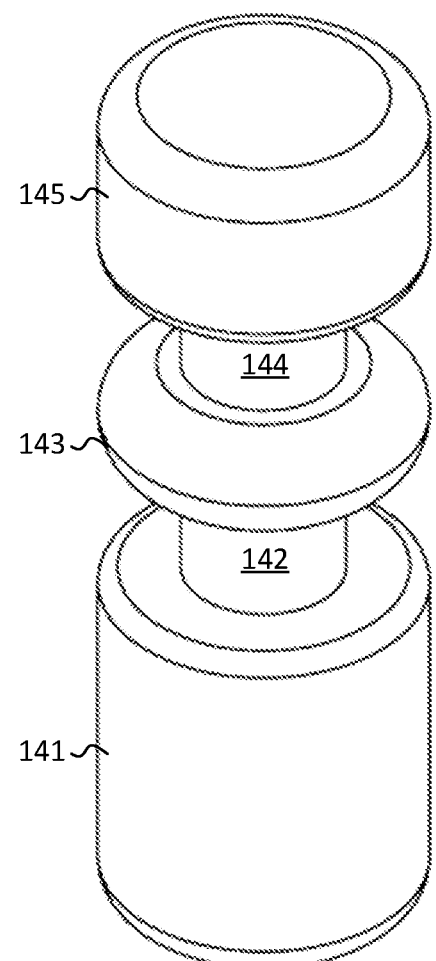
FIG. 3A
FIG. 3B

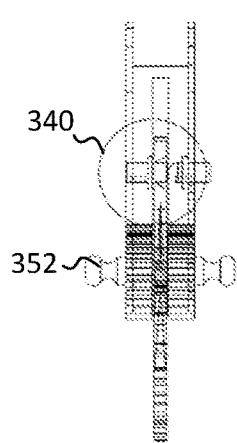 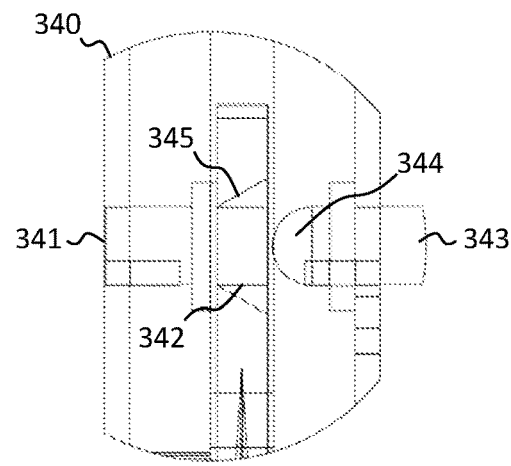
FIG. 12A  FIG. 12B
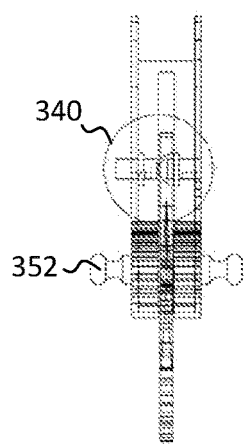 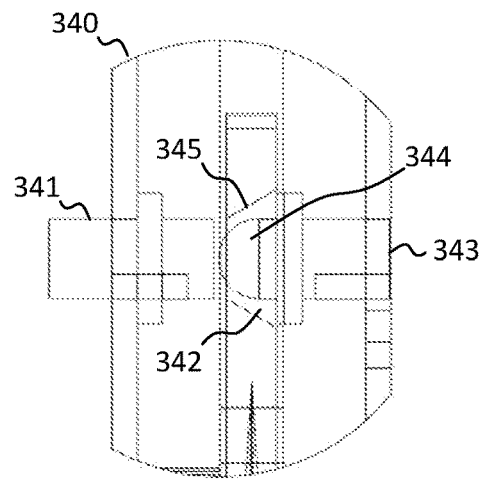
FIG. 12C  FIG. 12D
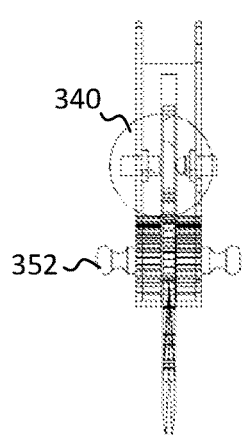 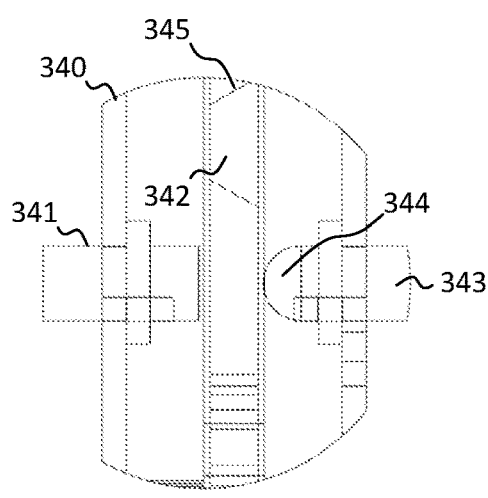
FIG. 12E  FIG. 12F

CUTTING APPARATUSES

This Patent Application claims priority to U.S. Provisional Patent Application Ser. No. 63/202,185, filed May 30, 2021; and to U.S. Provisional Patent Application Ser. No. 63/201,099, filed Apr. 12, 2021; and to U.S. Provisional Patent Application Ser. No. 63/200,479, filed Mar. 9, 2021; the contents of which are hereby incorporated by reference herein in their entirety into this disclosure.

BACKGROUND OF THE SUBJECT DISCLOSURE

Field of the Subject Disclosure

The present subject disclosure relates to cutting and slicing apparatuses. More specifically, the present subject disclosure relates to apparatuses, systems, and methods for cutting objects having hard and/or tough outer layers or shells.

Background of the Subject Disclosure

There are a countless number of devices and tools available in the kitchen and small appliance market that accomplish a wide arrangement of functions. Many food preparation tasks have been simplified and made safer by tools with specialized functions. However, there are still some food preparation tasks that run the risk of harm to the user. For example, there are no existing options available to safely open a hard or tough shelled fruit or vegetable easily with a single device. While many knives may potentially be able to accomplish this task, this operation may prove unsafe, difficult, or perhaps not possible depending on the fruit or vegetable.

SUMMARY OF THE SUBJECT DISCLOSURE

A need exists for an apparatus that allows a user to easily and safely create an insertion point and cut a hard or tough shelled fruit or vegetable with relative ease regardless of strength or technical skill.

The present subject disclosure addresses the shortcomings of conventional cutting tools. This subject disclosure is intended to ease the process of cutting tough shelled fruits and vegetables that would otherwise be cut with knives. The process of cutting with a knife has proven to be unsafe and rather difficult for many users, and this cutting tool intends to ease the process with better usability while also providing greater safety for the user.

The present subject disclosure introduces a food preparation tool that allows the user to create a necessary insertion point and proceed to cut a hard-shelled fruit or vegetable with relative safety and ease. The device can include a scooping mechanism that assists in loosening and removing unnecessary seeds or pulp during food preparation.

In one exemplary embodiment, the present subject disclosure is an apparatus for cutting foods with shells. The apparatus includes a pair of connected handles which are spring loaded to return the handles to a predetermined position with respect to each other when there is no applied force on the handles; a cutting blade pivotally attached to one of the handles; and a contact surface connected to one of the handles that makes contact with a shell of a food and secures the shell in place while the cutting blade pierces the shell upon movement of the cutting blade with respect to the contact surface through use of the handles.

BRIEF DESCRIPTION OF THE DRAWINGS

FIG. 3A shows a side view of a safety lock pin, according to an exemplary embodiment of the present subject disclosure.

FIG. 3B shows a perspective view of a safety lock pin, according to an exemplary embodiment of the present subject disclosure.

FIG. 12A shows an end view of a safety pin mechanism in a locked blade configuration, according to an exemplary embodiment of the present subject disclosure.

FIG. 12B shows a side view of a safety pin mechanism in a locked blade configuration, according to an exemplary embodiment of the present subject disclosure.

FIG. 12C shows an end view of a safety pin mechanism in a transition state configuration, according to an exemplary embodiment of the present subject disclosure.

FIG. 12D shows a side view of a safety pin mechanism in a transition state configuration, according to an exemplary embodiment of the present subject disclosure.

FIG. 12E shows an end view of a safety pin mechanism in an unlocked blade configuration, according to an exemplary embodiment of the present subject disclosure.

FIG. 12F shows a side view of a safety pin mechanism in an unlocked blade configuration, according to an exemplary embodiment of the present subject disclosure.

DETAILED DESCRIPTION OF THE SUBJECT DISCLOSURE

Figure 1A:
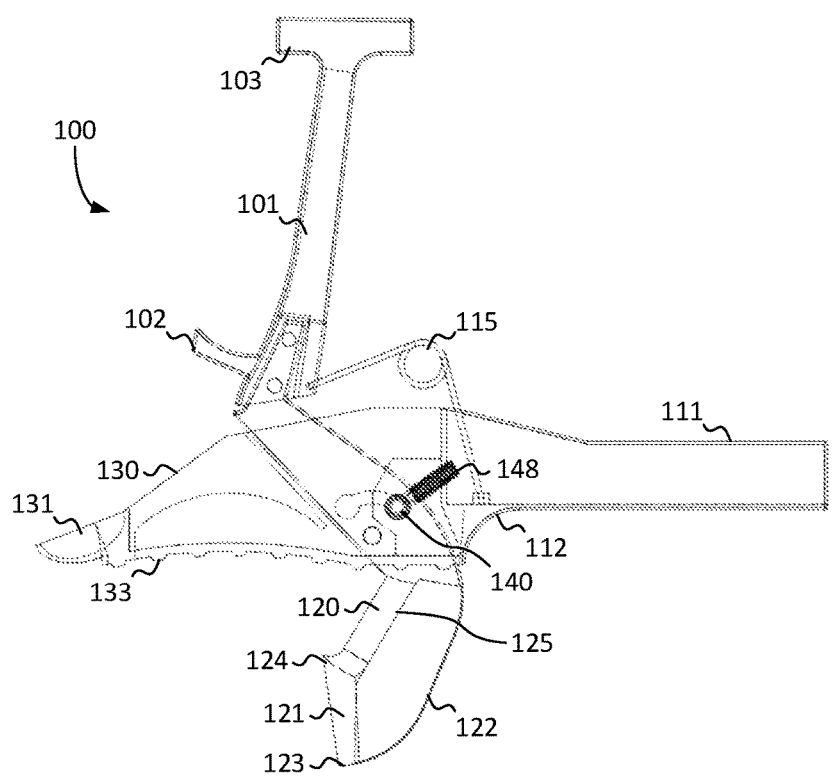
FIG. 1A shows a side view of an apparatus for cutting in an open configuration, according to an exemplary embodiment of the present subject disclosure.
Figure 1B:
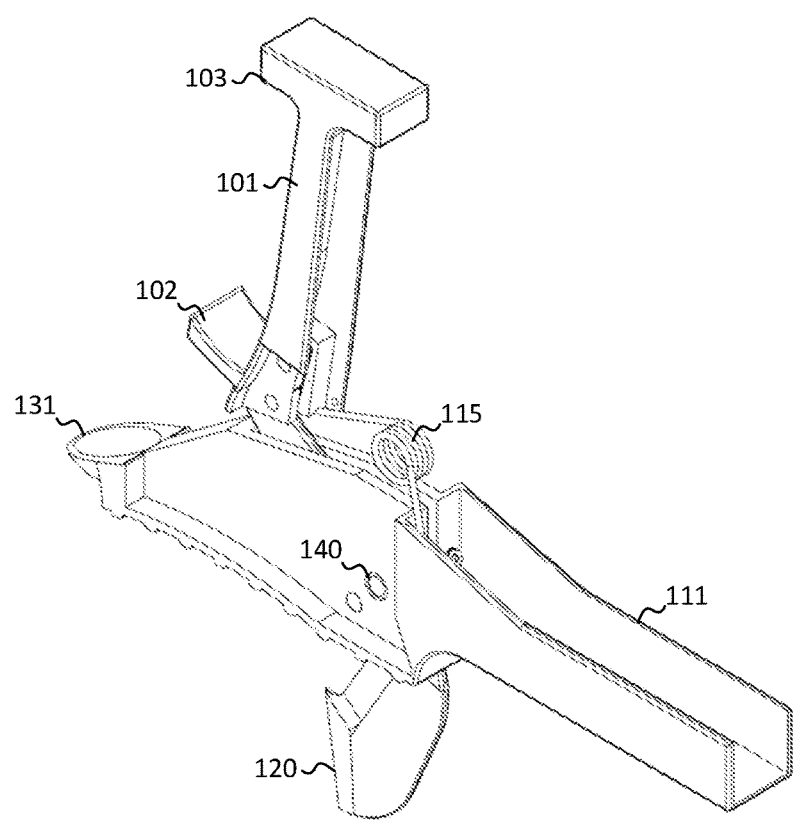
FIG. 1B shows a perspective view of an apparatus for cutting in an open configuration, according to an exemplary embodiment of the present subject disclosure.
Figure 1C:
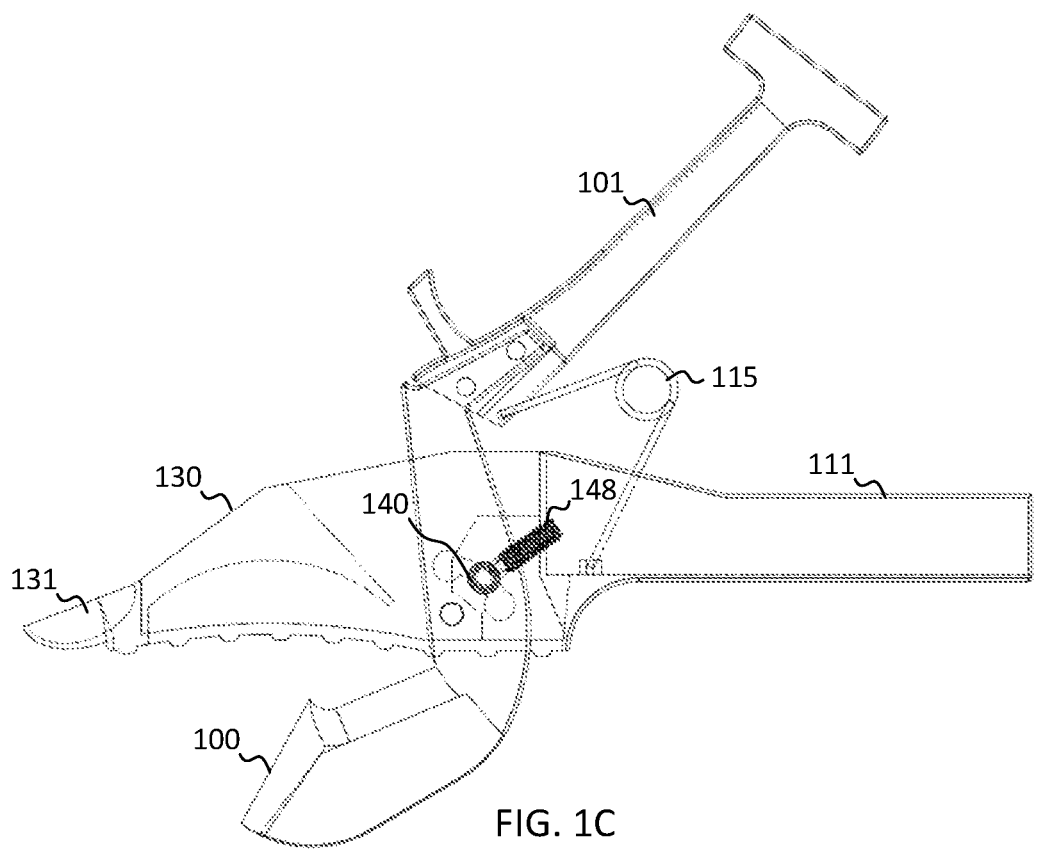
FIG. 1C shows a side view of an apparatus for cutting in a mid open configuration, according to an exemplary embodiment of the present subject disclosure.
Figure 1D:
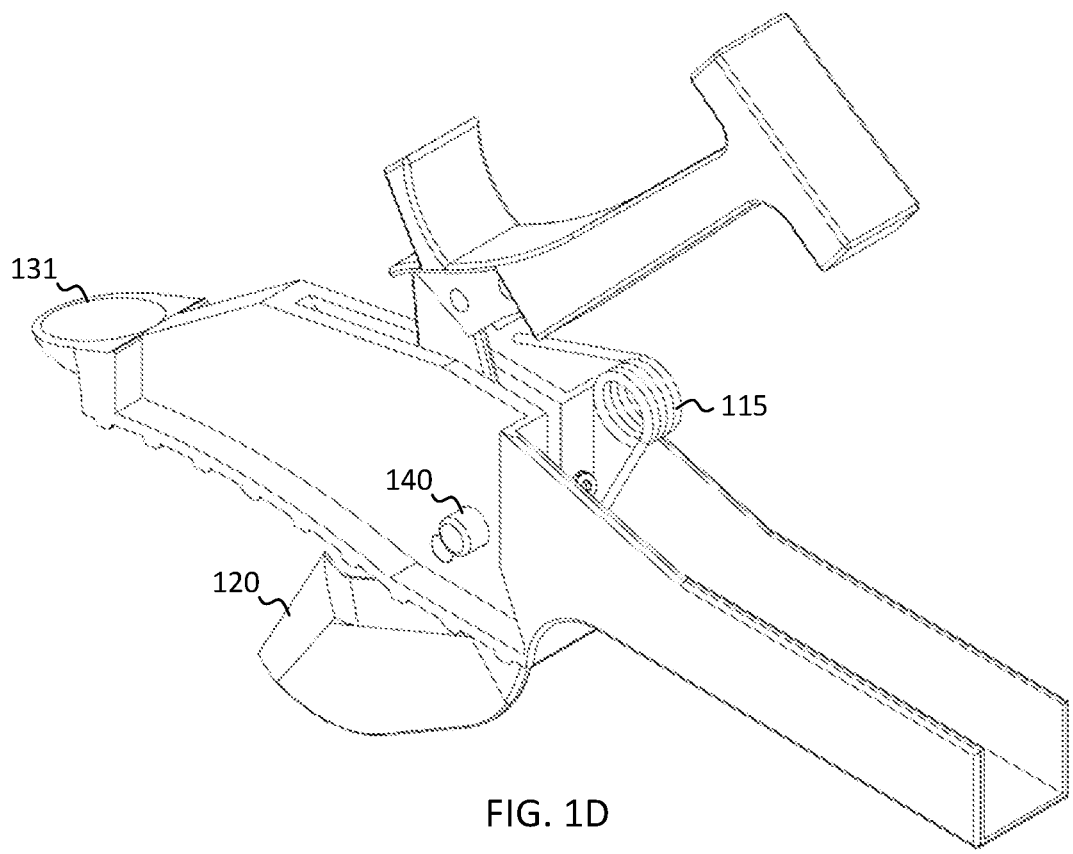
FIG. 1D shows a perspective view of an apparatus for cutting in a mid open configuration, according to an exemplary embodiment of the present subject disclosure.
Figure 1E:
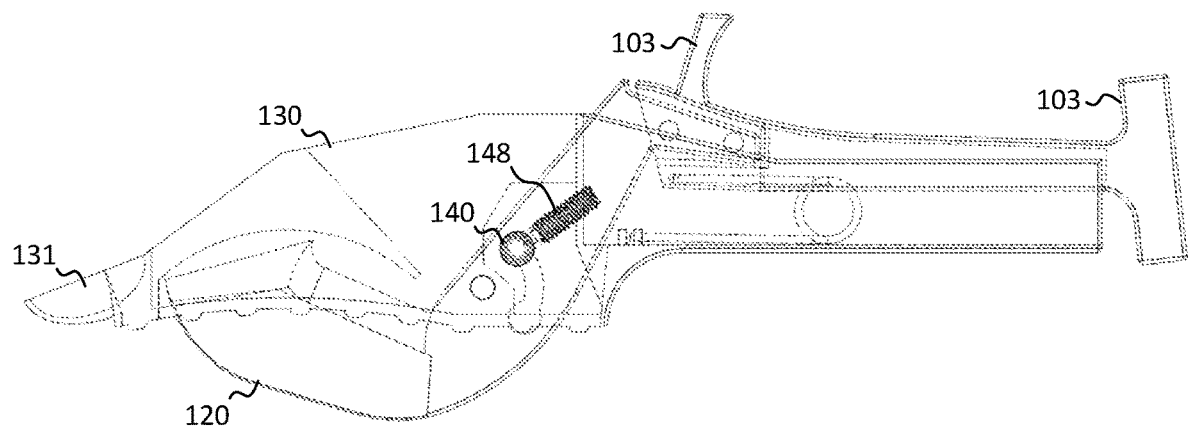
FIG. 1E shows a side view of an apparatus for cutting in a closed configuration, according to an exemplary embodiment of the present subject disclosure.

Vegetables with thick, rigid outer shells, such as the spaghetti squash, are extremely difficult, time-consuming and dangerous to open. Traditionally a spaghetti squash is opened by being pierced with a large kitchen knife, while the knife is worked back and forth, up and down, and simultaneously pressed forward through the shell of the squash. At the same time, the squash itself is not stable on the cutting surface and is inclined to roll in the direction of any applied force, requiring a stabilizing effort from the user's free hand.

The traditional method of opening a spaghetti squash is embraced by enthusiasts as a "right of passing" in a sense, in that the challenge of opening the squash is "part of the experience" of enjoying the popular healthy alternative to pasta.

Unfortunately, the traditional method is extremely cumbersome and dangerous. An open blade is severely exposed the whole time, while extreme efforts are being made by the user grasping the knife, leaving the user vulnerable to slippage and injury.

The present subject disclosure presents various exemplary embodiments of a lever-action cutting tool for piercing and cutting through and around the robust outer shells of large vegetables and fruits. Its design has been optimized for spaghetti squash and can be modified to accommodate other vegetables and/or fruits, up to and including coconuts. Further, the apparatuses and their features described herein and throughout this disclosure are not limited to hard shell fruits or vegetables, but may be applicable to the opening of any fruits or vegetables, or target object that may have a hard surface or shell. Finally, the use of the various embodiments described herein may be for cutting or slicing objects that are not food related, but a need exists to open and cut such objects.

Some of the exemplary embodiments include a ratcheting configuration, which accomplishes the same task, but with a larger number of smaller, higher-torque cutting strokes made possible by a progressive ratcheting mechanism. One full stroke of the cutting blade is completed for several (e.g. every three) full strokes of the handles.

Some of the exemplary embodiments include a ratcheting-to-non-ratcheting (RNR) configuration, which uses ratcheting action to assist in cutting through the tough outer shell, and which then transitions automatically to a non-ratcheting, scissor-like action for faster cutting around the shell after it has been pierced. The RNR configuration also offers the user the ability to secure the fruit against the open blade for stability during initial piercing of the fruit's outer shell using, for example, a tether that wraps around the fruit and attaches back to the cutter.

The apparatuses shown and described in this disclosure are generally available in three configurations: (1) a "simple cutter" that operates like a pair of scissors; (2) a fully ratcheting cutter for increased mechanical advantage; and (3) a ratcheting/non-ratcheting (RNR) cutter, which transitions from ratcheting (for piercing through a tough shell) to non-ratcheting (for scissor-like cutting once the shell has been pierced).

The simple cutter can have three phases of activity. The first phase involves the locked open position that allows the user to lock the device open with a safety mechanism. When this is locked, the device has a blade that is intended to be inserted into the fruit or vegetable. The user's hands are positioned on the grips located on each handle, and downward force is applied to the blade handle, allowing the wedge blade to drive into the fruit or vegetable. The other hand is used to steady the device while holding the lower handle, equipped with a grip and a safety ridge. Once the knife has safely entered the fruit or vegetable, the user is able to disengage the safety while the knife is still in the squash and the tool can transition to the cutting phase.

During the cutting phase, the user would squeeze the handles together to create a cutting stroke. A return torsion spring would allow for the resetting of the open position after each stroke. This would also apply to a ratcheting mechanism included for thicker fruits, such as coconut. Finger holds on both the upper and lower handles allow the user to drive the cutting tool forward while also shielding the hand from slippage. As the tool moves forward, the concave toothed radial surface assists in guiding and gripping the fruit or vegetable. This includes a toothed grip for improved traction. The tool also may utilize an adjustable and detachable strap to secure the fruit or vegetable of varying sizes to increase safety and versatility (shown in some embodiments).

Finally, once the fruit or vegetable is cut, the cutting tool is able to be locked again with the same trigger style safety lock, and the blade is concealed. The tool has a scoop on the front nose that allows for easy scooping or removal of seeds or unwanted interiors of fruits or vegetables. In the event of a hard fruit such as a coconut that needs a hole pierced for access, there is a retractable nail that folds into the rear handle.

Beyond the simple cutter configuration, there are further design configurations for this subject disclosure. These include the ratcheting, the non-ratcheting, and the ratcheting-to-non ratcheting (RNR). It should be noted that the simple cutter can also be incorporated into the category of non-ratcheting.

The embodiments shown and described in FIGS. 1-2 are a non-ratcheting apparatus. FIG. 3 shows and describes a locking mechanism which can be used with any of the various embodiments of this disclosure.

As shown in FIGS. 1A, 1B, 1C, 1D, 1E, 1F, 2A, 2B, and 2C, the non-ratcheting configuration is mainly designed to be used on fruits and vegetables (e.g., spaghetti squash) that, with a little bit of force, a user can press the knife down into the squash, and then cut around it. In the fully open position, there is about a 90 degree angle between the two handles 101,111, so the user can have one hand on the bottom handle 111 and one hand on the top handle 101 to ease the insertion process. There is a T-shaped extension 103 on the top handle 101 to assist in holding the tool 100. The safety 140 may be engaged during this process so that there is less chance of the knife 120 slipping out of position during the plunge into the fruit. The user would push the knife 120 down into the fruit until the toothed 133 surface of the gripper 130 reaches the fruit. The teeth 133 of the gripper 130 of the lower handle 111 assists in gripping the fruit during cutting.

The user can then undo the safety 140, which then allows the tool 100 to be used like a normal pair of scissors, so that the user can cut all the way around the fruit. Unlike a pair of scissors, though, the knife 120 is displaced vertically downwards so it is positioned below the thick shell of the fruit and has the ability to cut up from below it. In some embodiments, and depending on the top of knife 120 used, there can also be a hook 124 on the knife 120 to assist in gripping the fruit. The combined actions of the vertical downward displacement of the knife 120 and the hook 124 will minimize the tool 120 sliding backwards as it is used. The knife 120 also has a cross sectional thick point 125 near the top and then tapers down on both sides similar to the wedge on an ax maul. This will assist in cutting up through and splitting the fruit and will also minimize the friction upon the return of the knife 120 back through. There also exists curved notches/holders 102, 112 on the top 101 and bottom 111 handles, respectively, for the hands to assist in advancing the tool forward.

The torsion spring 115 in between the handles 101, 111 assists to return the knife 120 back through the fruit after cutting up into it. The torsion spring 115 has been designed to attach to the top 101 and bottom 111 handles in such a way to minimize the lateral movement of the spring 115, so that the top handle 101 can be fit into the bottom handle 111 easier (see FIG. 1F). Although the legs on a torsion spring 115 are conventionally attached to the center of the handles, here they are attached to the sides. When attached to the center, the torsion spring 115 has to move laterally to move out of the way of the legs that are being compressed down. When attached to the sides, as they are in these embodiments, the torsion spring 115 doesn't shift laterally; therefore, the size of the handles 101, 111 can be kept small which also allows the top handle 101 to fit into the bottom handle 111. This keeps the overall angle that the handles need to open less for people with smaller hands.

Figure 1F:
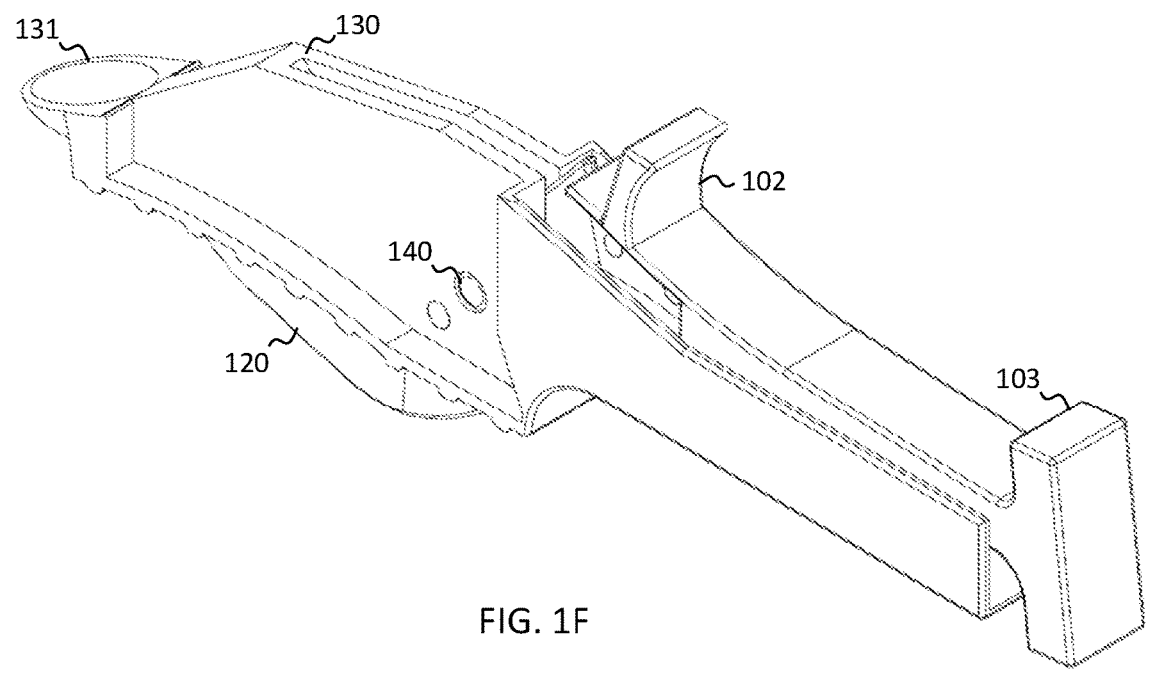
FIG. 1F shows a perspective view of an apparatus for cutting in a closed configuration, according to an exemplary embodiment of the present subject disclosure.

After the fruit is cut completely open, the user can engage the safety 140 again to lock the tool 100 in the closed position (see FIG. 1F). This would allow use of the scoop mechanism 131 on the front of the tool 100 to scoop out the seeds or to store the tool.

Figure 2A:
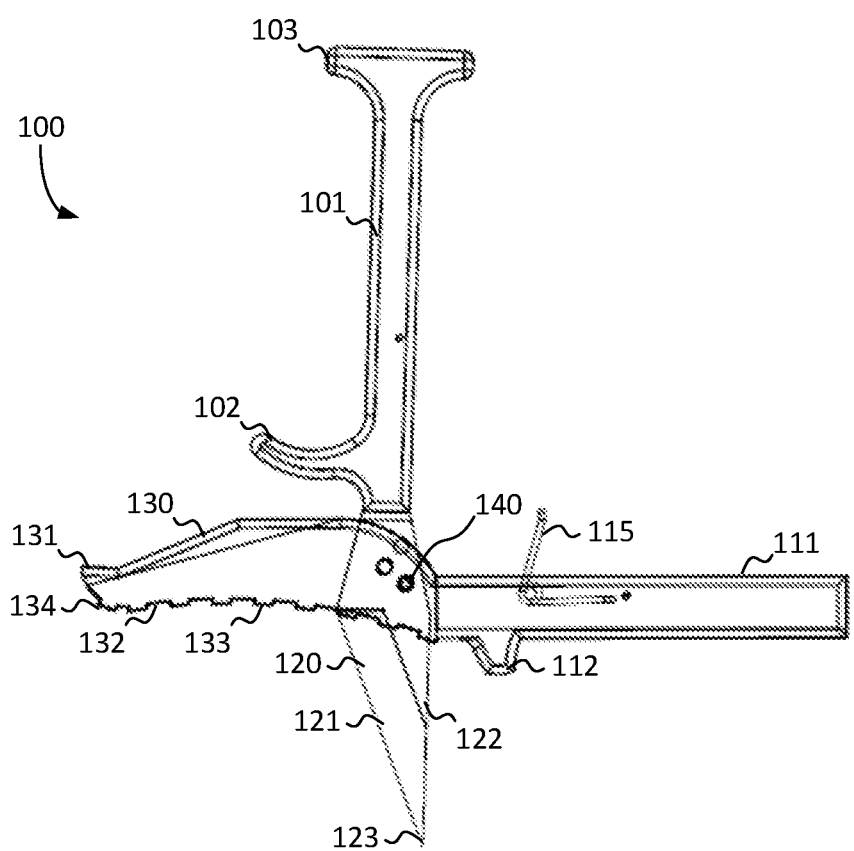
FIG. 2A shows a side view of an apparatus for cutting in an open configuration, according to an exemplary embodiment of the present subject disclosure.

FIG. 2A is a side view of an exemplary embodiment of the subject disclosure in a fully opened position. This view shows an open position of a knife 120 with a flat back 122 and tapered edge 121 to allow for ease in insertion into the hard-shelled fruit such as squash and allows for maximum clearance of fruit during cutting. The exemplary cutting device 100 is positioned in this manner when creating the initial insertion slice into the fruit or vegetable. At the top of the device 100 in this position is the handle or grip 101, intended for the user's hand to apply force while making the insertion into the object. It may also feature enclosed finger holds 102 to improve ease of use and to avoid hand slippage. A trigger style safety lock 140 has been included which locks in an open configuration prior to insertion and locks in a closed configuration for storage. At this stage the bottom handle 111 is intended for the user's other hand to help to create stability while the initial insertion is performed. This handle 111 may also include molded or rubber finger grips 112.

The blade 120 to perform the insertion into the fruit or vegetable is a straight edge or wedge blade, with one sharpened side 121 and no variation in shape to ensure easier insertion. A sharpened tip 123 is positioned on the distal end of the blade 120. The back side 122 of the blade 120 is straight, which reduces friction during the process of the initial insertion. After the device 100 makes its transition to the cutting phase, the straight back blade 120 also helps to prevent any potential lost progress in the forward advancement process when the cutting stroke recycles.

Figure 2B:
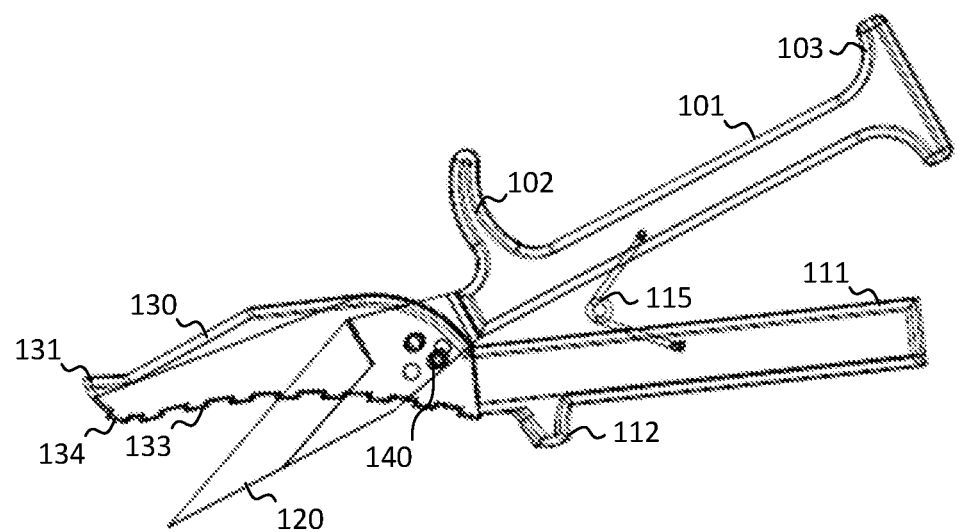
FIG. 2B shows a side view of an apparatus for cutting in an open configuration, according to an exemplary embodiment of the present subject disclosure.

FIG. 2B is a side view of the cutting device 100 in a mid position of the flat back knife 120 with tapered edge in a cutting position. The device 100 is positioned to engage the fruit or vegetable and advance forward to cut the thick outer shell when the handles 101, 111 are squeezed together. The user applies a forward force at the upper handle finger guard 102 with the upper part of the hand between the thumb and index finger during the cutting process to assist in driving the device 100 forward. This upper handle finger guard 102 doubles as a guard or shield for the hand to help to avoid hand slippage during the process. Once the cutting process is complete, the upper T pull 103 aids the user in pulling the device 100 from the fruit or vegetable. The return torsion spring 115 is utilized to automatically reset the open cutting position after the cutting stroke. A finger guard 112 positioned on the outer side of the lower handle 111 acts as a holder/barrier/guard for the index finger and allows a surface for the index finger to press forward against to assist in driving the device 100 forward. The lower handle 111 has a proximal nose section with a gripper 130, having a fruit contact surface 132 with a concave curve which aids in mimicking the size of the fruit or vegetable being cut to promote better traction between the surface 132 and the surface of the target object to be cut. Teeth 133 on the surface 132 further aid in gripping the fruit or vegetable. The tip 134 of the nose of the gripper 130 on the lower handle 111 has a toothed edge to account for any rotating or prying of the tool as it progresses through the cutting process.

Figure 2C:
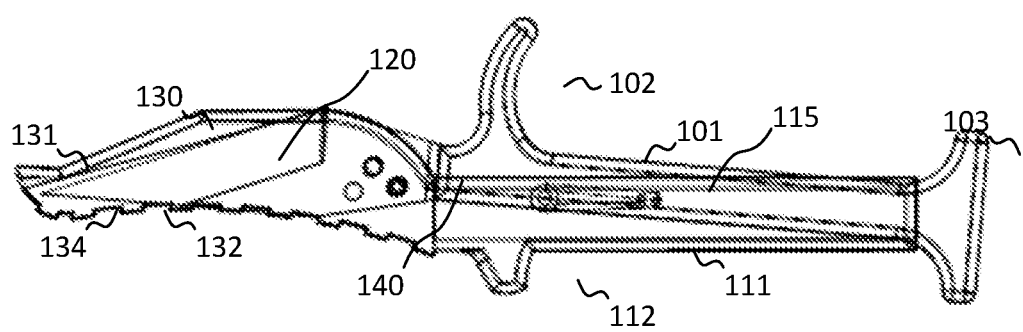
FIG. 2C shows a side view of an apparatus for cutting in a mid open configuration, according to an exemplary embodiment of the present subject disclosure.

FIG. 2C shows a side view of the cutting device 100 in the locked or closed position with the safety 140 engaged. This keeps the tool 100 closed for storage or to utilize scooping feature 131 on front of the non-blade lower handle 111. The scooping feature 131 is shaped like a spoon or scoop, and can vary in size. The scooping feature 131 can be used to scoop out squash or fruit to ready for cooking or consumption.

Figure 3C:
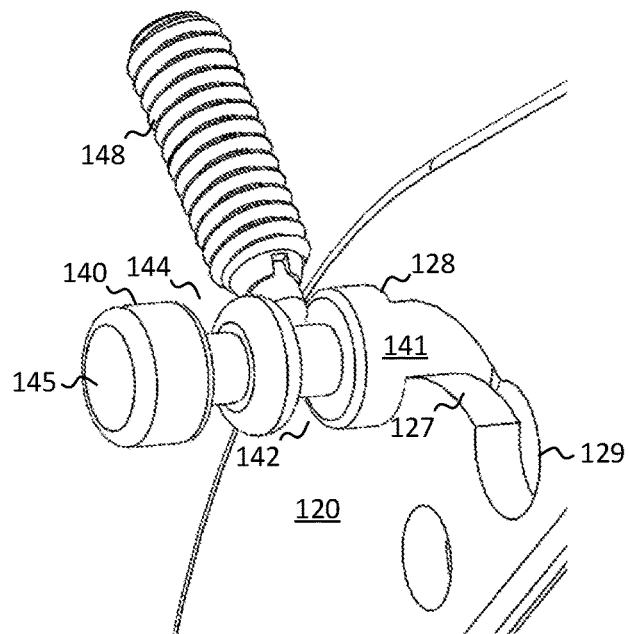
FIG. 3C shows a perspective view of a safety lock pin in an open configuration, according to an exemplary embodiment of the present subject disclosure.
Figure 3D:
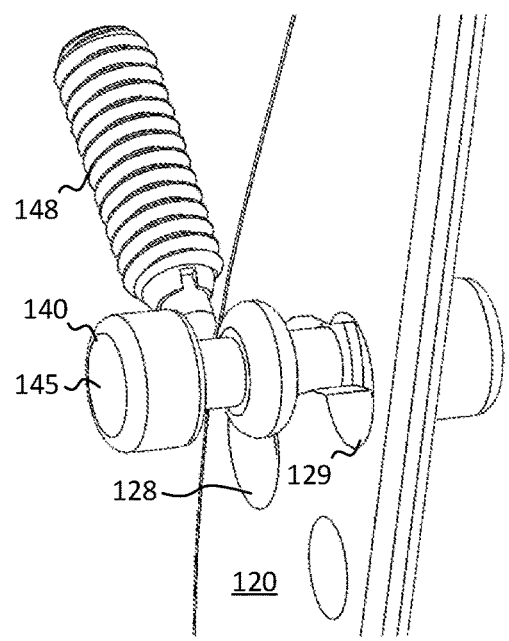
FIG. 3D shows a perspective view of a safety lock pin in a mid open configuration, according to an exemplary embodiment of the present subject disclosure.
Figure 3E:
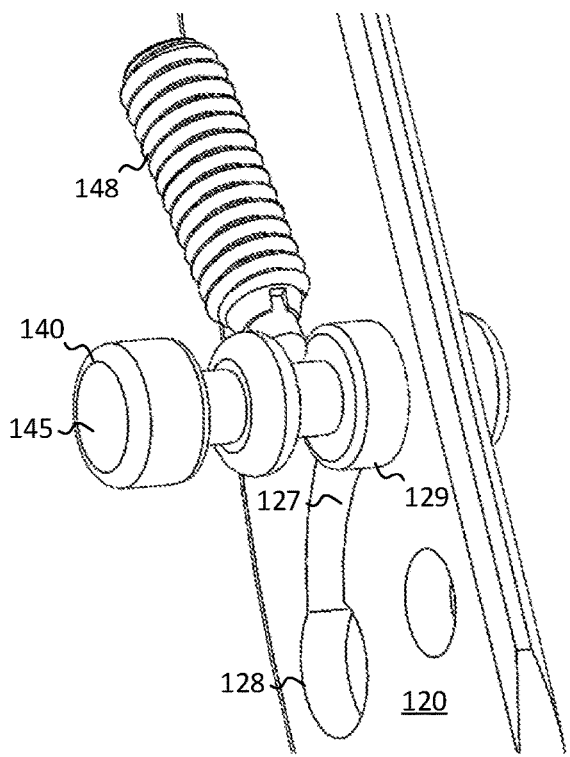
FIG. 3E shows a perspective view of a safety lock pin in a closed configuration, according to an exemplary embodiment of the present subject disclosure.

FIGS. 3A-3B show a through safety lock pin 140 of the safety mechanism, and FIGS. 3C, 3D, and 3E show locked open, cutting, and locked closed positions, respectively, of the safety mechanism with respect to the knife 120. The safety mechanism includes a through pin 140 that goes all the way through the knife 120, and a spring plunger 148 that is embedded in the bottom handle 111 and keeps the pin 140 in certain desired positions. The safety pin 140 has a collar 143 in it whose function is to depress the spring plunger 148. There are two slots 142, 144 on the bolt 140, one on each side of a collar 143. When the safety 140 is engaged, for example during an open knife position (FIG. 3C), the larger diameter 141 of the through bolt 140 is nested inside of the larger diameter hole 128 in the knife 120, the spring plunger 148 is sitting inside a slot 142, and the other slot 144 is empty. This is the locked open position. When the safety 140 is not engaged during the cutting position (FIG. 3D), the spring plunger 148 sits in the second slot 144, and the first slot 142 is filled by the through slot 127 of the knife 120. The spring plunger 148 holds the pin 140 in place and the collar 143 pushes up on the spring plunger 148 to allow the pin 140 to be in one of two different positions (i.e., the spring plunger in either slot 142 or 144). When the safety 140 is again engaged, for example during the closed knife position (FIG. 3E), the larger diameter 141 of the through pin 140 is nested inside of the larger diameter hole 129 in the knife 120, the spring plunger 148 is sitting inside a slot 142, and the other slot 144 is empty. This the locked closed position.

The engaging and disengaging of the safety pin mechanism 140 is usually conducted by pressing opposite ends of the pin 140, such as pressing the end 145 of the through pin 140 to disengage, which is accessible from outside of the cutter 100. The pin 140 may be reversed in position as long as the function and interaction with the knife 120 is maintained, so that the pin 140 is engaged from the left side (pressing 145) and disengaged from the right side (pressing 141), and vice versa. This ability allows the user to remove and re-install the safety pin in the position that is most suitable for the specific user.

Ratcheting Mechanism

Figure 4A:
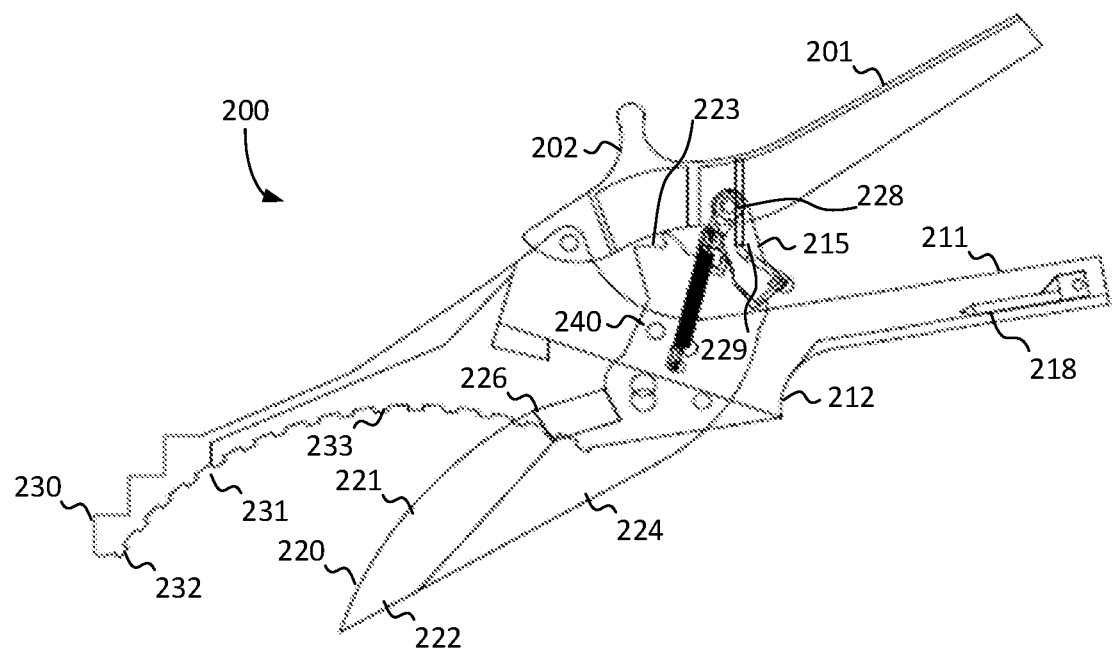
FIG. 4A shows a side view of a ratchet cutter in an open configuration, according to an exemplary embodiment of the present subject disclosure.

FIG. 4A shows a side view of a cutting apparatus 200 having a ratcheting configuration in an open position and prepared to cut into a target fruit or vegetable. The upper handle 201 and lower handle 211 are substantially the same as the prior described embodiments. A hook-shaped top portion of the nose 230 is used to more effectively grab around an end of a fruit or vegetable during both the insertion and cutting process. A concave curve 231 helps to better mate with the natural curve of a fruit or vegetable, and thereby better grip it during cutting. To further assist in gripping the subject, teeth 233 are positioned along the interior curved surface 231 to assist in grabbing the subject as the blade 220 moves during the cutting process. Teeth 233 may be of any size or shape depending on the intended subject fruit or vegetable. The curved blade 220 assists with cutting by sliding while advancing through its stroke, while the sharpened back side 222 of the blade 220 only extends the approximate depth of the shell. The curved portion 221 of the blade transitions to a point 226 which functions to both pierce the internal cutting surface of the subject and to anchor the blade as it begins its cutting stroke. The limited blade exposure on the back side 224 is intended for ease of removal from shell during removal process.

A holder 202 engages the top hand to assist in driving the cut forward. There are larger gaps in the teeth 223 of the knife 220 to allow for further advancement with each stroke. Gaps between teeth 223 in a ratchet mechanism are optimized to cut the fruit or vegetable with the greatest efficiency. As shown, the load of the ratcheting mechanism 228 is positioned further up the handle 201 than conventional cutting devices to create a larger arc length and to match the increased gap size on the teeth 223 of the knife 220. Load is pushed on the ratchet teeth 223 of the knife 220 when the handle 201 is squeezed with a torsion spring 215, keeping tension on it. The position holder 229 of the ratchet mechanism moves independently of the load and holds the previous position (tooth) of the knife 220 while the load pushes on the next tooth of the ratchet. A curved notch 212 allows the index finger to assist in driving the cutter 200 forward during cutting.

Figure 4B:
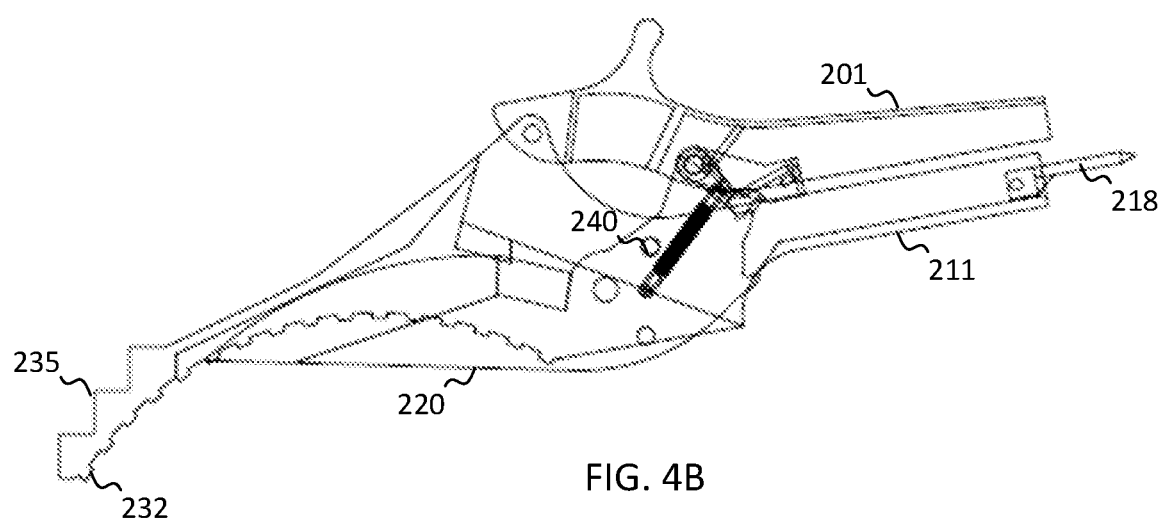
FIG. 4B shows a side view of a ratchet cutter in a closed configuration, according to an exemplary embodiment of the present subject disclosure.

FIG. 4B shows the ratchet cutter 200 in a closed and locked position. The safety 240 is engaged and locked during the usage of the scoop 232 to remove seeds from the fruit or vegetable. There may also be a latch (shown in later embodiments), located on the back of the handles 201, 211 that keeps the cutter 200 in the closed position. The safety 240 is also engaged when using the nail 218 to puncture harder fruit, such as a coconut, or other fruit that requires draining before cutting. At the nose, there are multiple flat ridges 235 that aid in the digging, scooping and removal of unnecessary seeds and portions of fruit or vegetables for food preparation. Finally, for subjects such as coconuts, the ratcheting mechanism would be used to cut most of the coconut. A pointed projection 218, such as a nail, would fold or recess into the lower handle 211 during the cutting of the fruit and inactivity, and would be used to make the final puncture into the coconut.

Ratcheting-to-Non-Ratcheting (RNR) Mechanism

As shown in FIGS. 5A, 5B, 5C, 5D, 5E, and 5F, the ratcheting to non-ratcheting (RNR) configuration is designed with the ability to easily enter and cut through hard shelled fruit and vegetables, such as a coconut. Before the coconut is cut open, a user might want to drain the juice inside. A nail 318 is rotationally positioned inside of the lower handle 311 that can be pivoted out for use and tucked in for safe storage. The nail 318 can then be plunged into one of the eyes (preferably, two of them, one of them to be used as an air hole) of the coconut to drain the juice. In this closed position, the knife 320 and handles 301, 311 are held shut by a loop wire 339 that extends from the front fruit gripping nose portion 330 of the top handle 301 around into a corresponding slot 329 in the back side of the knife 320. This method of keeping the knife 320 and handles 301, 311 closed works only with this ratcheting cutter design. On other ratcheting cutter embodiments, the handle 301 and knife 320 are not fixed together, and fixing the knife 320 in place would not fix the top handle 301 in place. But because this design transitions to non-ratcheting, the top handle 301 is fixed to the knife 320 during that function through the elbow locking mechanism top bar 378 and bottom bar 379. So the knife 320 can be held in place and that will keep the top handle 301 in place. Most conventional ratchet cutters have a loop mechanism in the back that just hold the handles together. Such a configuration does not work with the present designs because the nail 318 is in the back distal portion of the handle 311, and there would be less chance of injury to a user if the loop wire 339 is in the front proximal portion of the handle 301.

There is also a bumper 309 to bumper accommodating space 319 on the distal ends of the handles 301, 311 that act somewhat like a spring to provide a firm closure when the knife 320 is locked by the loop mechanism 339/329. This will ensure that the handles 301, 311 do not rattle at all when using the nail 318 to plunge into the eyes of the coconut, and will ensure that there remains tension in the locking loop mechanism 339/329.

Figure 5A:
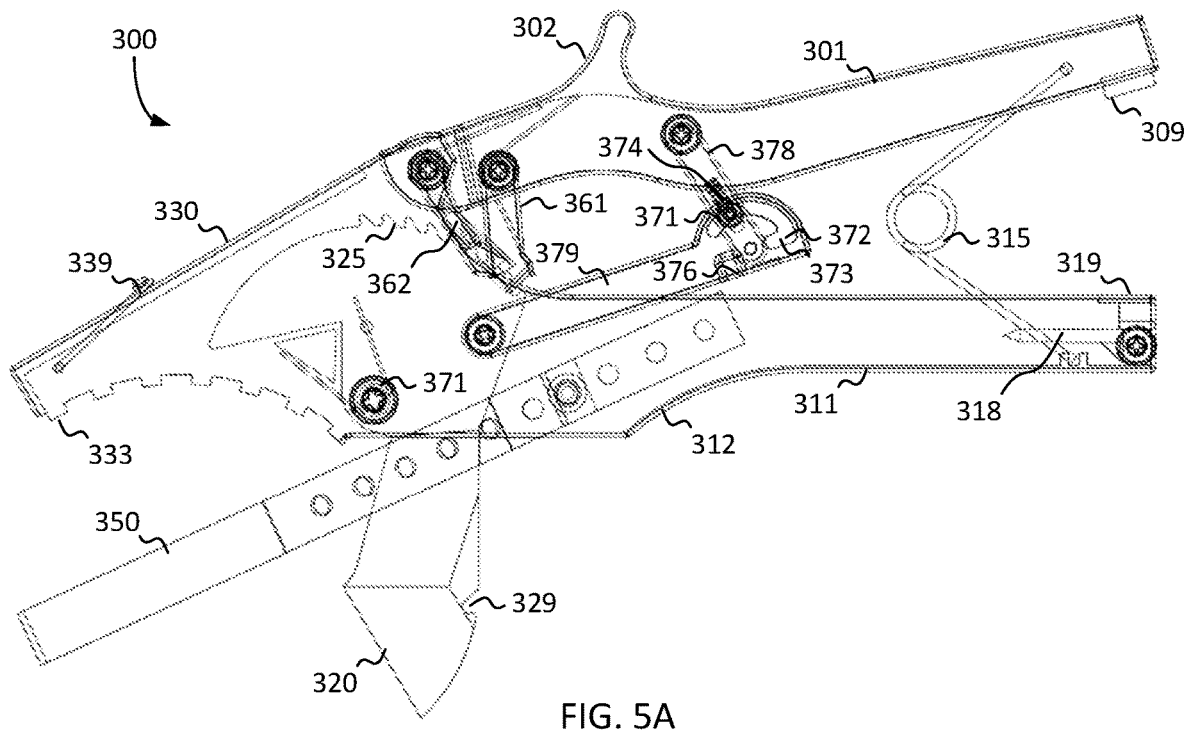
FIG. 5A shows a side view of a multi-function cutter in an open configuration, according to an exemplary embodiment of the present subject disclosure.
Figure 5B:
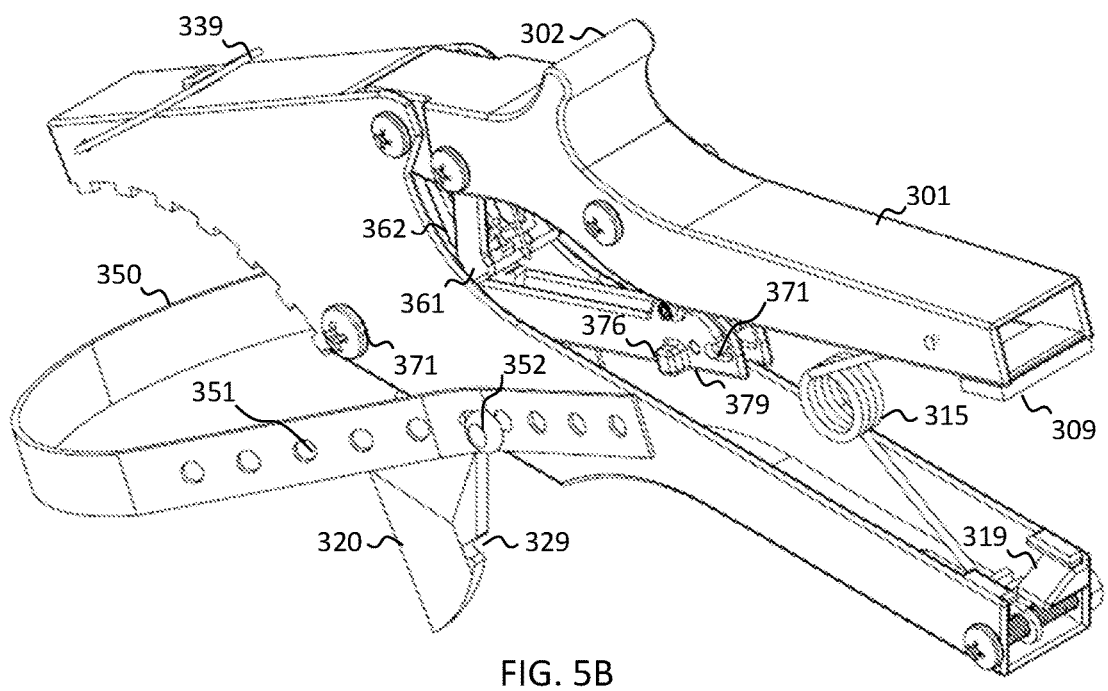
FIG. 5B shows a perspective view of a multi-function cutter in an open configuration, according to an exemplary embodiment of the present subject disclosure.
Figure 5C:
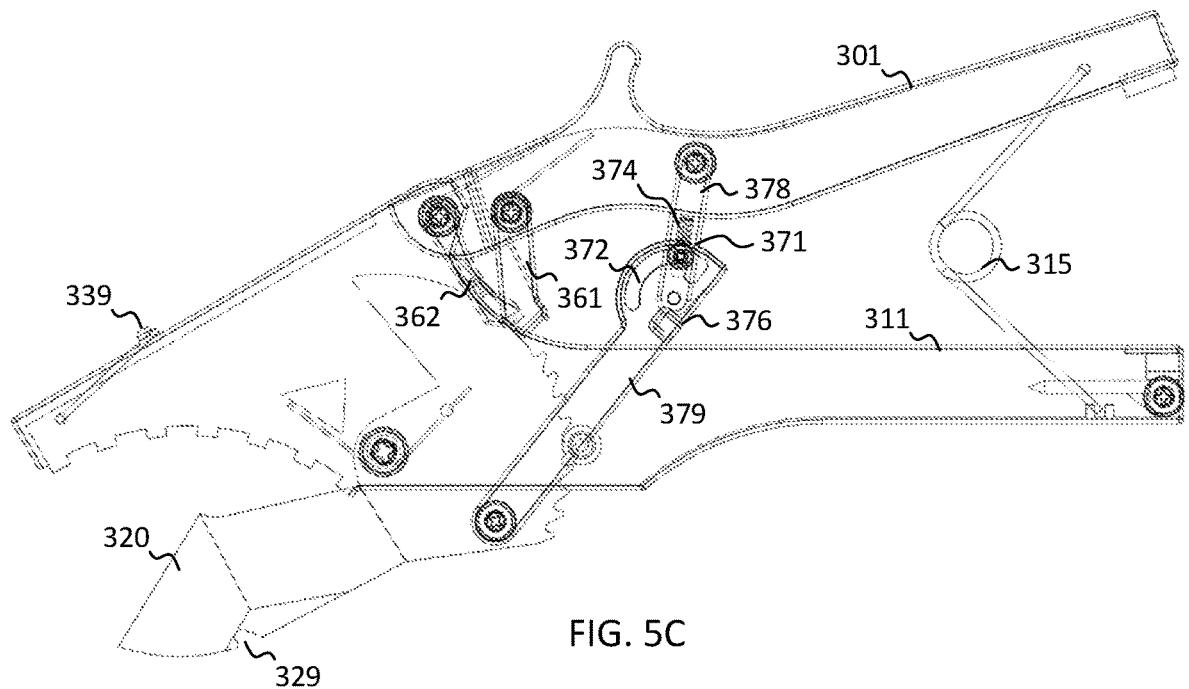
FIG. 5C shows a side view of a multi-function cutter in a mid open configuration, according to an exemplary embodiment of the present subject disclosure.
Figure 5D:
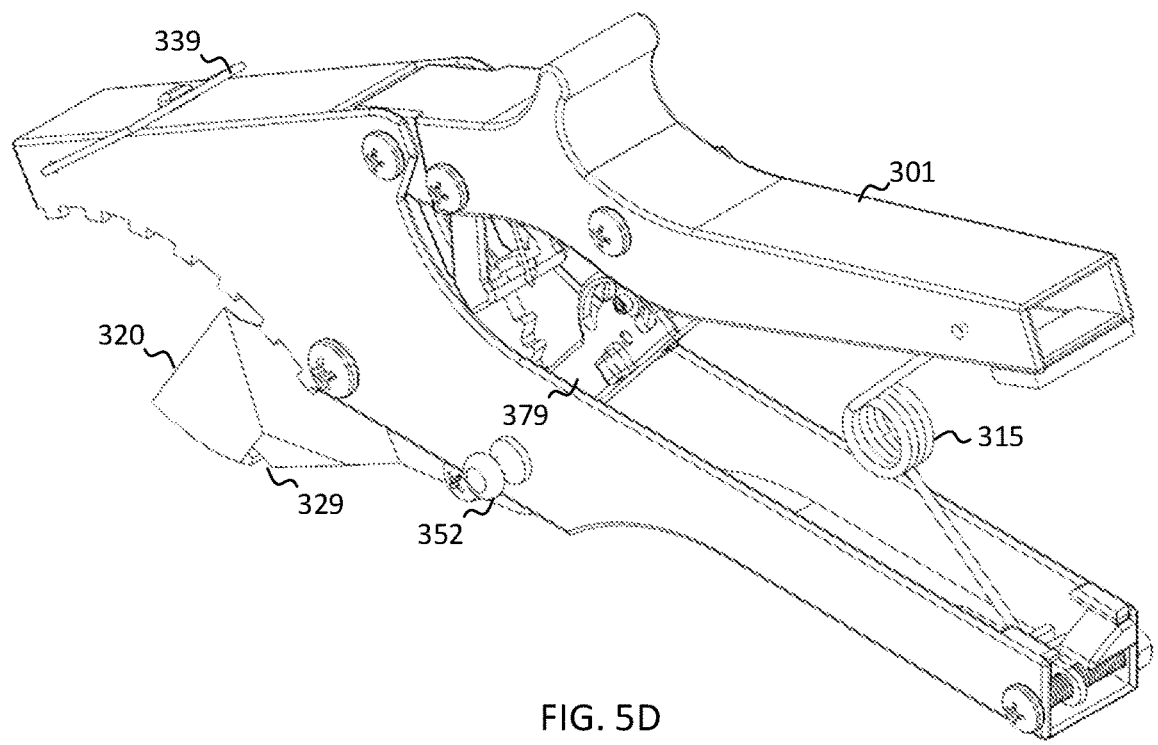
FIG. 5D shows a perspective view of a multi-function cutter in a mid open configuration, according to an exemplary embodiment of the present subject disclosure.
Figure 5E:
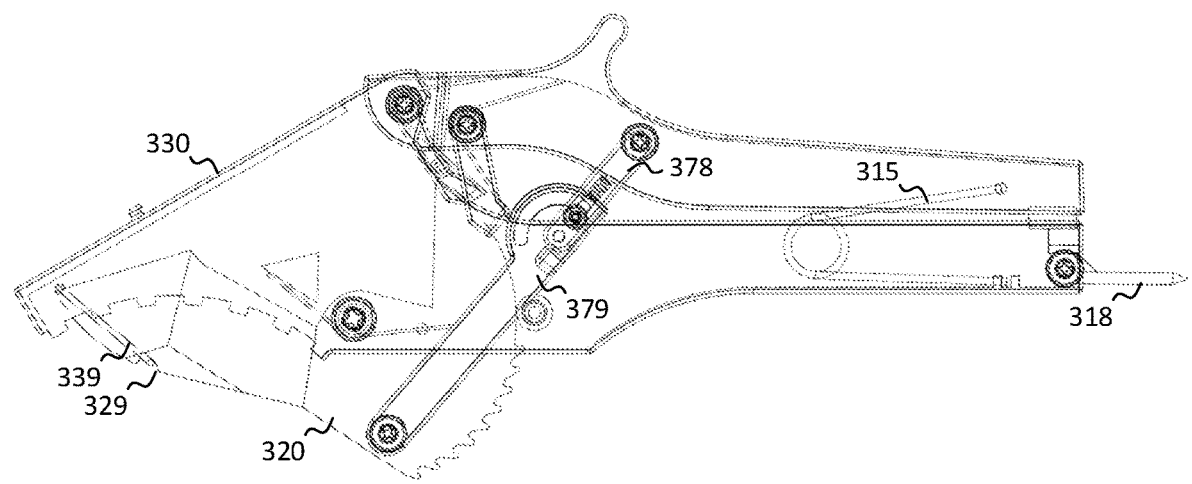
FIG. 5E shows a side view of a multi-function cutter in a closed configuration, according to an exemplary embodiment of the present subject disclosure.
Figure 5F:
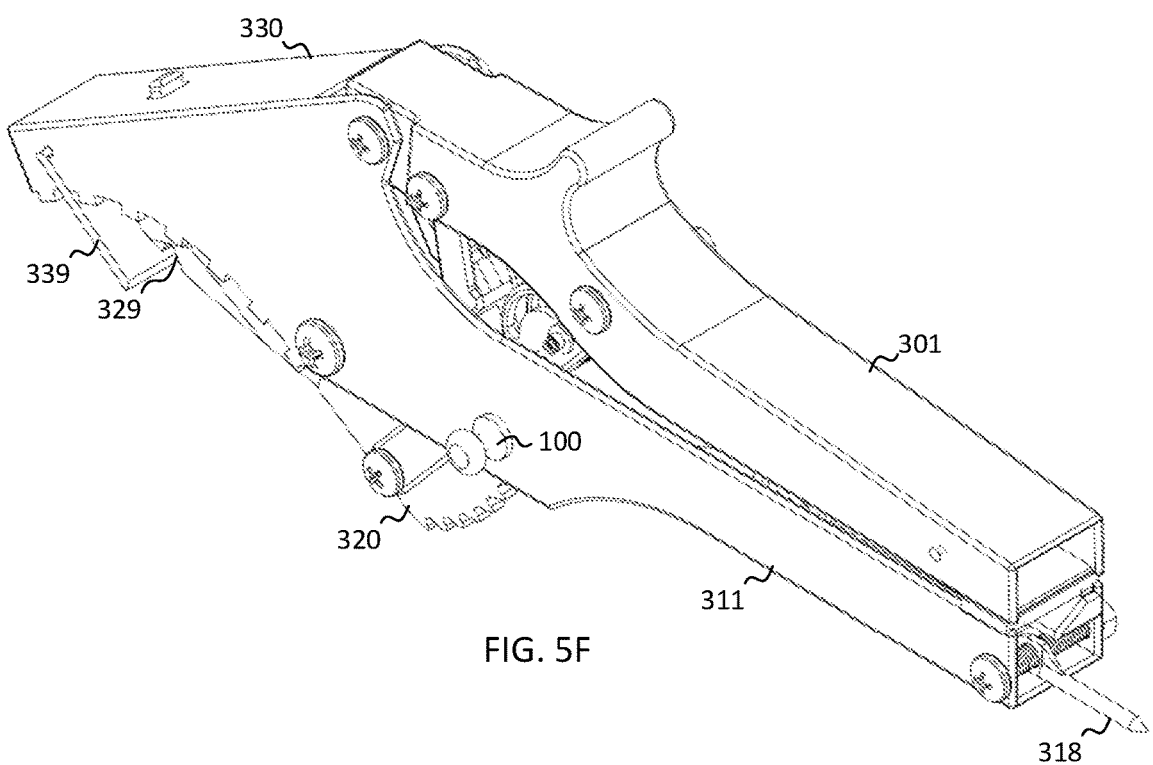
FIG. 5F shows a perspective view of a multi-function cutter in a closed configuration, according to an exemplary embodiment of the present subject disclosure.
Figure 6A:
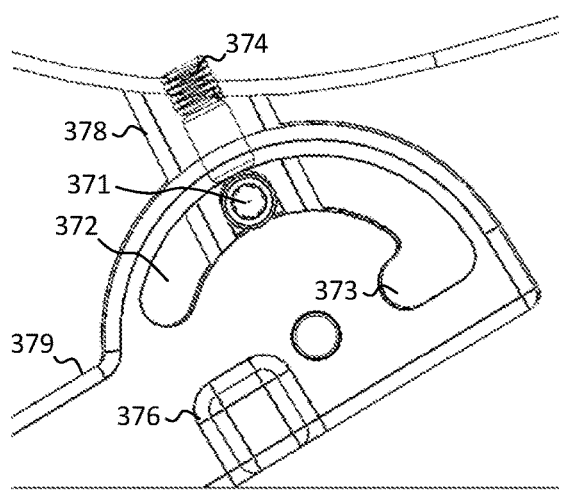
FIG. 6A shows a side view of a pivot mechanism in a ratcheting configuration, according to an exemplary embodiment of the present subject disclosure.
Figure 6B:
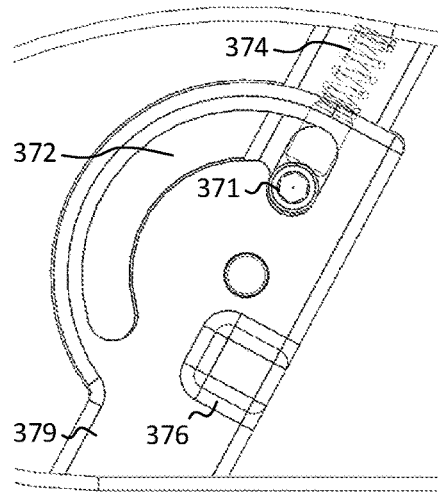
FIG. 6B shows a side view of a pivot mechanism in a non-ratcheting configuration, according to an exemplary embodiment of the present subject disclosure.
Figure 6C:
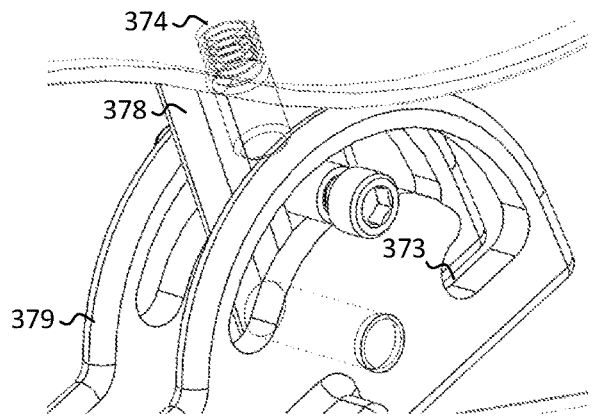
FIG. 6C shows a perspective view of a pivot mechanism in a ratcheting configuration, according to an exemplary embodiment of the present subject disclosure.
Figure 6D:
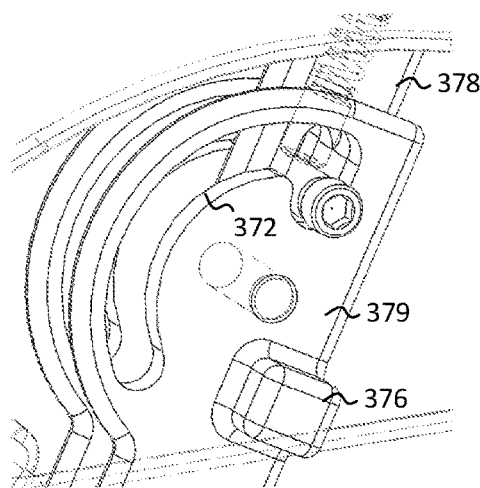
FIG. 6D shows a perspective view of a pivot mechanism in a non-ratcheting configuration, according to an exemplary embodiment of the present subject disclosure.

In the open position, as shown in FIGS. 5A-5B, the knife 320 can pivot to a full 90 degrees or could be designed to open even further to accommodate larger fruit. A horizontal strap 350 can be used to fully secure the fruit during the initial entry by the ratcheting function of the knife 320. During the ratcheting function, the load 361 and position holder 362 function like a conventional ratcheting cutter and act as a second class lever. A second class lever reduces the effort force a user needs to apply by increasing the effort distance. Typically, the load 361 is placed as close to the fulcrum as possible in conventional cutters to minimize the effort force as much as possible. When the load is close to the fulcrum though, the arc length of the load is minimized; therefore, the teeth on the knife have to be very close together because the load is not traveling very far. The target subject of conventional ratchet cutters, such as for PVC pipes, is harder than coconut, to cut through though. One of the hardest fruits that exists is the coconut. If the coconut is easier to cut than PVC, the spacing between the teeth could be increased by positioning the load further up the handle. This would result in less "clicks" or squeezes a user would have to do to break into the coconut. During the ratcheting function, the pivot mechanism is doing no work. A horizontal pin 371 rides in an arc shaped slot 372 as the handle 301 is squeezed up and down, but does no work on anything. The function of the pivot mechanism will come later during the non-ratcheting function. The only mechanism doing work during the ratcheting function is the load 361.

As the load 361 pushes on a tooth 325, the knife 320 is rotated clockwise (with respect to the depiction in FIG. 5A) and moves further away with each click. The position holder 362, which is located at the fulcrum, always sits one tooth behind the load 361 to hold the position while the load pushes on the tooth 325 in front of it to advance the knife 320 forward. The knife 320 has been designed with only a certain number of teeth 325 on it. The last tooth 325 has been designed to be the exact distance that the knife 320 needs to rotate to so the tool 300 can make the transition to non-ratcheting. When the position holder 362 reaches the last tooth 325 and as the top handle 301 is brought back up from being just squeezed, the horizontal pin 371 that was riding in the arc length 372 will now slide down into a linear slot 373. See FIGS. 6A, 6B, 6C, 6D. The pin 371 was assisted into this slot 373 by a spring and dowel pin 374 that exists in the top bar 378 above it. Once the pin 371 is in this linear slot 373, the tool 300 has now automatically transitioned into a non-ratcheting design that can be used much like a pair of scissors that can cut, open, then cut and open easily many times. This will allow the user to fully cut around the shell of the fruit after it has been broken open during the ratcheting function.

Figure 7A:
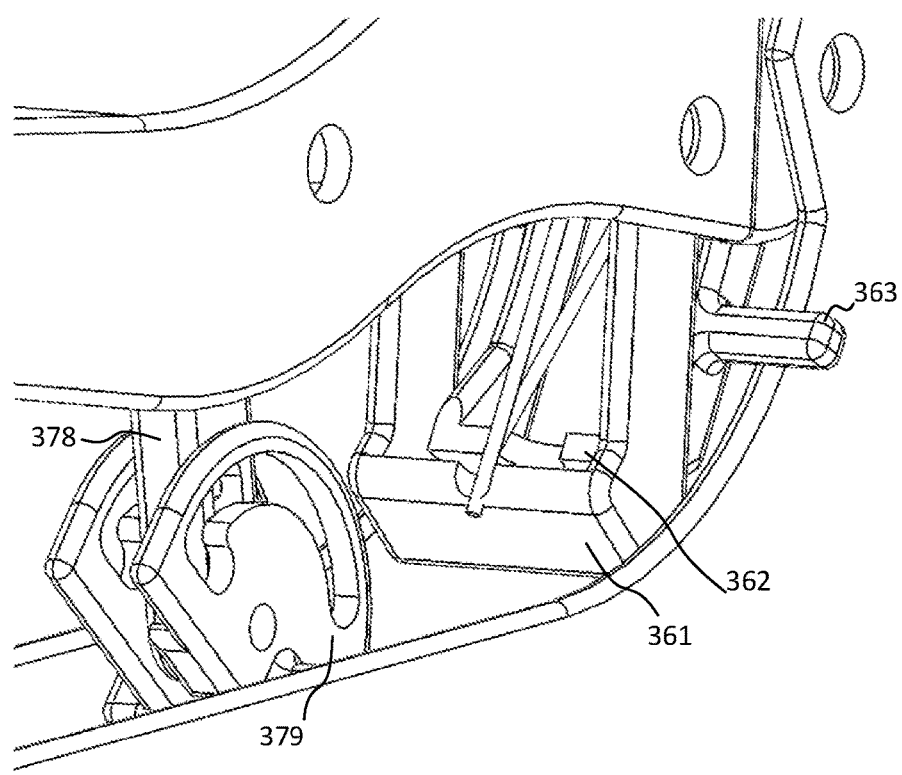
FIG. 7A shows a perspective view of a position holder in a ratchet mechanism, according to an exemplary embodiment of the present subject disclosure.
Figure 7B:
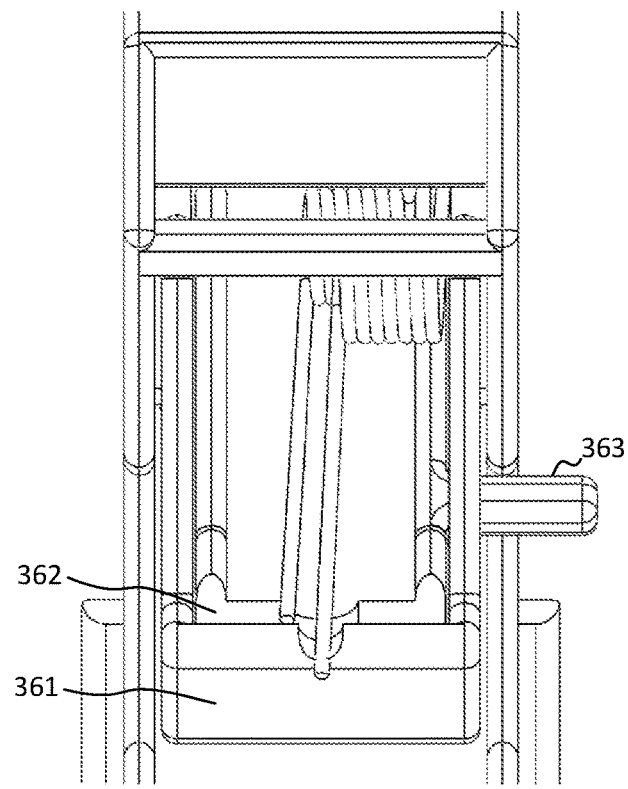
FIG. 7B shows a top view of a position holder in a ratchet mechanism, according to an exemplary embodiment of the present subject disclosure.

Once the fruit has been completely cut open using the non-ratcheting scissor function, the knife 320 can be reset back to the fully open position or the tool 300 can be kept closed for storage by putting the loop mechanism 339 around the corresponding slot 329 in the knife 320. If the user wants to use the tool 300 again, the pivot function 371, 372, 373, etc., would have to be reset and pull the horizontal pin 371 out of the linear slot 373 so it can slide back into the arc slot 372. To do this, the user would reach around the top handle 301 and using the thumb and index finger, would pull back on the spring-loaded pin. By pulling back on the pin the dowel pin and spring 374 are pushed back into the top arm bar 378. With the other hand and using the tabs 376 on the bottom bars they would "break" the elbow joint and reset that pin 371 back to the circular arc 372. Instead of using the tabs 376 on the bottom bars 379 to break the elbow joint, the user could alternatively use their finger and push at the middle of the elbow to break it. Now the position holder 362 and load 361 need to go back to the very first tooth. There is a tab 363 that extends out of the position holder 362 from the right side. (See FIGS. 7A-7B). A user would use the finger to lift up on the tab 363 of the position holder 362, which is sitting below the load 361 and would lift that up as well. Once the position holder 362 and load 361 are out of the way, a return torsion spring 371 at the pivot point of the knife 320 would reset the knife back to the fully open position.

Figure 8A:
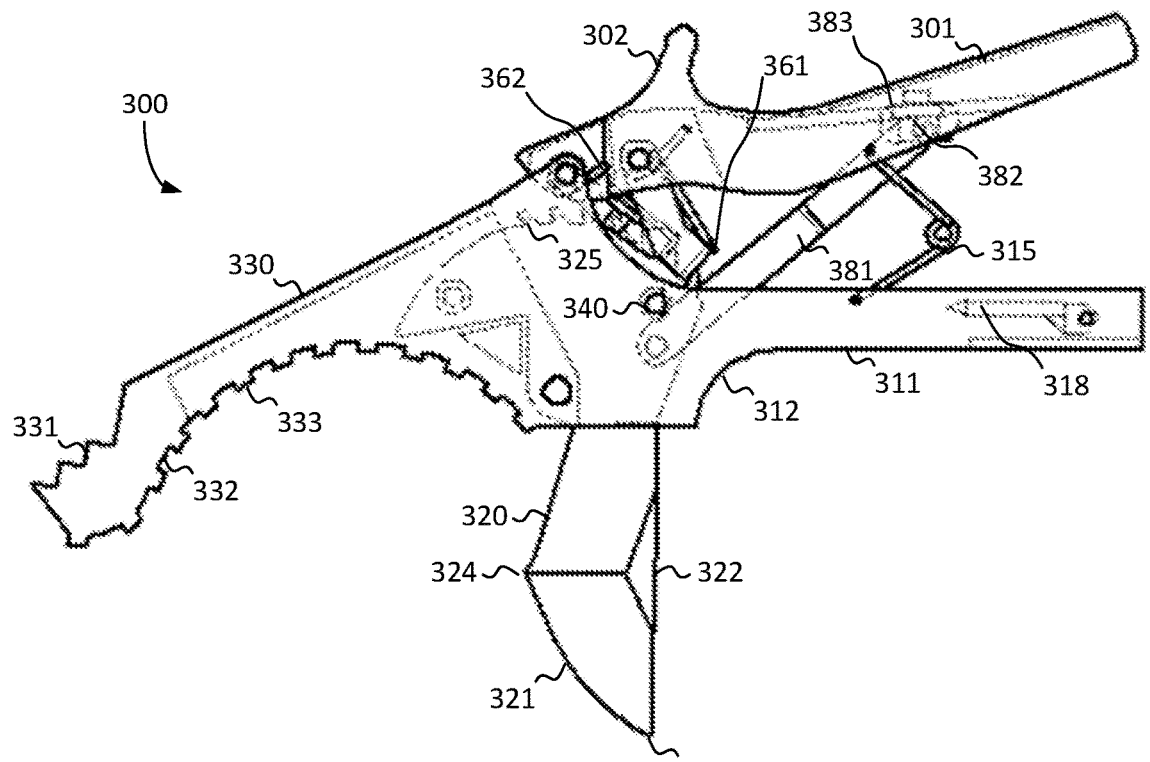
FIG. 8A shows a side view of a multi-function cutter with a slide lock mechanism in an open, ratchet configuration, according to an exemplary embodiment of the present subject disclosure.

FIG. 8A is a side view of an example of the subject disclosure with both ratcheting and non-ratcheting capabilities. It is positioned "open" in the ratcheting position and prepared to cut into the fruit or vegetable. The cutter 300 includes a top portion 330 having an arcuate bottom surface 332 to assist in securing around the end of the fruit or vegetable during the cutting process. The size of the top 330 is determined by the average radius of a coconut. The blade 320 comes to a point 324 in about the midpoint of its front side 321, which is meant to assist with digging into the fruit. The back side 322 of the blade 320 only extends the approximate depth of the shell. The limited blade exposure on the back side 322 is intended for safety and ease of removal from shell during the insertion process.

A trigger style safety 340 is included and rides on the knife 320 during travel, then engages through a hole/opening once the knife 320 is in the fully closed position. The safety includes two separate pieces, a push rod 341 on the left side (for engagement) and a spring-loaded pin 343 on the right side (for disengagement of push rod). (See FIG. 12.)

A connecting rod 381 attaches to slide end 382, which slides freely back/forth on a rail 383 positioned inside the upper arm 301 during the ratcheting portion of fruit entry/cutting. The rod 381 does not assist in the cutting at this point of the process. The load 361 pushes on the knife 320 during ratcheting and the position holder 362 holds the previous position while the load 361 pushes on the teeth 325 and advances the knife.

Figure 8B:
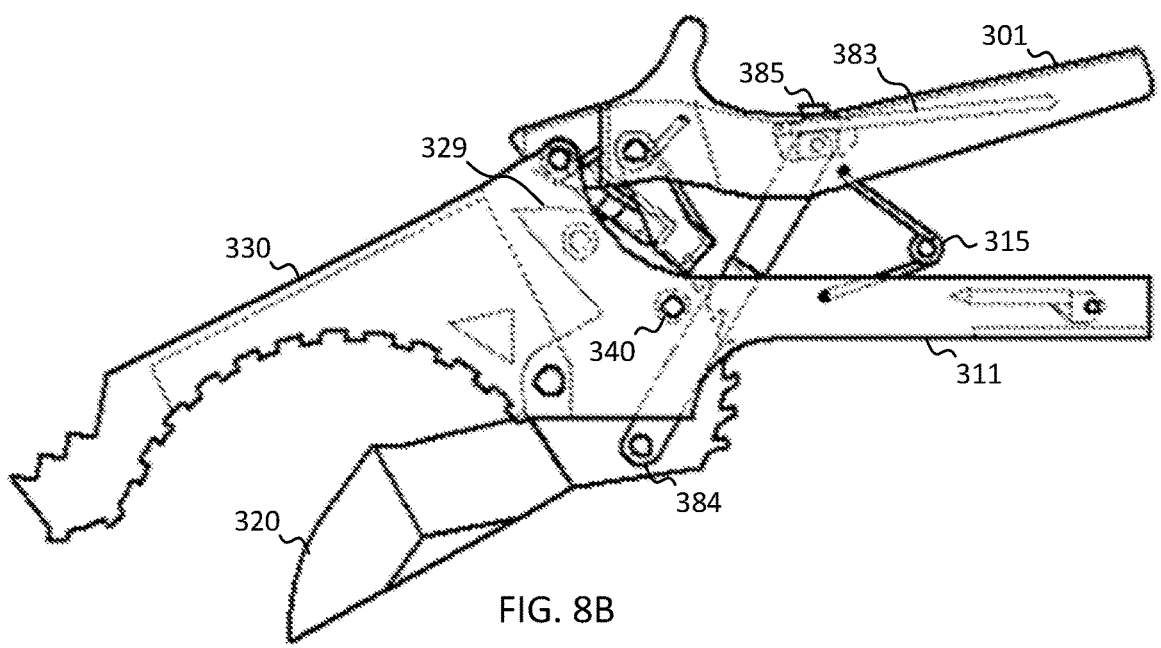
FIG. 8B shows a side view of a multi-function cutter with a slide lock mechanism in a mid open configuration, according to an exemplary embodiment of the present subject disclosure.

FIG. 8B is a side view of the cutter 300 with both ratcheting and non-ratcheting capabilities. The illustration depicts the device 300 at the transition point between the ratcheting and the non-ratcheting cutting position. To aid the grip of the item being cut even further, teeth 333 are included along the radius 332 to assist in grabbing the fruit or vegetable as the lower handle 311 passes along during the cutting process. Teeth 333 may be of any size or shape depending on the intended subject fruit or vegetable. The teeth 333 extend around the nose of the cutter to assist in grip during the rotation of the device 300 during the cutting process. Once the knife 320 has been inserted, the curved knife 320 assists with cutting the soft portion of the fruit from the bottom, or inside out. The connecting rod attachment 384 transfers the work of the handle 301 to the knife 320 during the non-ratcheting portion of the cutting process. The spring-loaded safety pin 340 rides the side of the knife until it reaches the hole/opening. A return spring 315 for non-ratcheting cutting is included for swift, easy cuts. A spring-loaded button 385 on the top handle 301 engages a window in the handle 301 when the knife 320 reaches its last tooth of the ratcheting portion. A finger guard/handle/holder 302 for the user's hand is included to assist in driving the device 300 forward during non-ratchet spring loaded cutting. The position holder 362 and load travel 361 on the non-toothed portion of the knife 329 during the non-ratcheting portion of the cut.

Figure 8C:
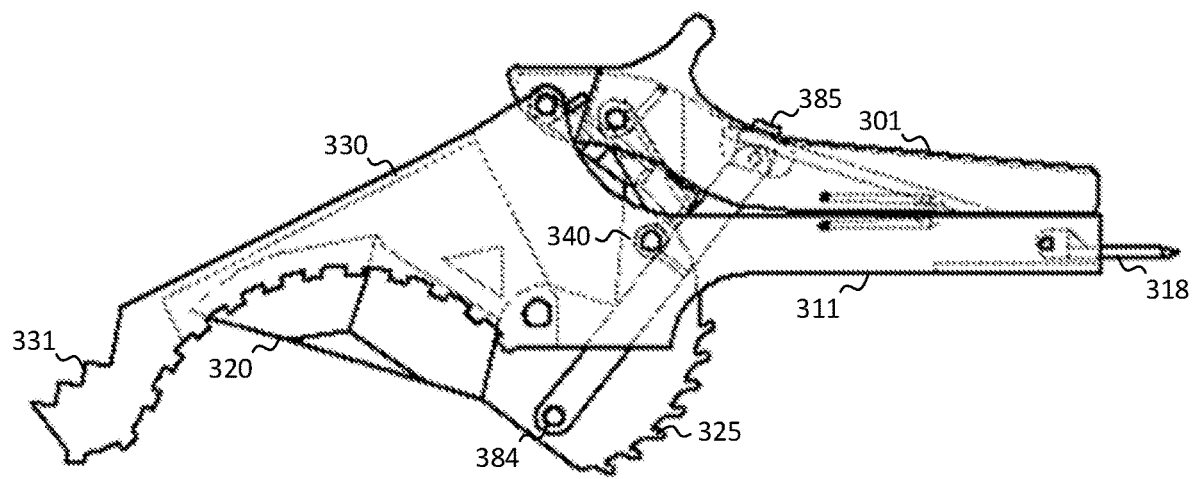
FIG. 8C shows a side view of a multi-function cutter with a slide lock mechanism in a closed, nonratchet configuration, according to an exemplary embodiment of the present subject disclosure.

FIG. 8C illustrates the device 300 when closed and being equipped with a trigger-style safety 340, that when pushed by the user from the left side, drives the spring-loaded pin on the right side of the handle. To disengage the safety and use the cutters again, the user pushes the pin from the right side of the handle. Safety pin 340 is a spring-loaded and engaged, with a direct connection between the two parts of the safety mechanism. The folding or retractable nail 318 is highlighted at the end of the top handle, and is meant for piercing fruit or vegetables, or more specifically coconuts for draining before cutting. A variation of the tooth-edged scooping mechanism 331 is shown on the nose of the device.

Figure 8D:
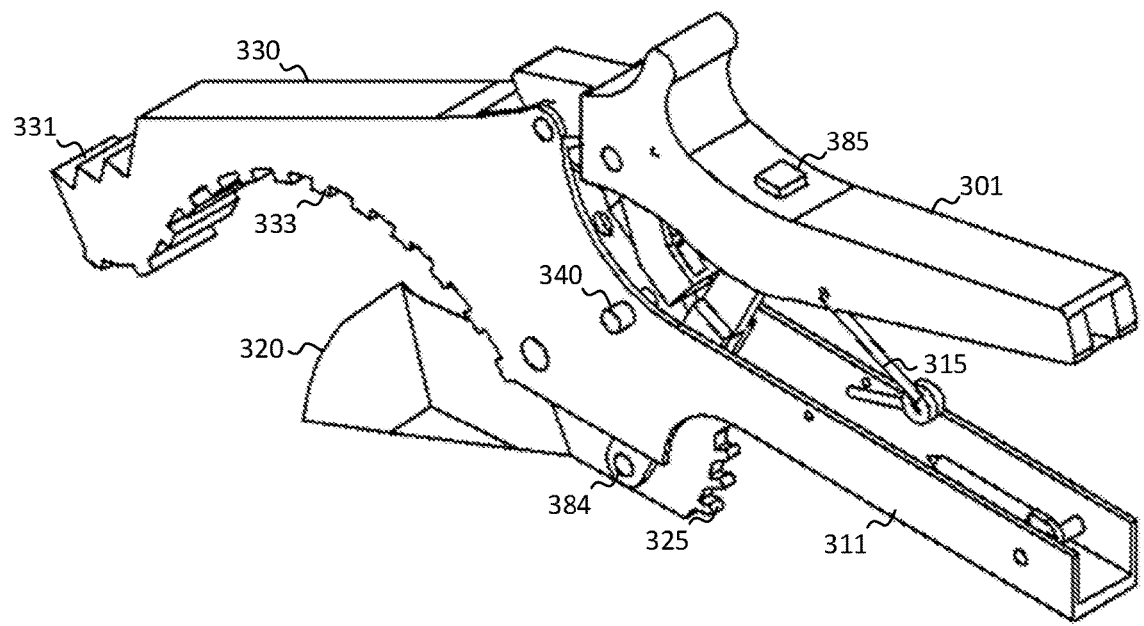
FIG. 8D shows a perspective view of a multi-function cutter with a slide lock mechanism in a mid open configuration, according to an exemplary embodiment of the present subject disclosure.

FIG. 8D portrays the device 300 in the transition (locking) position, but with a perspective view and facing the device 300 from the back-left corner. The transparent view highlights the positioning of the activated trigger style safety 340. FIG. 8D also highlights the piercing pin 318 at the distal end of the lower handle 311 of device 300 and the scooping nose 331 at the front of the device.

Figure 9A:
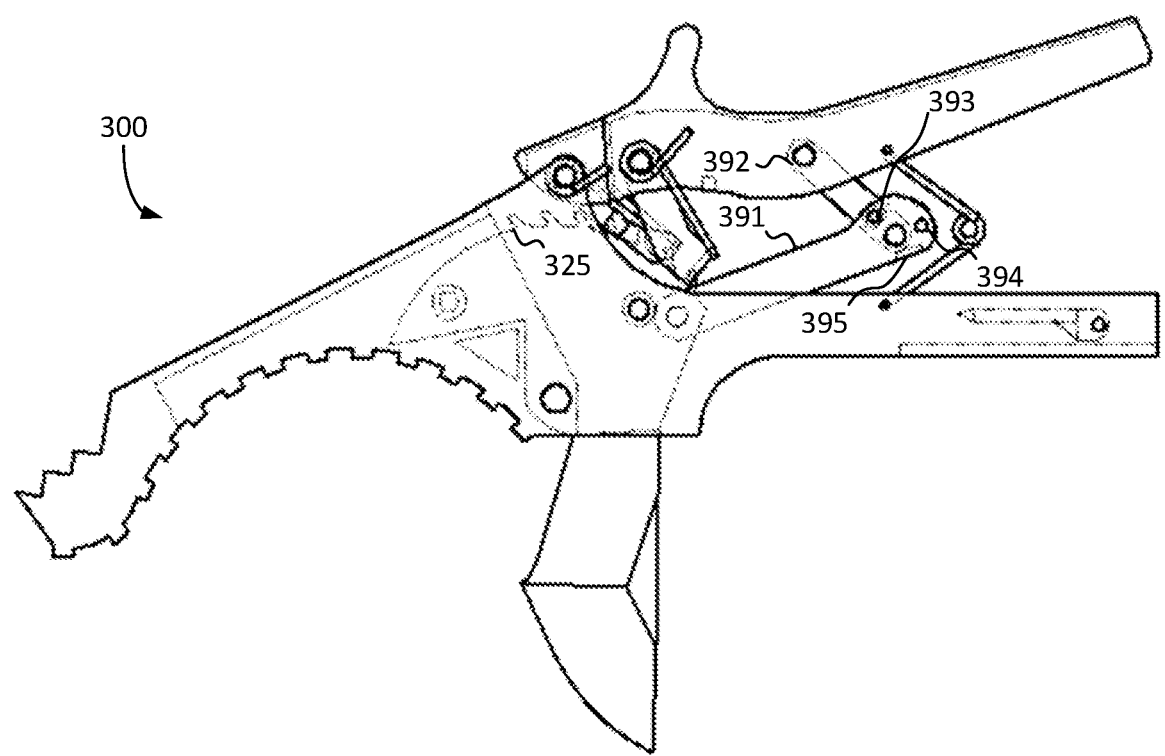
FIG. 9A shows a side view of a multi-function cutter with a pivot lock mechanism in an open, ratchet configuration, according to an exemplary embodiment of the present subject disclosure.

FIG. 9A is a side view of another exemplary cutter 300 with both ratcheting and non-ratcheting capabilities. It is positioned "open" in the ratcheting position and prepared to cut into the fruit or vegetable. This device 300 is equipped with a pivot-style lock mechanism with a lower arm 391 and upper arm 392 that, while the ratchet is in use, are disengaged. A spring-loaded pin 393 with a dome shaped head connects the upper arm 391 and lower arm 392 of the pivot mechanism, and ride on the inside of the pivot mechanism until it engages in the hole/opening once the cutter 300 is advanced to the last tooth 325 of the ratchet. Once this occurs, the device 300 becomes non-ratcheting for additional cutting.

Figure 9B:
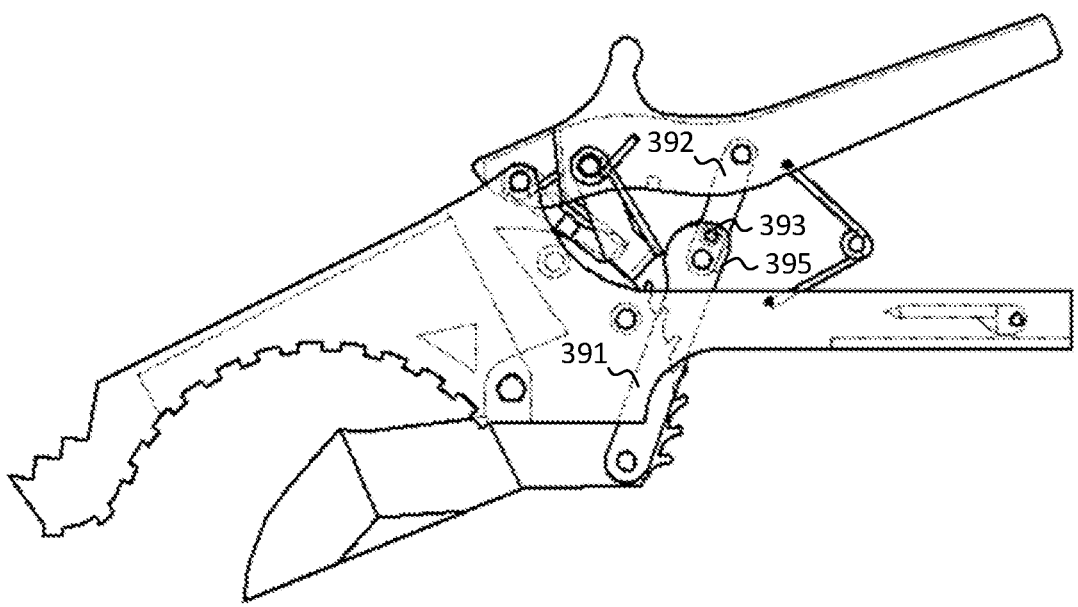
FIG. 9B shows a side view of a multi-function cutter with a pivot lock mechanism in a mid open configuration, according to an exemplary embodiment of the present subject disclosure.

FIG. 9B displays the spring-loaded pin 393 engaged in the hole/opening 394 positioned in the upper end of the lower arm 391. In this position, the device 300 is functionally similar to that shown and described in FIG. 8B, and therefore non-ratcheting. A block or stop 395 included at the back of the lower pivot arm 391 is intended to prevent the pivot mechanism from bending beyond the straight position of the upper arm to lower arm, as shown in FIG. 9B.

Figure 9C:
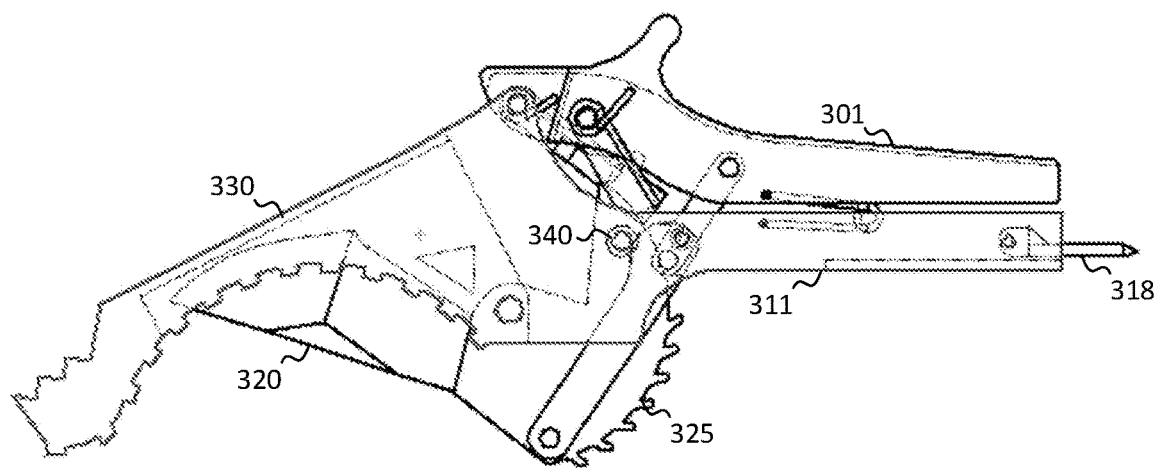
FIG. 9C shows a side view of a multi-function cutter with a pivot lock mechanism in a closed, nonratchet configuration, according to an exemplary embodiment of the present subject disclosure.
Figure 9D:
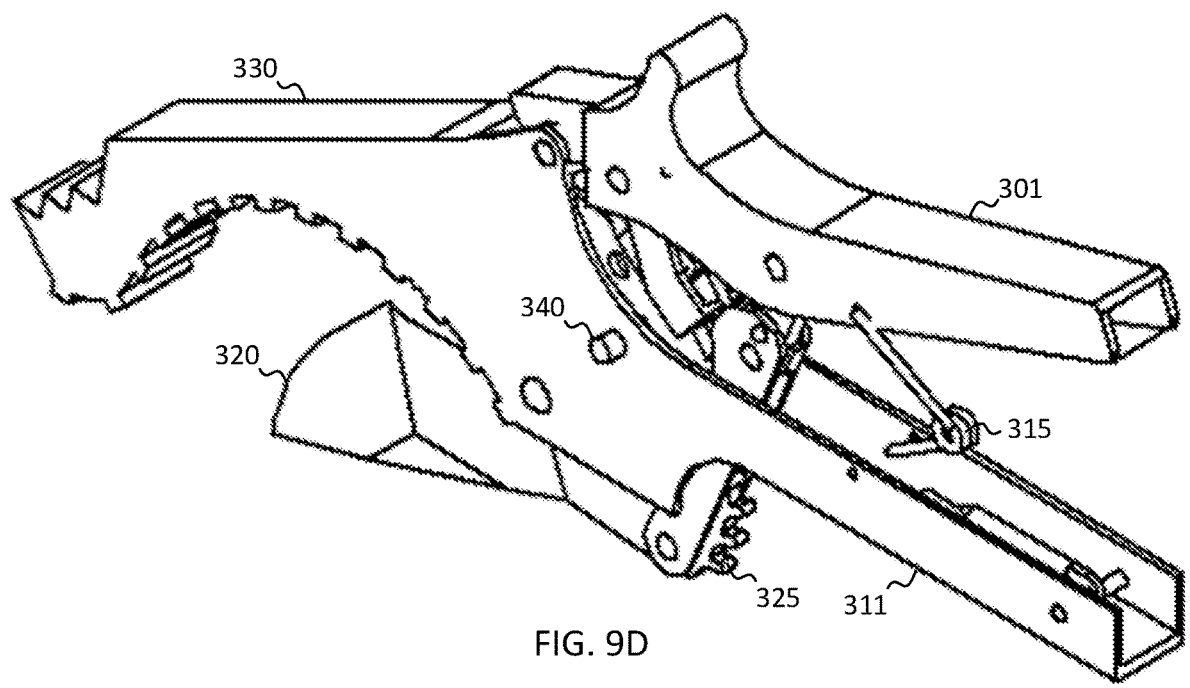
FIG. 9D shows a perspective view of a multi-function cutter with a pivot lock mechanism in a mid open configuration, according to an exemplary embodiment of the present subject disclosure.

FIG. 9C exhibits the trigger-style safety 340 engaged on the device 300 with the pivot-style mechanism. When the safety 340 is pushed by the user from the left side, it drives the spring-loaded pin on the right side of the handle. To disengage the safety 340 and use the cutter again, the user would then push the pin from the right side of the handle, as will be shown and described in more detail in FIG. 12 below. FIG. 9D shows a perspective view of the cutter 300 in the position shown in FIG. 9B.

Figure 10A:
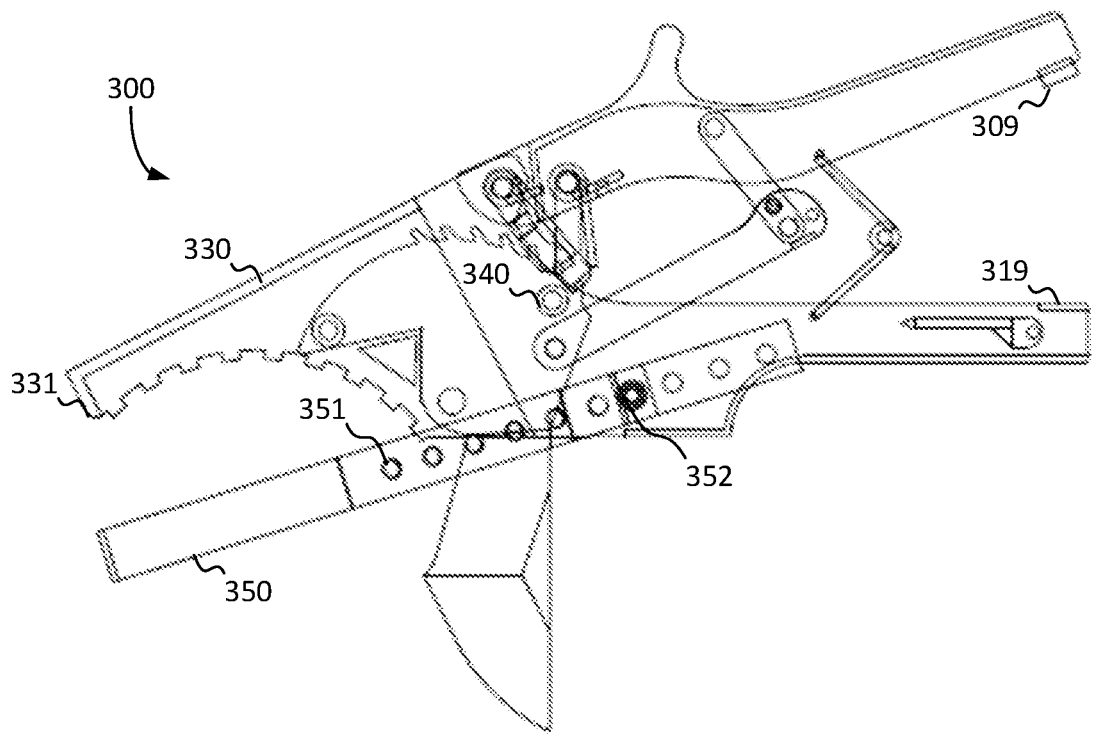
FIG. 10A shows a side view of a multi-function cutter with a pivot lock mechanism and adjustable strap in an open, ratchet configuration, according to an exemplary embodiment of the present subject disclosure.

FIG. 10A is a side view of a multi-function RNR cutter 300 in an open position with a removable strap 350 that is intended to wrap around the axis of the fruit or vegetable to assist in providing a safer and more secure piercing and cutting process. The strap 350 has a series of holes 351 which connect to a corresponding knob 352 on the bottom handle 311. The strap 350 is adjustable based on the subject fruit or vegetable's thickness enabling the device 300 to secure and cut a vast range of size and shapes. The distance between the notch holes 351 in the strap 350 is intended to provide an all-encompassing ability to accommodate various subject sizes and diameters. With the strap 350 mechanism securing the fruit or vegetable being cut, the device's nose 331 is reduced, making the device 300 more compact and easier for storage. A rubber bumper 309, positioned on the bottom of the top handle 301, and connecting to a corresponding housing 319 positioned on the top side of the lower handle 311, provides a spring-like mechanism which facilitates engagement and disengagement of the safety pin 340 in the closed position.

Figure 10B:
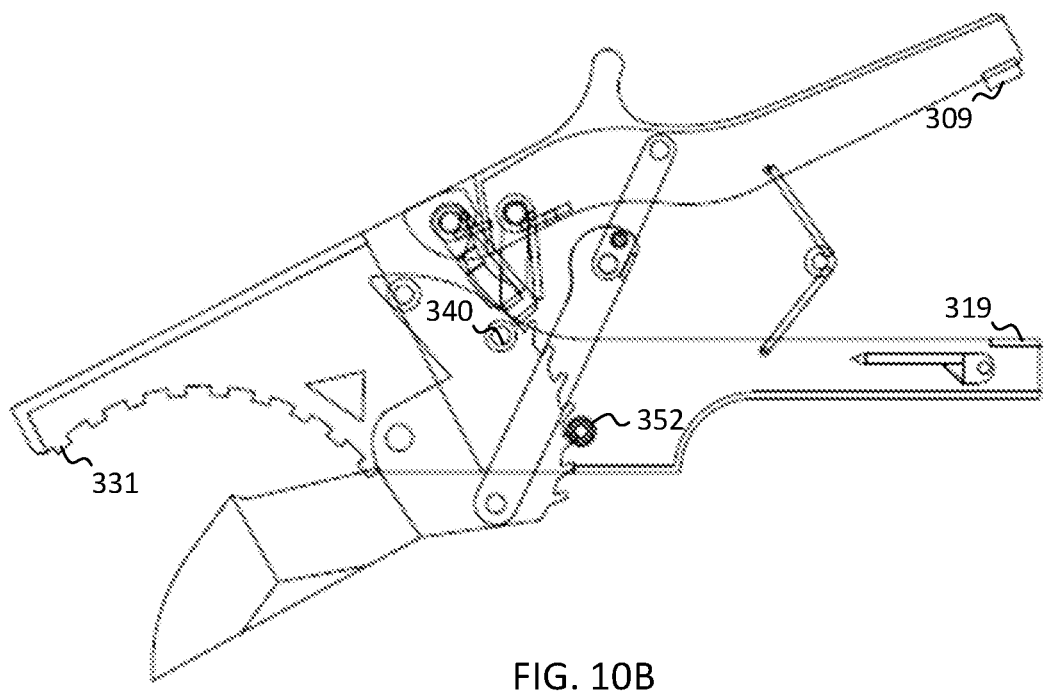
FIG. 10B shows a side view of a multi-function cutter with a pivot lock mechanism and adjustable strap in a mid open configuration, according to an exemplary embodiment of the present subject disclosure.

FIG. 10B shows the device 300 in an open position with the strap attachment pins 352 revealed and the strap 350 removed to accommodate cutting around the fruit after the initial piercing of the blade has been facilitated by the strap 350. It again highlights the shorter nose 331 as well as the rubber bumper 309 on the bottom of the top handle.

Figure 10C:
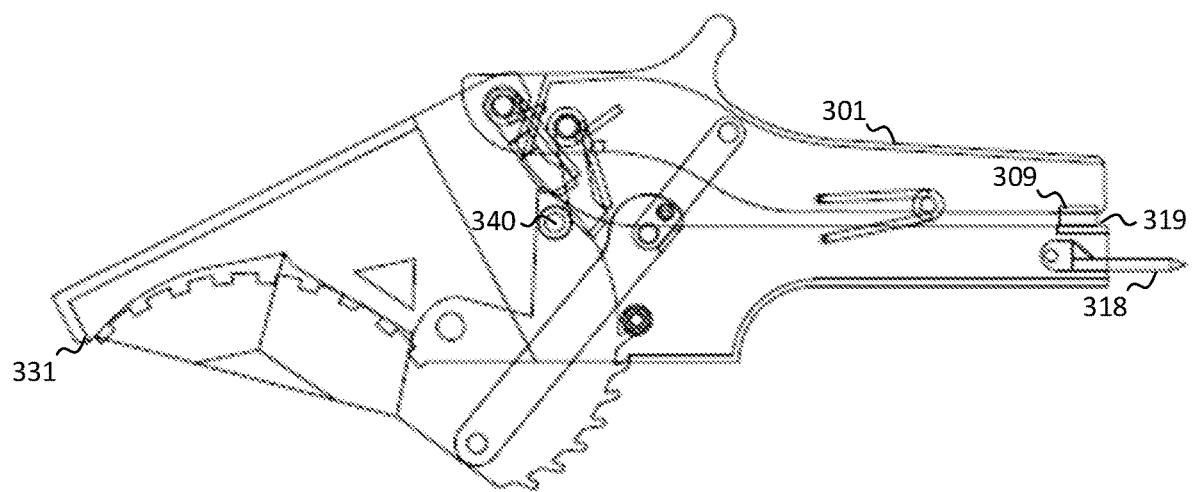
FIG. 10C shows a side view of a multi-function cutter with a pivot lock mechanism and adjustable strap in a closed, nonratchet configuration, according to an exemplary embodiment of the present subject disclosure.

FIG. 10C shows the cutter 300 with short nose 331 in the closed position with the strap detached. The figure highlights the usage of the bumper 309 on the underside of the top handle 301. The bumper 309 provides a spring-like mechanism which facilitates engagement and disengagement of the safety pin 340 in the closed position.

Figure 10D:
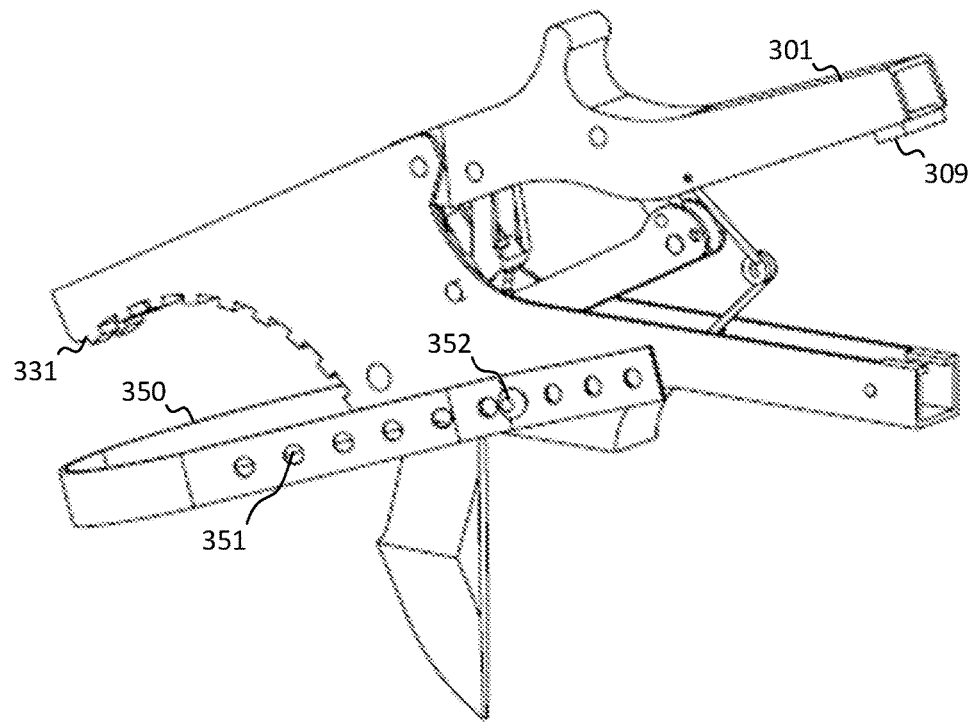
FIG. 10D shows a perspective view of a multi-function cutter with a pivot lock mechanism and adjustable strap in an open configuration, according to an exemplary embodiment of the present subject disclosure.

FIG. 10D shows a side perspective view (of FIG. 10A) with the cutter 300 equipped with the detachable strap 350, which is adjustable based on subject fruit or vegetable size. The view from the rear left corner also shows the plane of the shorter nose 331, as well as the rubber bumper 309 on the bottom of the top handle 301. The strap 350 is secured by pulling one of the pliable holes 351 over the pin 352, thus tightly securing the subject fruit or vegetable for initial piercing.

Figure 11A:
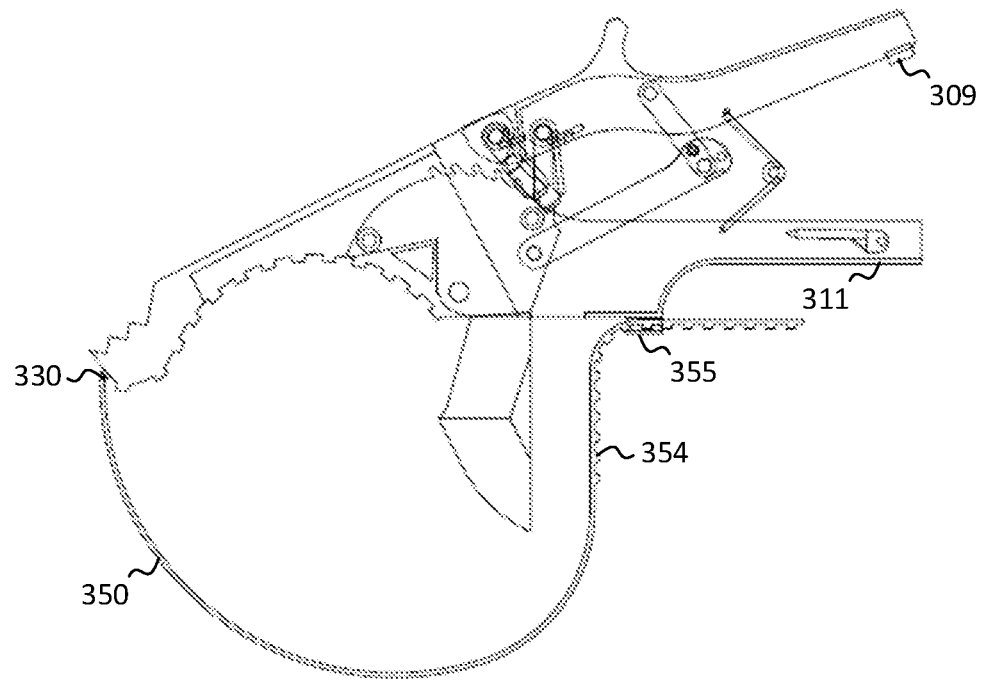
FIG. 11A shows a side view of a multi-function cutter with a pivot lock mechanism and adjustable strap positioned mid handle in an open, ratchet configuration, according to an exemplary embodiment of the present subject disclosure.
Figure 11B:
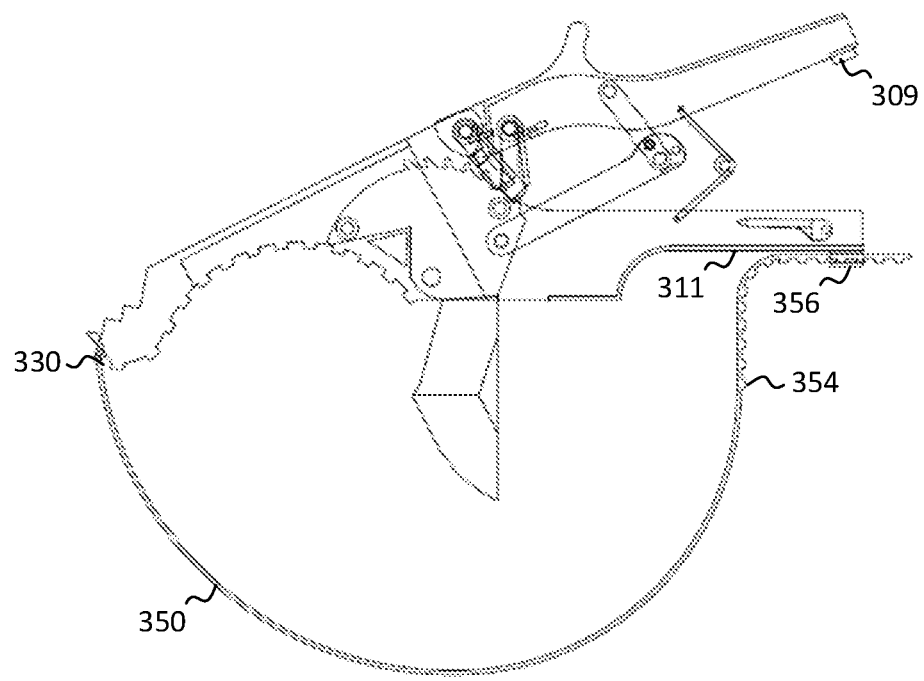
FIG. 11B shows a side view of a multi-function cutter with a pivot lock mechanism and adjustable strap positioned end of handle in an open, ratchet configuration, according to an exemplary embodiment of the present subject disclosure.

The embodiments shown in FIGS. 11A-11B provide alternative strap placements. Instead of a horizontal strap, a vertical strap that attaches to a position before the bottom handle 311 (FIG. 11A) or the distal end of the bottom handle 311 (FIG. 11B) to secure the fruit during the initial ratcheting function. It would function like a snowboard or ski boot strap that clicks into place with a spring-loaded lever as it is pulled in tight.

FIG. 11A is a side view of the cutter 300 in an open position furnished with a longitudinal strap 350 intended to wrap around the axis of the desired fruit or vegetable to provide a safer and more secure piercing and cutting process. The strap 350 is hooked fixedly to the front nose 330 to the underside of a midpoint of the lower handle 311 through the frictional connection of raised bumps 354 on the strap 350 with a corresponding friction capturing element 355. The strap 350 can be pulled taught from the distal end of the handle 311 once the subject fruit or vegetable is in position.

FIG. 11B displays the longitudinal strap alternatively attached to the distal end of the lower handle 311 through the frictional connection of raised bumps 354 on the strap 350 with a corresponding friction capturing element 356. The strap 350 can be pulled taught from the distal end of the lower handle 311 based on the thickness of the subject fruit or vegetable.

FIGS. 12A-B illustrate an overview view and close up view, respectively, of an alternative safety pin 340 which can be used in the closed position of the tool 300. The user squeezes against the compression force of the rubber bumper 309 to align the holes in the safety mechanism, and upon alignment an engagement pin 341 of the safety pin 340 can be engaged from the left side by the user. The engagement pin 341 then goes through a slot 342 in the knife 320 to provide a solid physical barrier, preventing the knife 320 from opening. The safety mechanism 340 is intended to be engaged during storage, times of non-usage, and when the user is utilizing the nail tool 318 to poke a hole in a coconut (or other fruit) to drain the juice. When the release pin 343 is pressed by the user from the right side, the engagement pin 341 is disengaged and its domed surface 344 slides against the sloped wall 345 of the hole 342 in the knife blade 320, which functions to remove the release pin 343. When the engagement pin 341 is activated, the release pin 343 will be in the open position, protruding from the right side of the tool 300.

FIGS. 12C-12D illustrate an overview view and close up view, respectively, of the safety release pin 343 on the right side driven in by user, which then pushes the engagement pin 341 out of the slot 342 in the knife 320. The sloped portion 345 of the knife slot 342 combined with the spring action of the rubber bumper 309 will assist to drive the safety release pin 343 out of the slot 342 in the knife 320. The disengagement of the safety release is completed by the user when the user pulls the two handles 301, 311 of the cutting device 300 apart into the open position. The dome-shaped end or tip 344 of the safety release pin 343 works with the sloped portion 345 of the knife slot 342 to assist the disengagement action.

FIGS. 12E-12F illustrate an overview view and close up view, respectively, of the safety release pin 343 completely clear of the knife slot 342. Its domed surface 344 rides along the surface of the knife 320 during normal cutting and the release pin 343 protrudes from the right side of the knife until ready to be used in the closed position again.

Figure 13A:
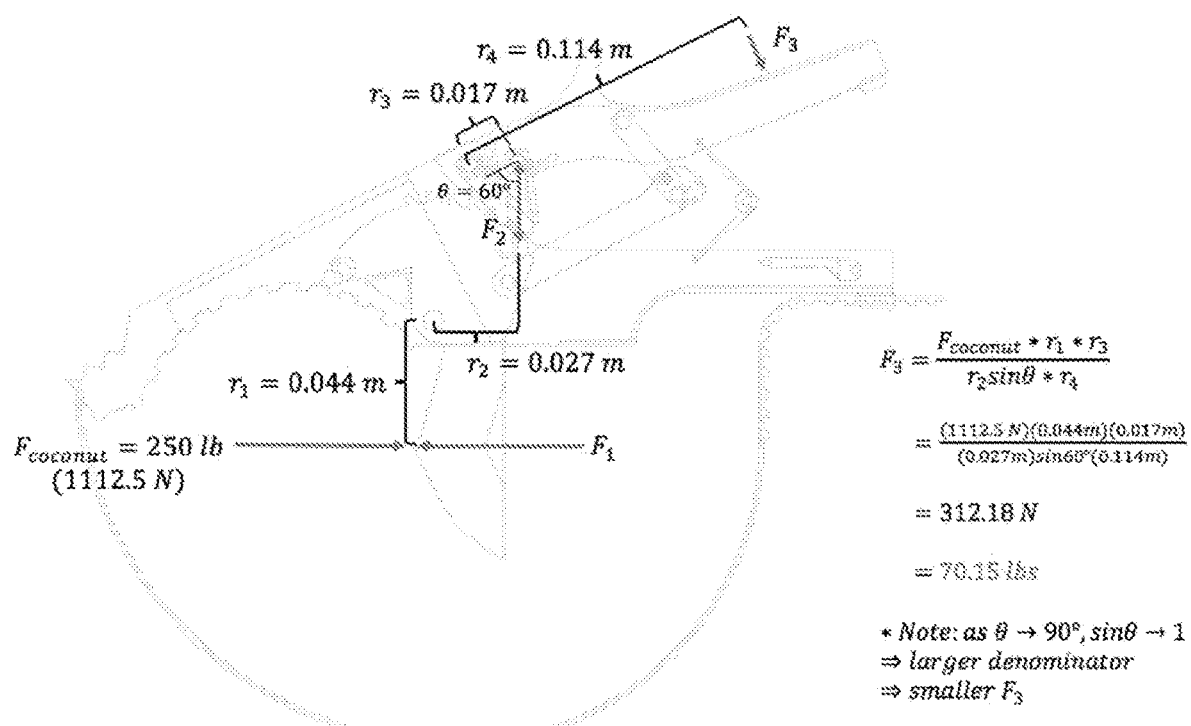
FIG. 13A shows a side view of force calculations in a multi-function cutter, according to an exemplary embodiment of the present subject disclosure.

FIG. 13A shows a computation of the clamping force ($F_3$) required by the user to pierce the shell of what is anticipated to be the most robust fruit that the tool could be used to open—a coconut. The force applied to the blade ($F_{coconut}$) was determined experimentally to be about 220 lbs., so an overestimate of 250 lbs. was used in the compound leverage calculation shown at right. The calculation determined that even such an extreme piercing force of 250 lbs. will only require approximately 70 lbs. of clamping force from the user per ratcheting stroke during piercing. A web search suggests (example shown below) that an average male grip strength is approximately 105-113 lbs. and an average female grip strength is approximately 57-65 lbs. Optimization of the design, along with the likelihood that most fruits (including coconuts) will require a much smaller piercing force, along with the further possibility that the user can use two hands if necessary, means the tool will likely be able to pierce any appropriately sized fruit it will engage.

TABLE 1

AVERAGE GRIP STRENGTH

| rating* | MALES | | FEMALES | |
| --- | --- | --- | --- | --- |
| | (lbs) | (kg) | (lbs) | (kg) |
| excellent | >141 | >64 | >84 | >38 |
| very good | 123-141 | 56-64 | 75-84 | 34-38 |
| above average | 114-122 | 52-55 | 66-74 | 30-33 |
| average | 105-113 | 48-51 | 57-65 | 26-29 |
| below average | 96-104 | 44-47 | 49-56 | 23-25 |
| poor | 88-95 | 40-43 | 44-48 | 20-22 |
| very poor | <88 | <40 | <44 | <20 | https://www.topendsports.com/testing/tests/handgrip.htm

The compound leverage calculation gives a result of 61.7 lbs. of grip strength required to pierce the observed 220 lbs. of resistance from the coconut. Optimization of the design (e.g., adjusting the position $r_3$ of the load force $F_2$. such that the angle θ approaches 90°) gives a result of 53.5 lbs. of grip strength required to pierce the observed 220 lbs. of resistance from the coconut. Assuming the resistance force provided by most fruits will be much less than that observed experimentally by the coconut, the compound leverage calculation will return values that are consistently below 50 lbs., which is safely under the average single-hand grip strengths of both males and females, as indicated in the table above.

Figure 13B:
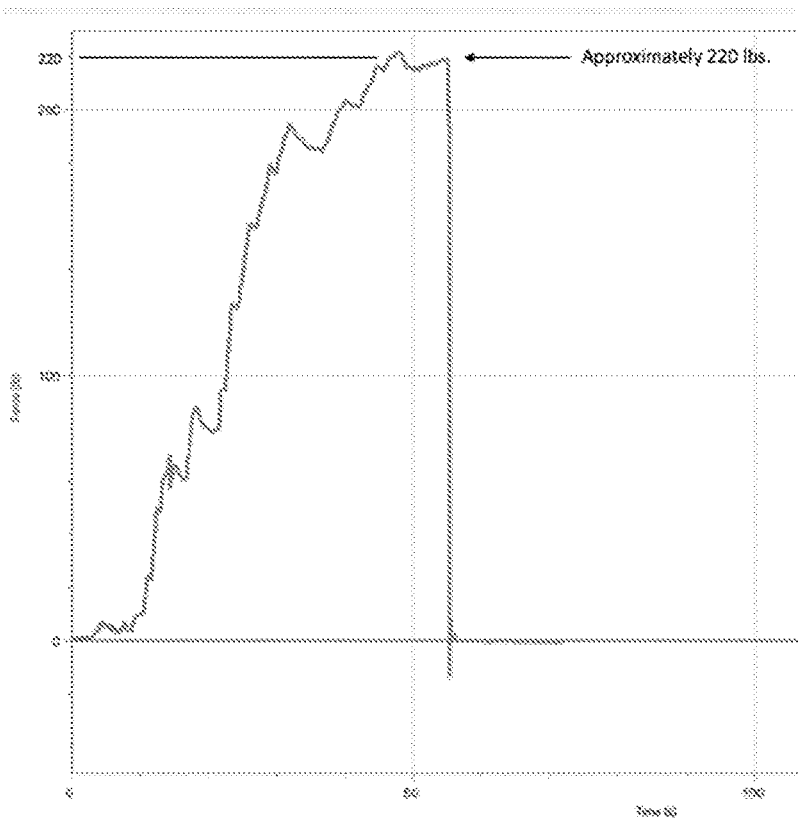
FIG. 13B shows a graph of force calculations in a multi-function cutter, according to an exemplary embodiment of the present subject disclosure.

FIG. 13B shows a computation of the experimental results of a test indicating the piercing force of what is anticipated to be the most robust fruit that the tool could be used to open—a coconut.

FIGS. 14-27 show and describe further alternative embodiments of the cutting apparatuses. Only the new or alternative feature will be described in these figures, as one having ordinary skill in the art would appreciate and recognize that such new or alternative feature may be incorporated into the prior embodiments already described.

Figure 14A:
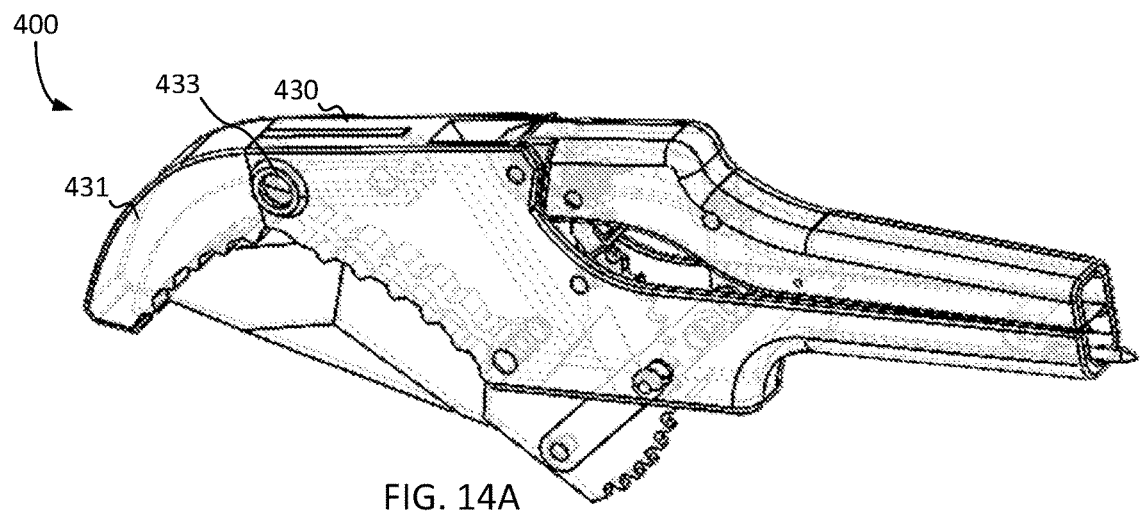
FIG. 14A shows a perspective view of a multi-function cutter with extendable nose section in an unextended position, according to an exemplary embodiment of the present subject disclosure.
Figure 14B:
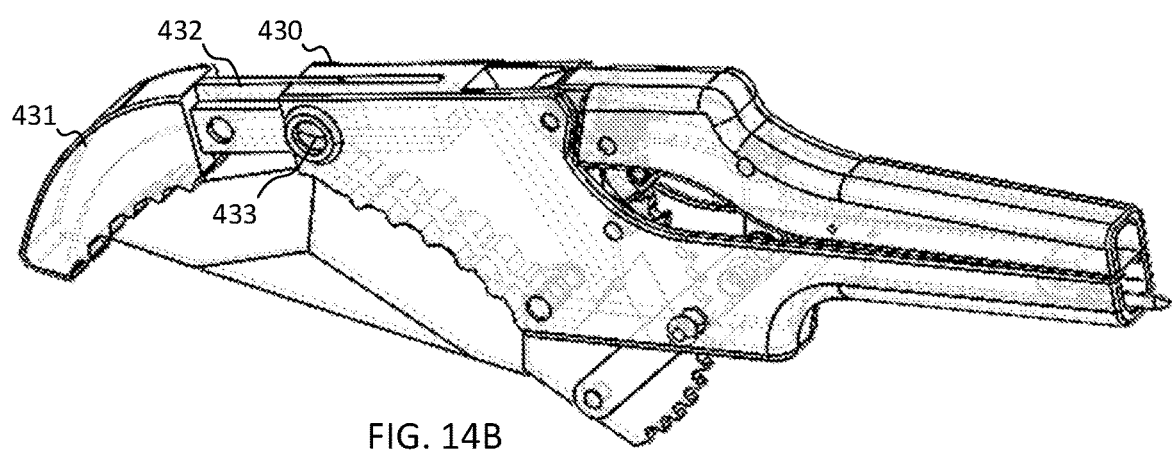
FIG. 14B shows a perspective view of a multi-function cutter with extendable nose section in an extended position, according to an exemplary embodiment of the present subject disclosure.

FIGS. 14A-14B show unextended and extended configurations, respectively, of a cutter 400 with ability of the nose 430/431 to adjust to different lengths to accommodate different size fruit. FIG. 14A shows the cutter 400 in an unextended configuration, with the top portion 430 adjacent an extendable nose portion 431. The extendable nose portion 431 is securable to the top portion 430 through securing screw 433. FIG. 14B shows the extendable nose portion 431 extended out a certain desired length on a sliding rail 432, and securable in position via securing screw 433.

Figure 15:
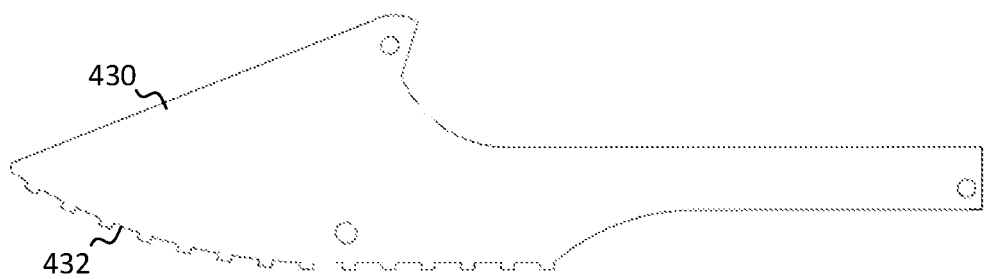
FIG. 15 shows a side view of a convex nose section, according to an exemplary embodiment of the present subject disclosure.

FIG. 15 shows a configuration where the bottom surface 432 of the nose 430 is convex shaped instead of concave like the prior embodiments described above. This convex shaped nose configuration would allow the user to rotate the nose 430 on the fruit which would assist in cutting through.

Figure 16:
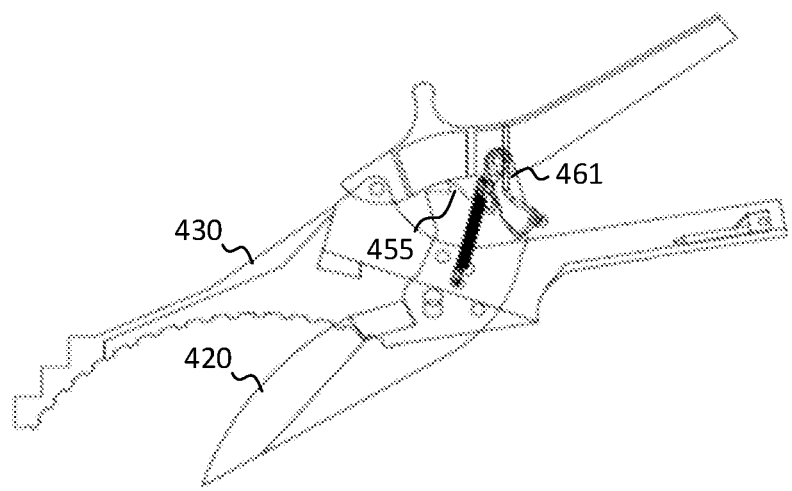
FIG. 16 shows a side view of a cutting apparatus with a conventional knife, according to an exemplary embodiment of the present subject disclosure.

FIG. 16 shows a traditional curved knife 420 instead of the high point like the other knives. The load (what pushes on the teeth) 461 positioned further down on the handle to increase the arc length. This causes the load 461 to travel a greater distance and therefore allows there to be a greater distance between the teeth 425 on the knife 420, so it does not require as many handle squeezes or "clicks" during the ratcheting function.

Figure 17:
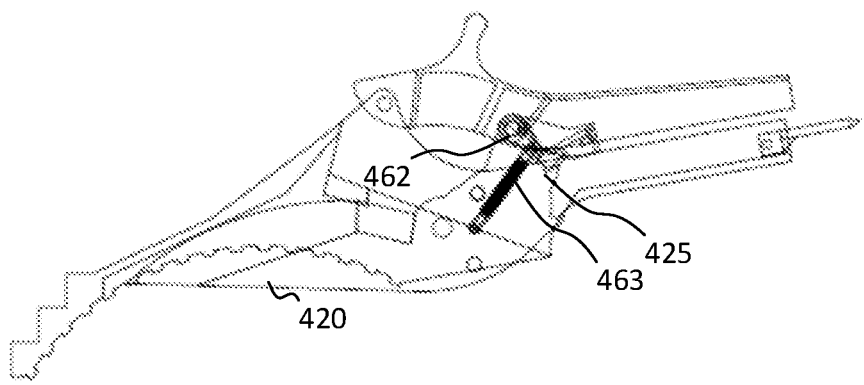
FIG. 17 shows a side view of a cutting apparatus with a position holder on the teeth of the ratchet mechanism, according to an exemplary embodiment of the present subject disclosure.

FIG. 17 shows an alternative embodiment where instead of the position holder spring being on the shaft of the position holder 462, springs 463 can be positioned on the knife 420 to hold the position holder 462 in place on the teeth 425 of the knife 420.

Figure 18A:
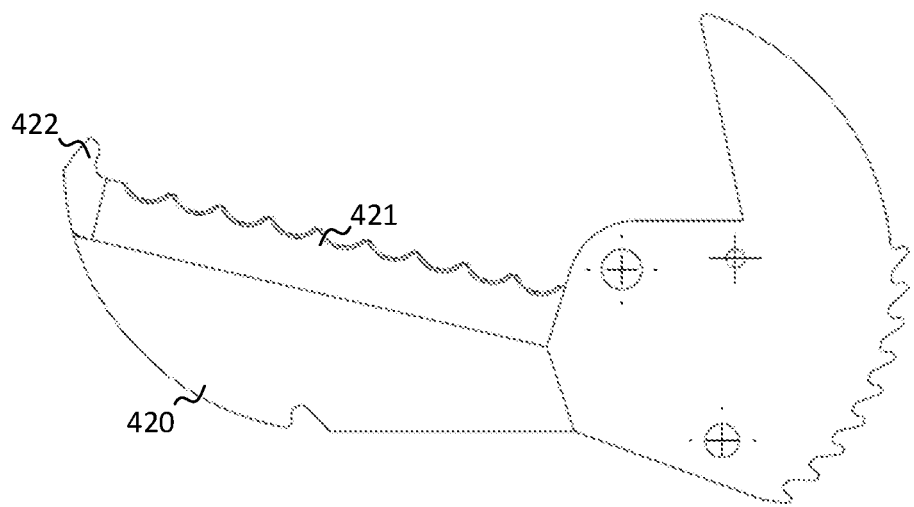
FIG. 18A shows a side view of a serrated knife with hook, according to an exemplary embodiment of the present subject disclosure.
Figure 18B:
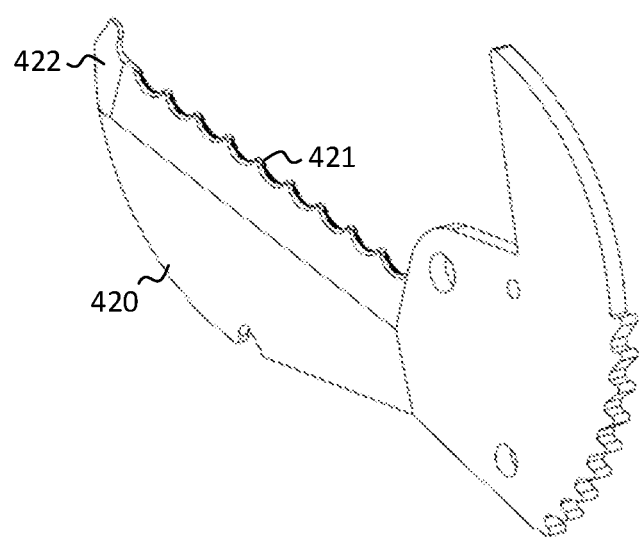
FIG. 18B shows a perspective view of a serrated knife with hook, according to an exemplary embodiment of the present subject disclosure.

FIGS. 18A-18B show side and perspective views, respectively, of a serrated knife 420 with a serrated surface 421 to assist in gripping the fruit at any angle. The hook 422 is not positioned in the center, but at the distal end of the knife 420 for greater grip and more clearance for the fruit to be cut.

Figure 19A:
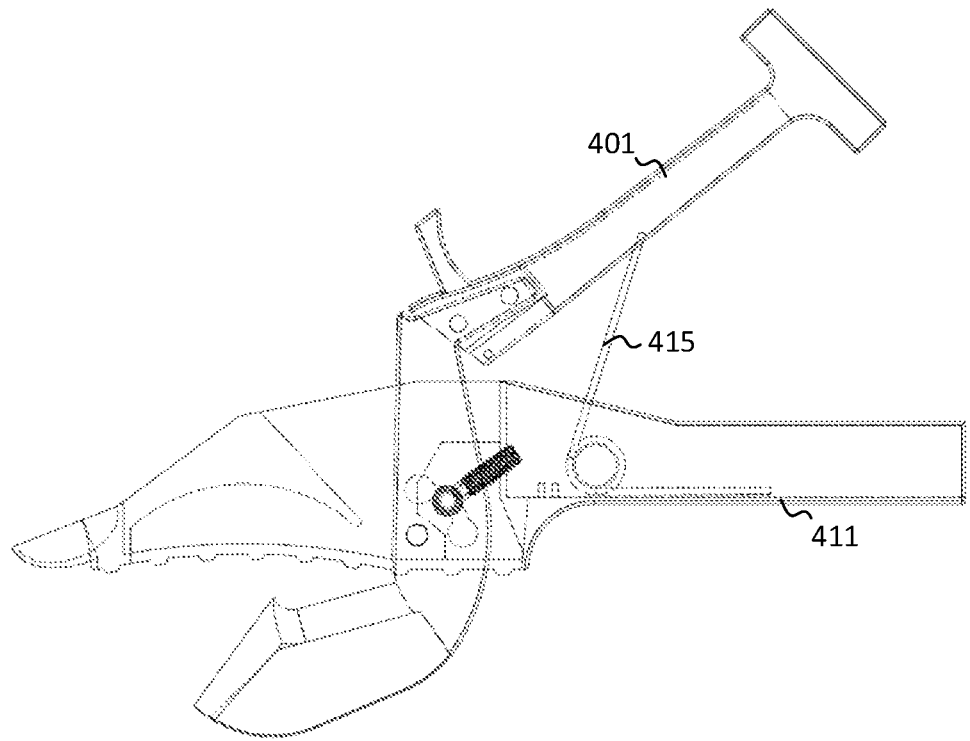
FIG. 19A shows a side view of a cutting apparatus with a reverse positioned torsion spring, according to an exemplary embodiment of the present subject disclosure.
Figure 19B:
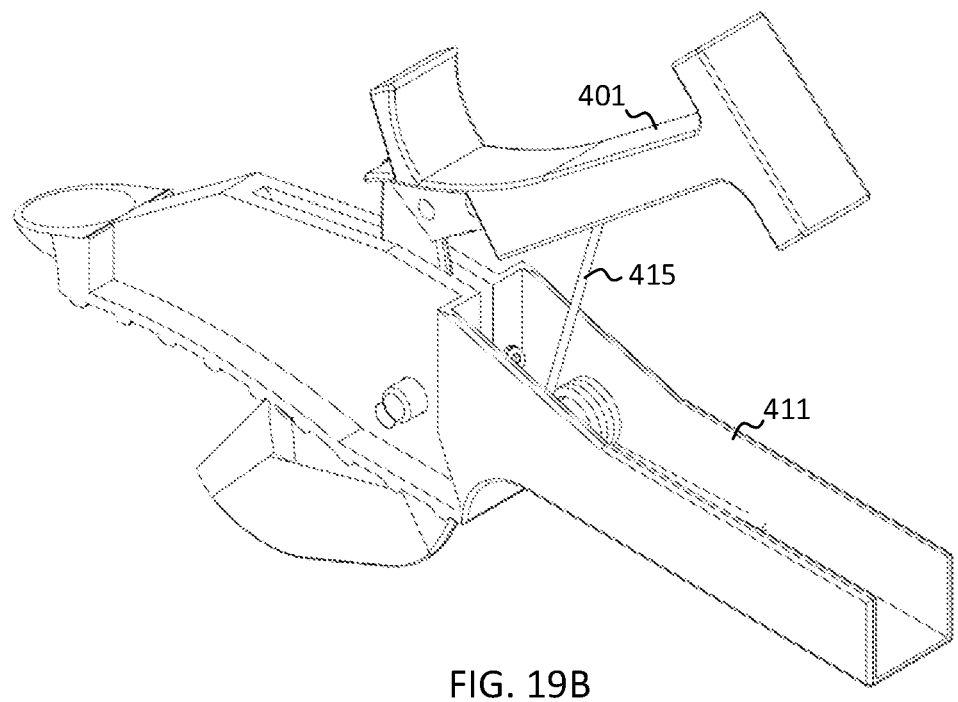
FIG. 19B shows a perspective view of a cutting apparatus with a reverse positioned torsion spring, according to an exemplary embodiment of the present subject disclosure.

FIGS. 19A-19B show side and perspective views, respectively, of an embodiment where the torsion spring 415 is in a reversed direction (with respect to other embodiments described above) for greater torque returning the handles 401, 411 to the open position. A through shaft in the lower handle 411 keeps the spring 415 in the same position and out of the way of the user's hands.

Figure 20:
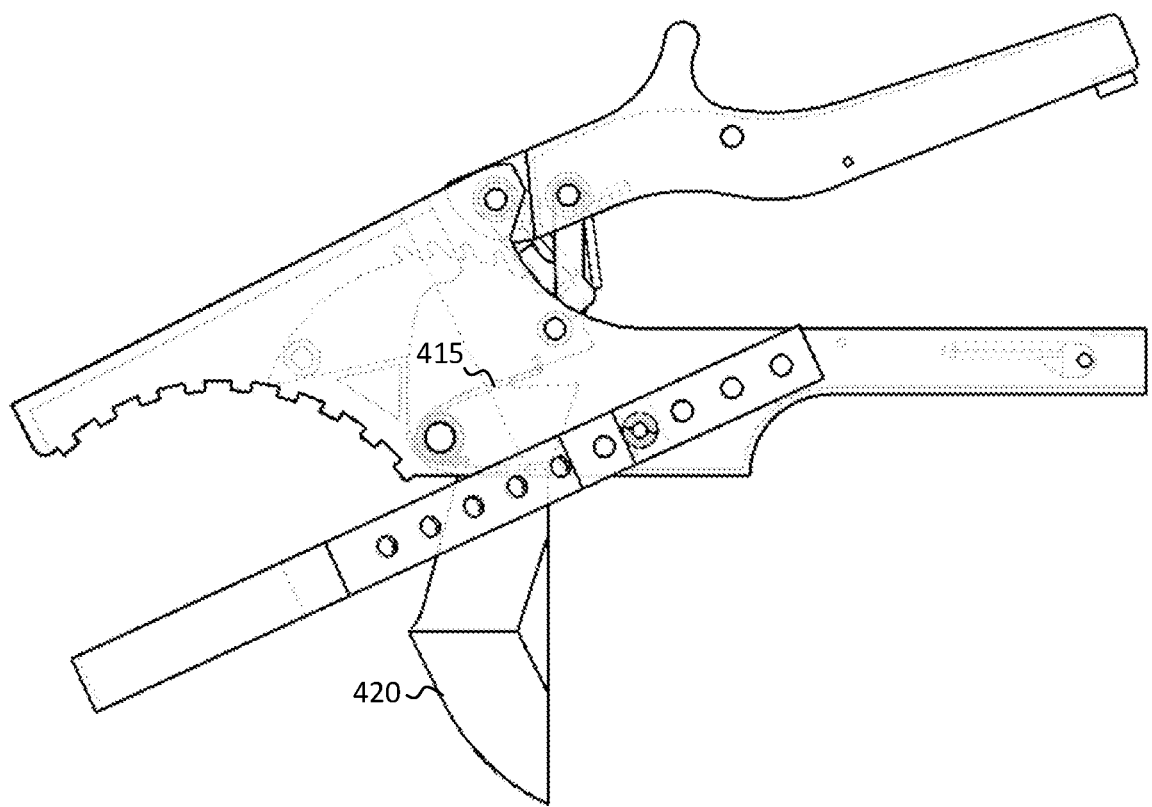
FIG. 20 shows a side view of a cutting apparatus with a torsion spring connected to the knife, according to an exemplary embodiment of the present subject disclosure.
Figure 21A:
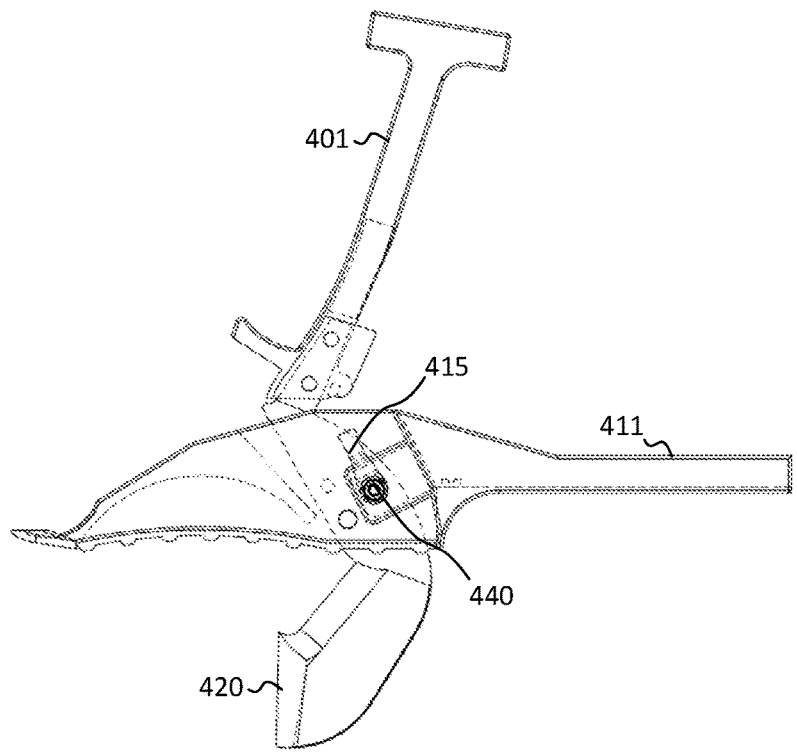
FIG. 21A shows a side view of a cutting apparatus with a lever connected to the safety pin, according to an exemplary embodiment of the present subject disclosure.
Figure 21B:
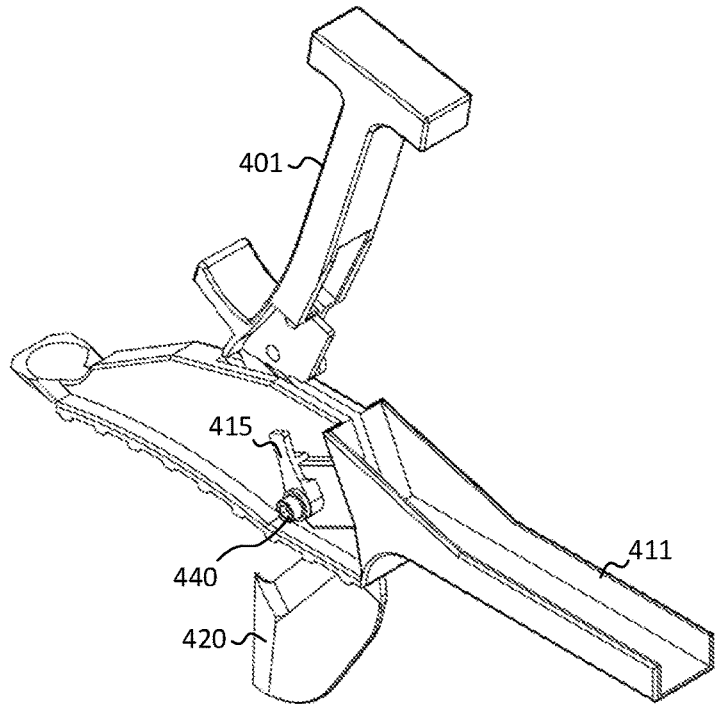
FIG. 21B shows a perspective view of a cutting apparatus with a lever connected to the safety pin, according to an exemplary embodiment of the present subject disclosure.

FIG. 20 shows a side view of an embodiment where the return torsion spring 415 helps return the knife 420 back to the open position after fully cutting through around the fruit. This alternate design shows the torsion spring 415 connected to a slot in the knife 420 instead of a hole.

FIGS. 21A-22B show side and perspective views, respectively, of an embodiment where a lever 116 is used to pop the safety 440 out of the knife 420 during the cutting portion function.

Figure 22A:
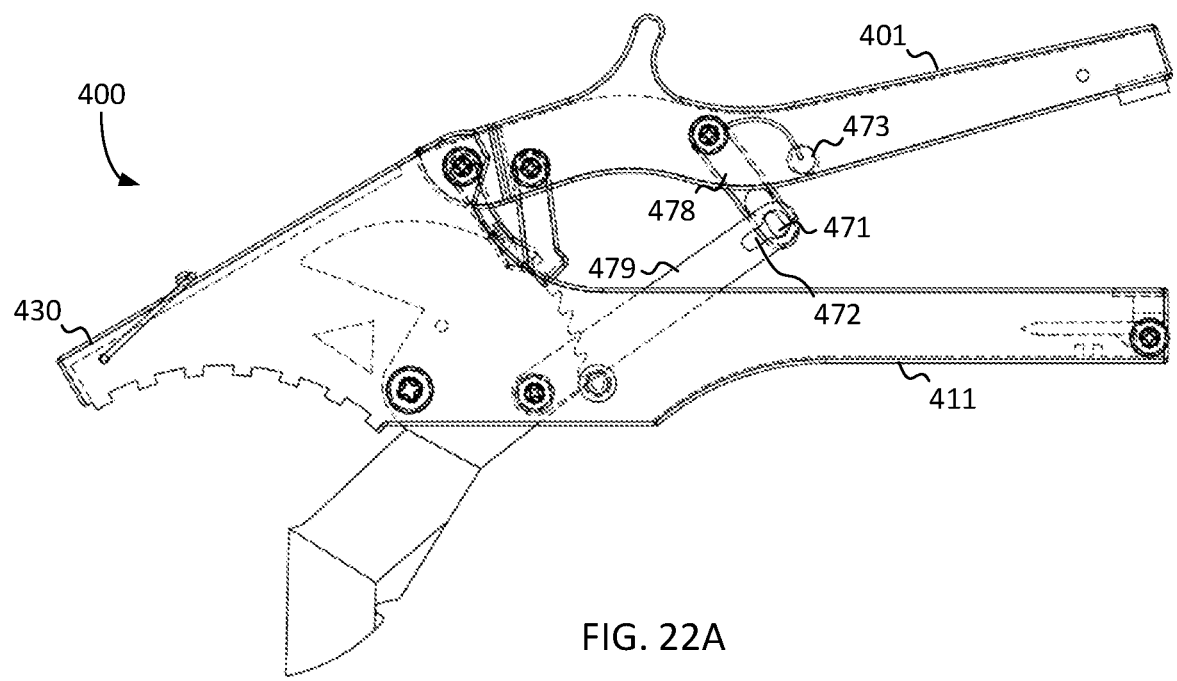
FIG. 22A shows a side view of a cutter with a pivot pin under load in a ratcheting configuration, according to an exemplary embodiment of the present subject disclosure.
Figure 22B:
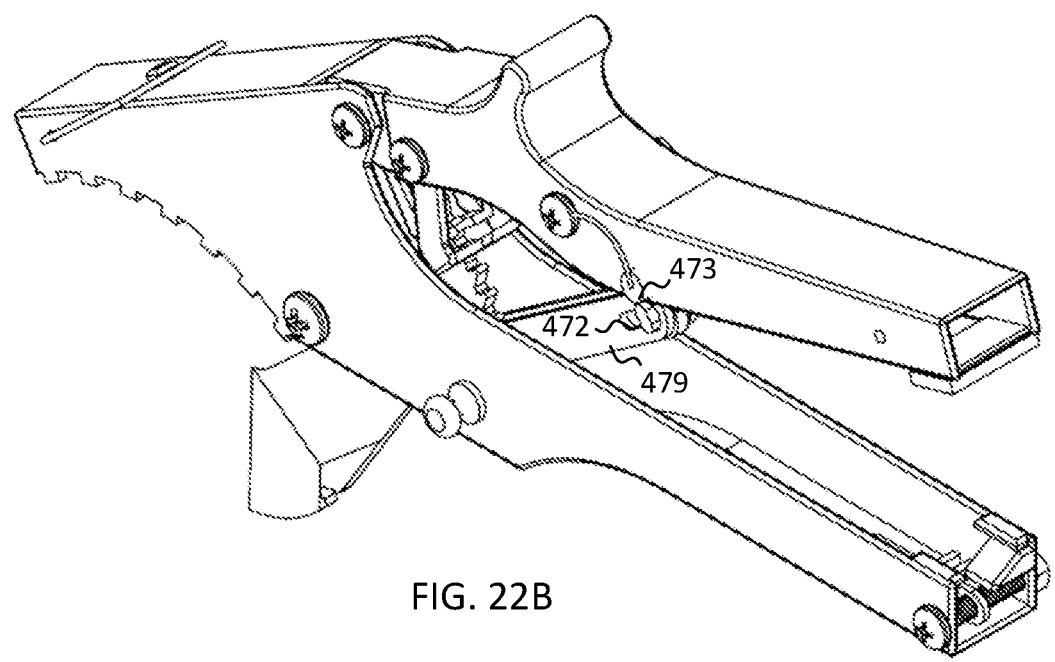
FIG. 22B shows a perspective view of a cutter with a pivot pin under load in a ratcheting configuration, according to an exemplary embodiment of the present subject disclosure.

FIGS. 22A-22B show side and perspective views, respectively, of an embodiment of the cutter 400 with a pivot pin 471 mechanism. In the configuration shown in FIGS. 22A-22B, the cutter 400 is in a ratchet configuration, as described in other above embodiments.

Figure 22C:
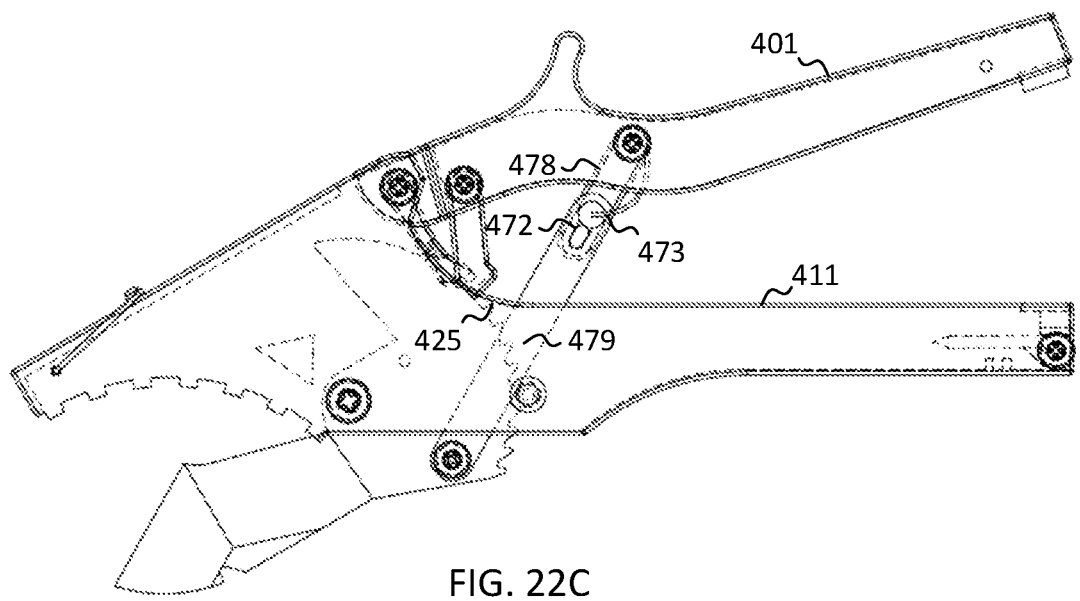
FIG. 22C shows a side view of a cutter with a pivot pin under load in a nonratcheting configuration, according to an exemplary embodiment of the present subject disclosure.
Figure 22D:
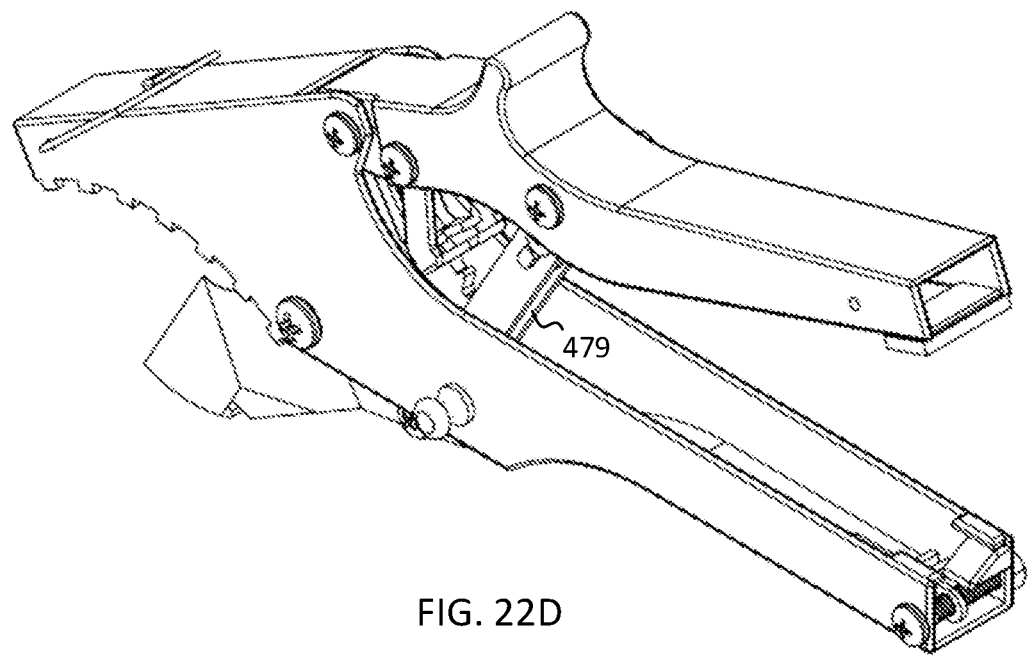
FIG. 22D shows a perspective view of a cutter with a pivot pin under load in a nonratcheting configuration, according to an exemplary embodiment of the present subject disclosure.

FIGS. 22C-22D show side and perspective views, respectively, of an embodiment of the cutter 400 with a pivot pin 471 mechanism under load. This is an alternative way to transition from ratcheting to nonratcheting. A single pivot pin 471 (unlike the dual pivot pins and arc shown in FIG. 5) is used in this configuration. This pivot pin 471 will rotate during the ratcheting function, then once the knife 420 rotates away and reaches the last tooth 425, the pivot pin 471 will slide into the linear slot 472 transitioning to the nonratcheting function. A hitch pin 473 of sort is inserted behind pivot pin 471 to prevent it from coming out during the return stroke.

Figure 23A:
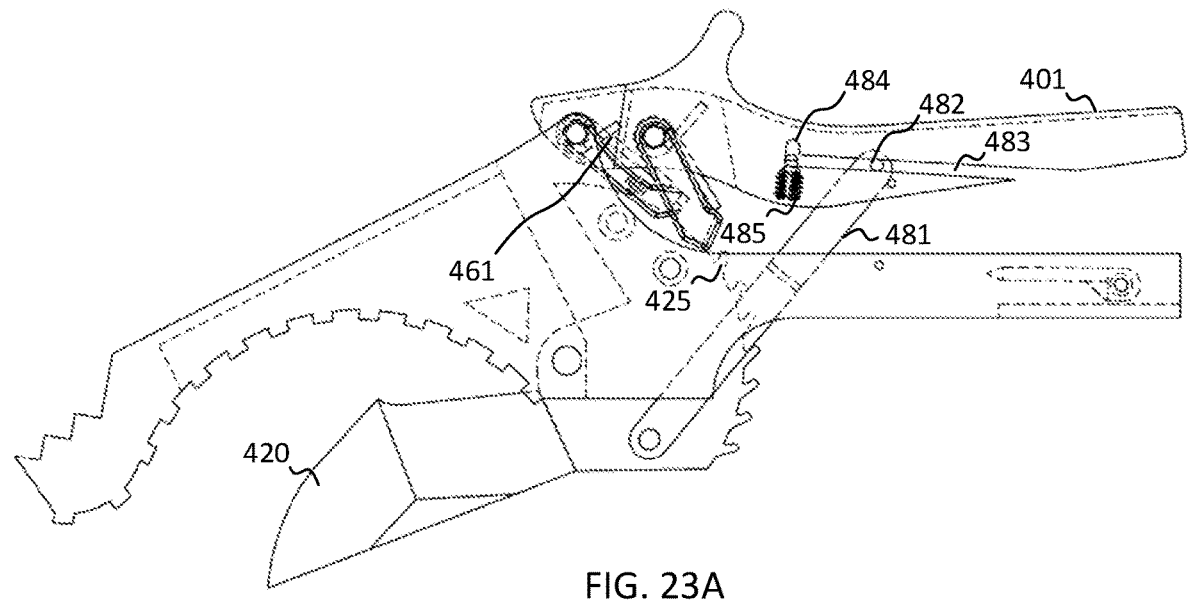
FIG. 23A shows a side view of a cutter with a slide bar mechanism, according to an exemplary embodiment of the present subject disclosure.
Figure 23B:
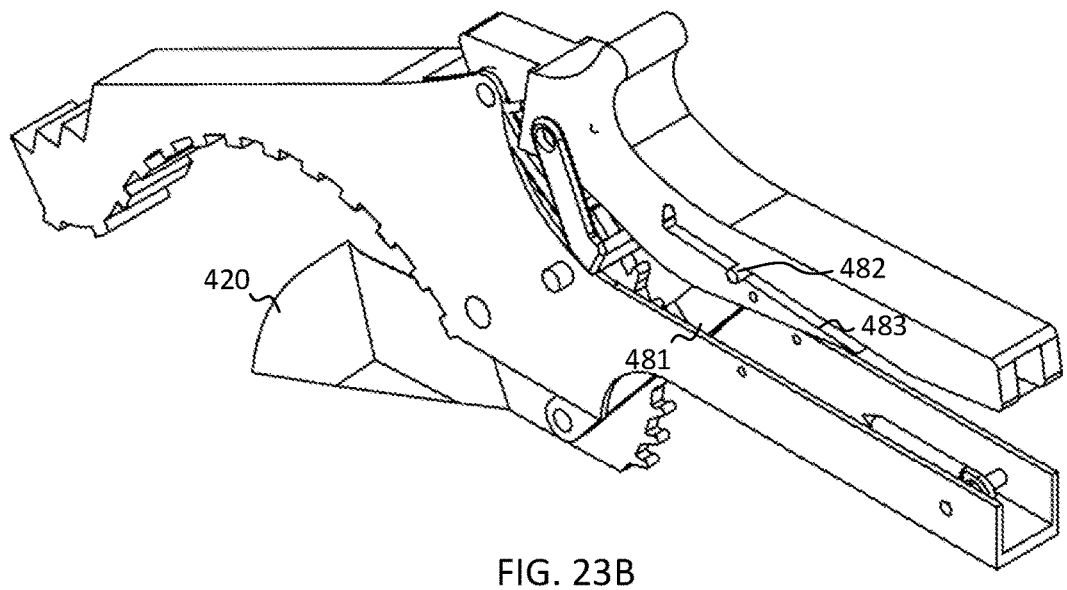
FIG. 23B shows a perspective view of a cutter with a slide bar mechanism, according to an exemplary embodiment of the present subject disclosure.

FIGS. 23A-23B show side and perspective views, respectively, of an embodiment of the cutter 400 with a slide bar mechanism. This is an alternate way to transition from ratcheting to nonratcheting. The slide bar 481 will keep advancing up the handle 401 as the knife 420 keeps moving away during the ratcheting function. When the knife 420 moves to the correct position and the position holder 461 is on the last tooth 425, the pin 482 of the slide bar 481 sliding along channel 483 will overcome the spring plunger 485 and move up into the slot 484. The spring plunger 485 will keep the pin 482 in that position in the slot 484 during the nonratcheting function. To return back to ratcheting function, the user will push on the pin 482 against the spring plunger 485 and slide the pin 482 back into the channel 483.

Figure 24A:
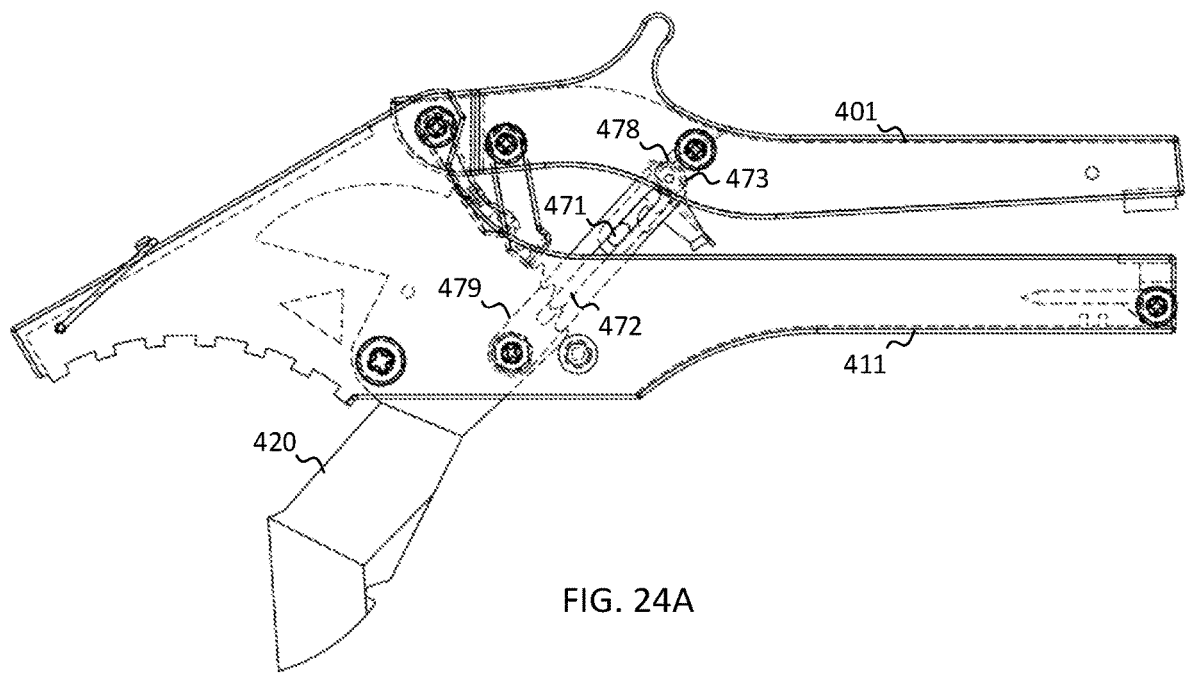
FIG. 24A shows a side view of a cutter with a slide pin mechanism in a ratchet configuration, according to an exemplary embodiment of the present subject disclosure.
Figure 24B:
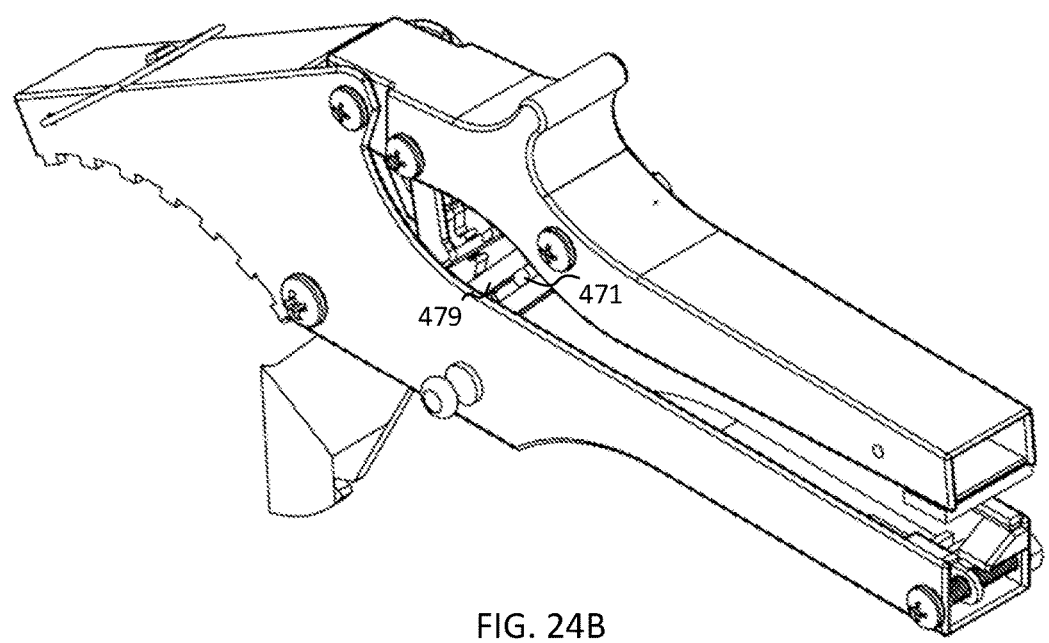
FIG. 24B shows a perspective view of a cutter with a slide pin mechanism in a ratchet configuration, according to an exemplary embodiment of the present subject disclosure.

FIGS. 24A-24B show side and perspective views, respectively, of an embodiment of the cutter 400 with a sliding pin 471 mechanism. In the configuration shown in FIGS. 24A-24B, the position of the pin 471 is not in the latch during the ratcheting function.

Figure 24C:
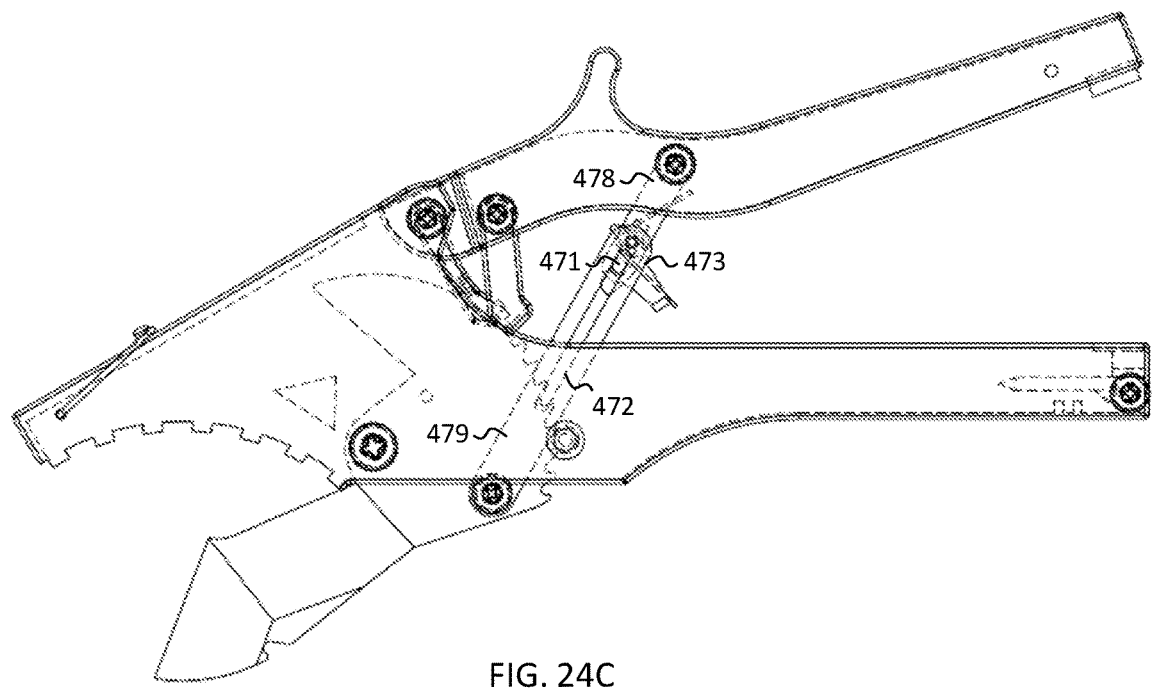
FIG. 24C shows a side view of a cutter with a slide pin mechanism in a nonratchet configuration, according to an exemplary embodiment of the present subject disclosure.
Figure 24D:
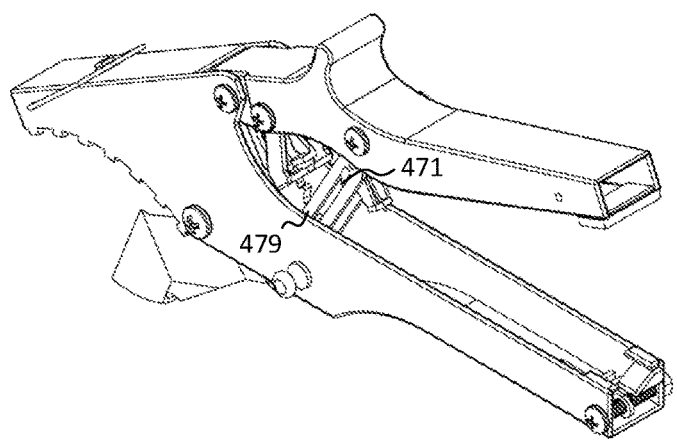
FIG. 24D shows a perspective view of a cutter with a slide pin mechanism in a nonratchet configuration, according to an exemplary embodiment of the present subject disclosure.
Figure 24E:
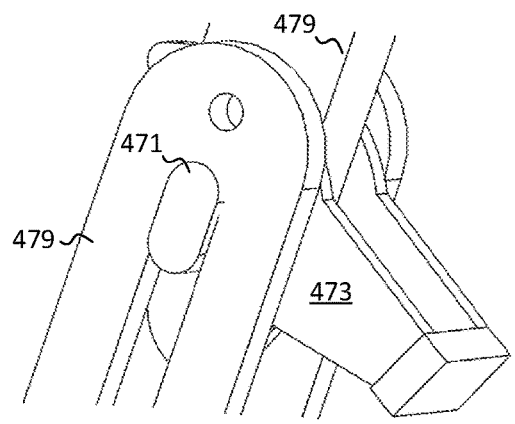
FIG. 24E shows a close up perspective view of a slide pin mechanism in a nonratchet configuration, according to an exemplary embodiment of the present subject disclosure.

FIGS. 24C-24D show side and perspective views, respectively, of an embodiment of the cutter 400 with a sliding pin 471 mechanism. This is an alternate way to transition from ratcheting to nonratcheting. A pin 471 in the top arm 478 will travel up and down slots 472 in the bottom arms 479 during the ratcheting function. When the knife 420 moves to the correct location on the last tooth of the knife, the pin 471 will push against a latch 473 (similar to a chicken gate latch). When the pin 471 pushes against the latch 473, the latch will push open, then as the pin 471 moves inside the latch 473, the pin 471 will push against the backside of the latch 473, causing it to close over the pin 471. A spring will assist in keeping that latch 473 closed during the nonratcheting function. These drawings, as well as the close-up perspective view shown in FIG. 24E, show the position of the pin 471 locked in the latch 473 during the nonratcheting function.

Figure 25A:
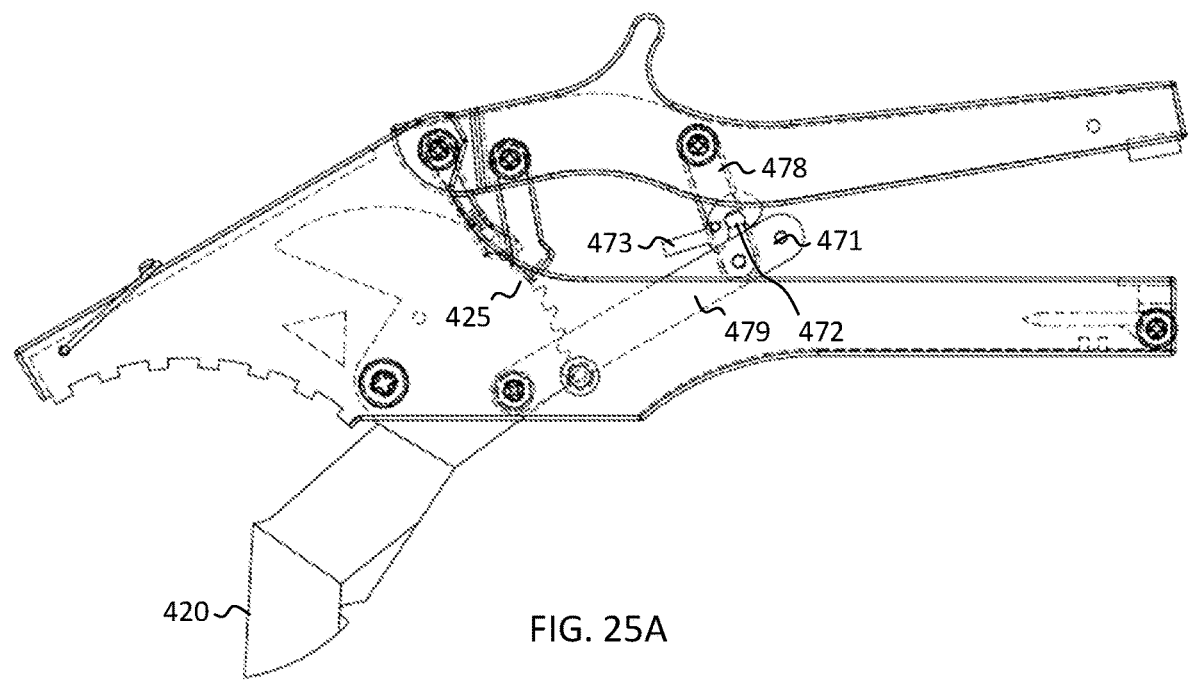
FIG. 25A shows a side view of a cutter with a pivot latch in back mechanism in a ratchet configuration, according to an exemplary embodiment of the present subject disclosure.
Figure 25B:
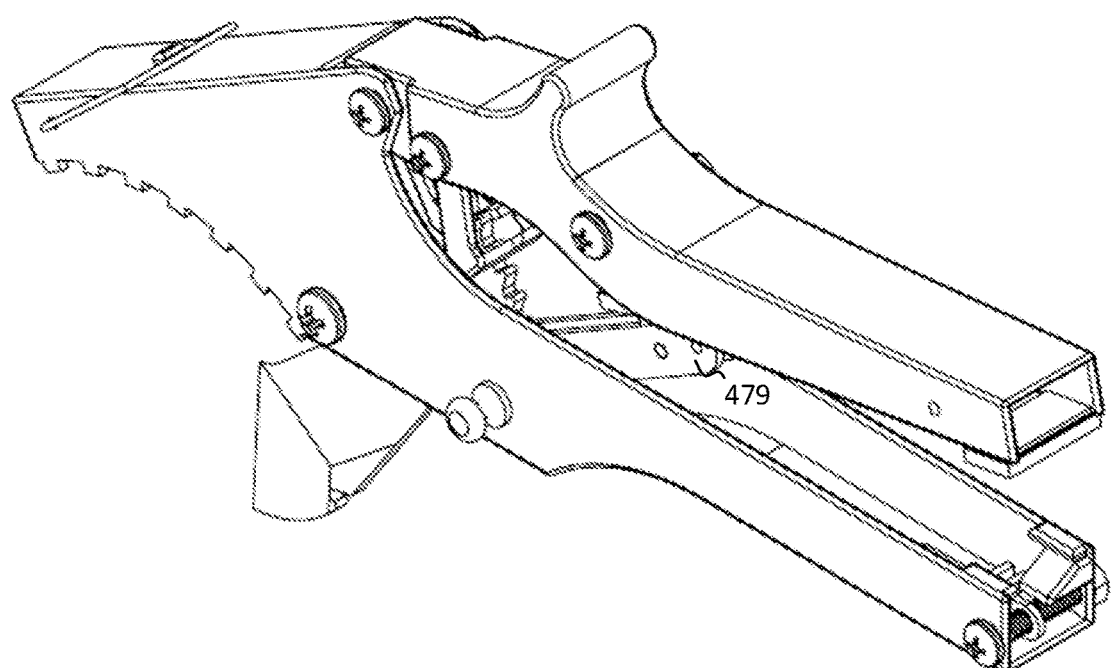
FIG. 25B shows a perspective view of a cutter with a pivot latch in back mechanism in a ratchet configuration, according to an exemplary embodiment of the present subject disclosure.

FIGS. 25A-25B show side and perspective views, respectively, of an embodiment of the cutter 400 with a pivot latch in back. In the configuration shown in FIGS. 25A-25B, the position of the pin 471 is not in the latch during the ratcheting function.

Figure 25C:
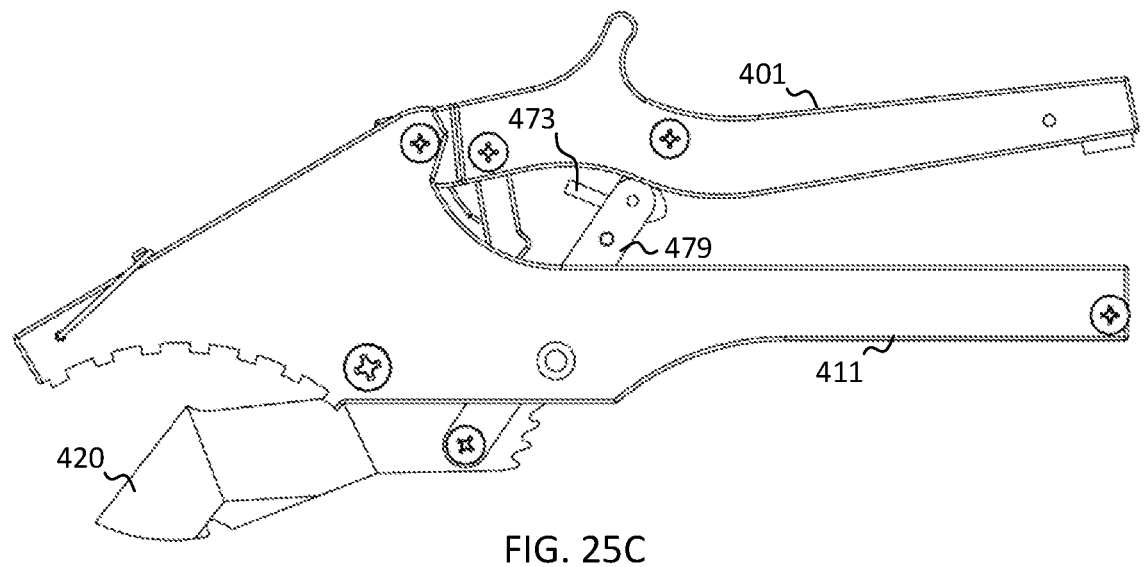
FIG. 25C shows a side view of a cutter with a pivot latch in back mechanism in a nonratchet configuration, according to an exemplary embodiment of the present subject disclosure.
Figure 25D:
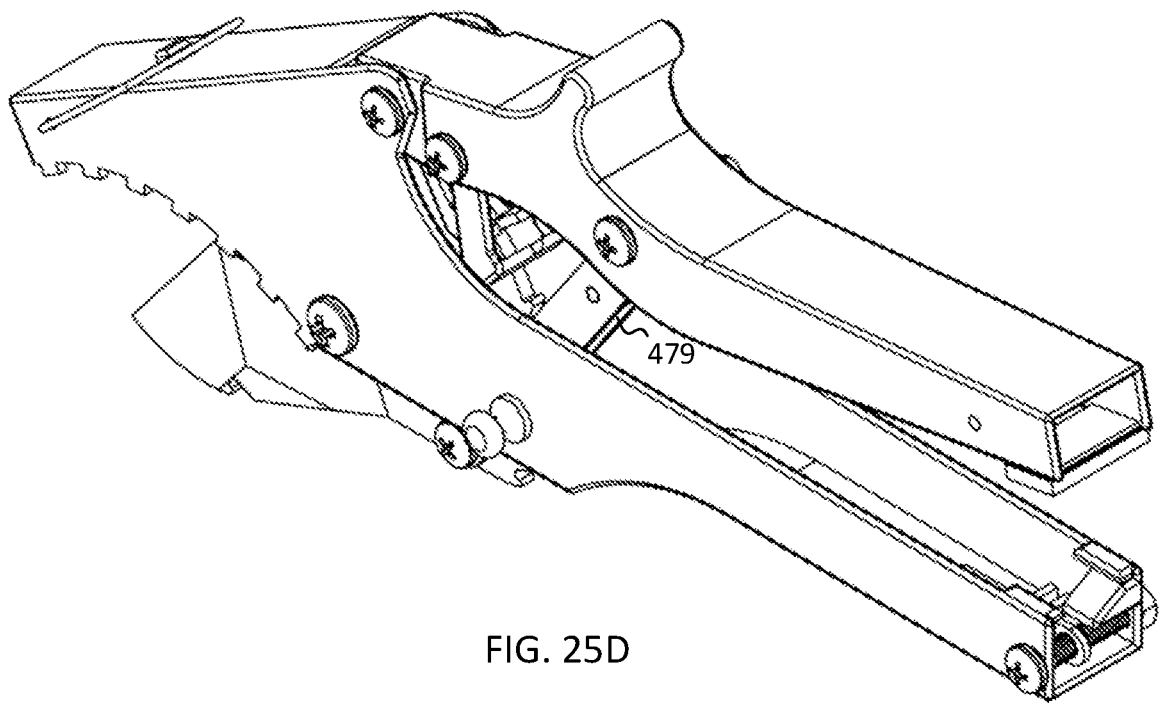
FIG. 25D shows a perspective view of a cutter with a pivot latch in back mechanism in a nonratchet configuration, according to an exemplary embodiment of the present subject disclosure.

FIGS. 25C-25D show side and perspective views, respectively, of an embodiment of the cutter 400 with a sliding pin 471 mechanism. This is an alternate way to transition from ratcheting to nonratcheting. The bottom arm bars 479 are longer and extend out beyond the top bar 479. When the knife 420 reaches the last tooth 425, the pin 471 will lock into a slot 472 in the top bar and a latch 473 will keep it closed.

Figure 26A:
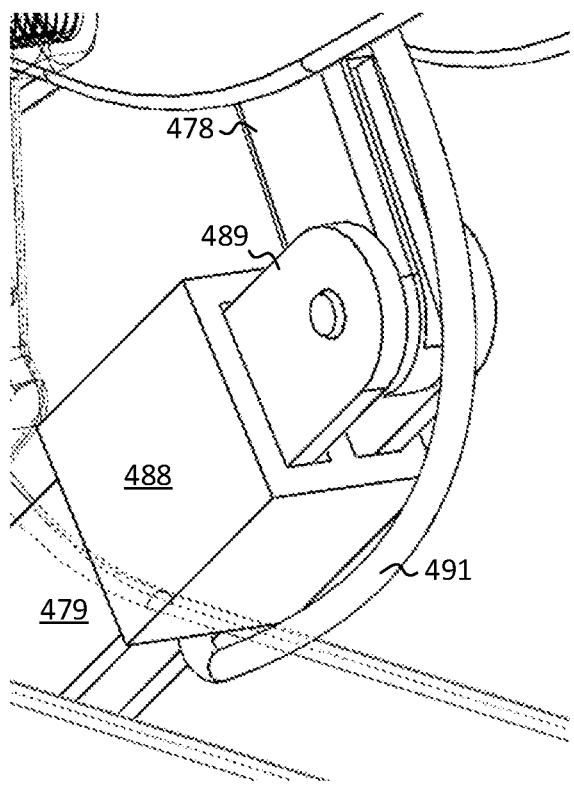
FIG. 26A shows a perspective view of a bar slot mechanism in a ratchet configuration, according to an exemplary embodiment of the present subject disclosure.
Figure 26B:
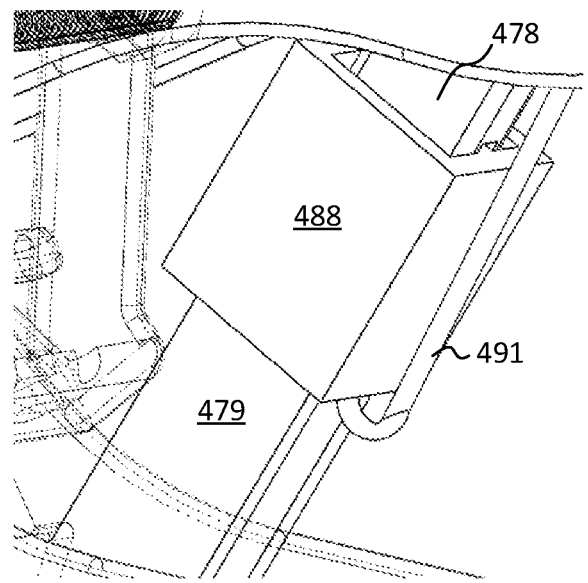
FIG. 26B shows a perspective view of a bar slot mechanism in a nonratchet configuration, according to an exemplary embodiment of the present subject disclosure.

FIGS. 26A-26B show perspective views of ratcheting and nonratcheting configurations, respectively, of an embodiment of the cutter 400 with a bar slot. This is an alternate way to transition from ratcheting to nonratcheting. There is a slot 488 in the top bar 478 and a tab 489 with a matching extension on the bottom bars 479 that has the ability to slide along the bottom bars. During the ratcheting portion, the tab 489 is unable to go into the slot 488 of the top bar 478, but when the position holder reaches the last tooth the top, the top 478 and bottom 479 bars will linearly arrange. The matching extension 489 can now slide into the slot 488 of the top arm bar 478, thereby allowing the tool to switch to the nonratcheting function. A bungee cord 491 assists to make this transition automatic by pulling the slot 488 upwards.

Figure 27A:
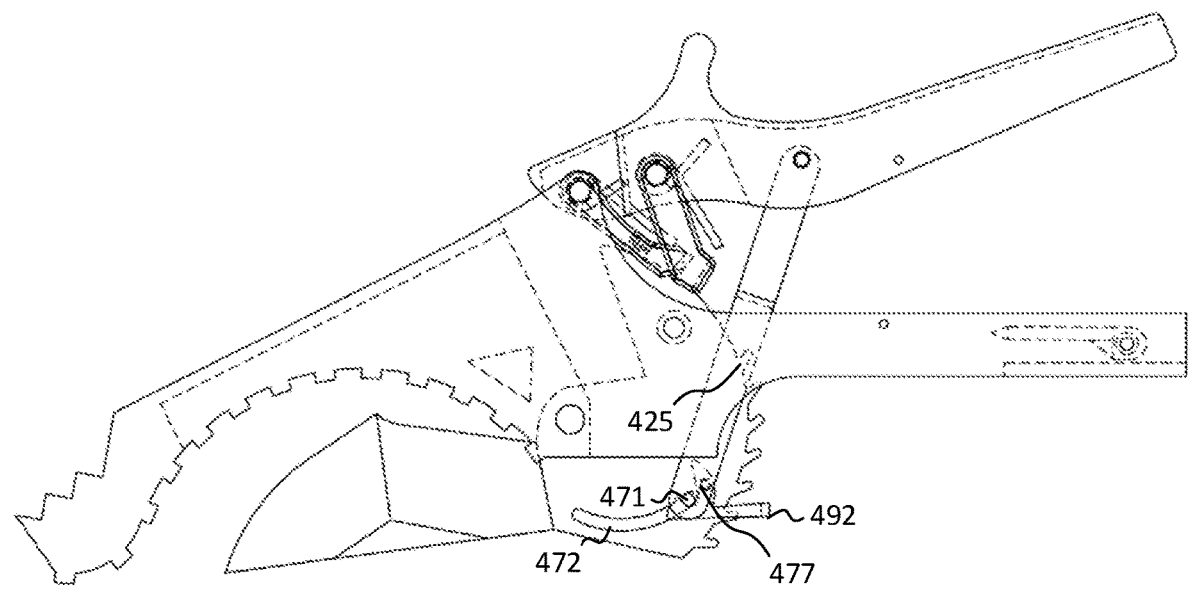
FIG. 27A shows a side view of a cutter with through hole in knife, according to an exemplary embodiment of the present subject disclosure.
Figure 27B:
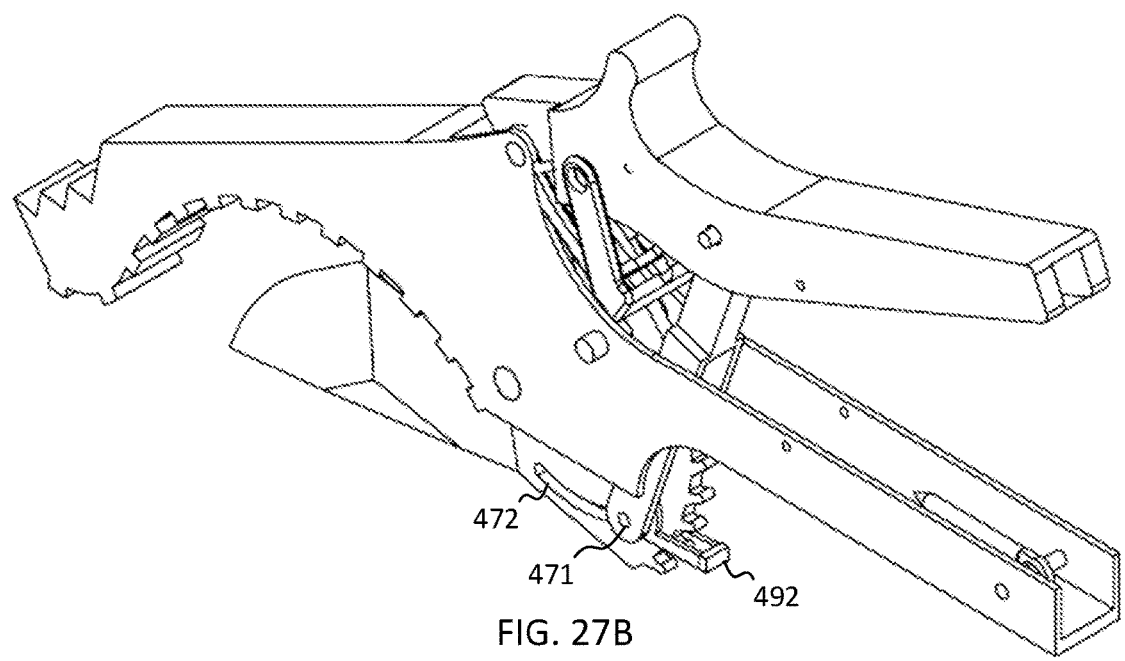
FIG. 27B shows a perspective view of a cutter with through hole in knife, according to an exemplary embodiment of the present subject disclosure.

FIGS. 27A-27B show side and perspective views, respectively, of an embodiment of the cutter 400 with a through hole in the knife 420. This is an alternate way to transition from ratcheting to nonratcheting.

The pin 471 travels through the slot 472 during the ratcheting function. Then once the knife 420 travels to the furthest position on the last tooth 425, the pin 471 presses against the latch 477 (similar again to a chicken gate latch). The latch 477 then pops open, then closes again once the pin 471 hits the backside of the latch 477. The tool will now function in the nonratcheting position. A tab 492 on the back of the latch 477 allows the user to open the latch 477 and the 471 pin can move back and forth through the slot 472 during the ratcheting function.

Figure 28A:
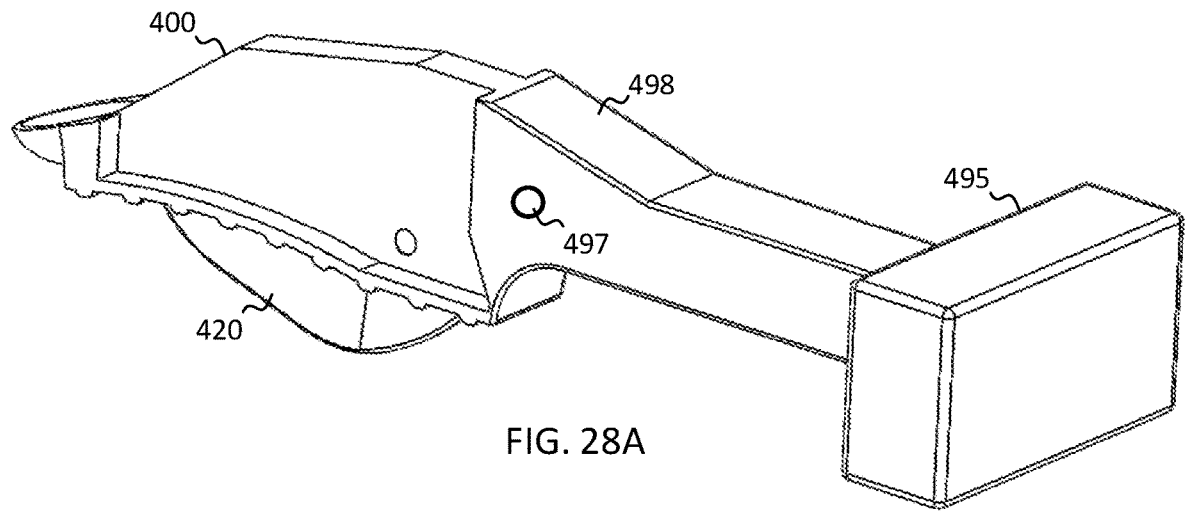
FIG. 28A shows a perspective view of a cutter with battery (DC) power, according to an exemplary embodiment of the present subject disclosure.
Figure 28B:
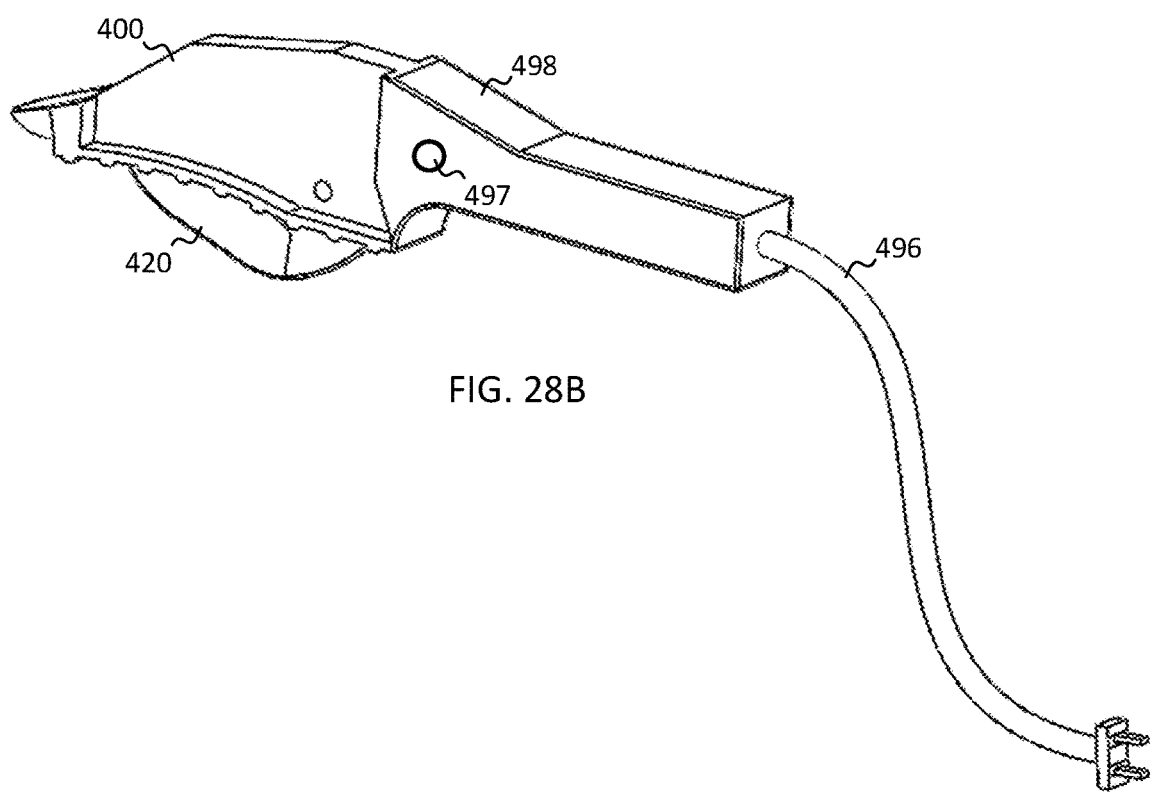
FIG. 28B shows a perspective view of a cutter with electrical (AC) power, according to an exemplary embodiment of the present subject disclosure.

FIGS. 28A and 28B show perspective views of two further embodiments which are operated by non-manual power. The exemplary cutter 400 shown in FIG. 28A is substantially the same as prior embodiments, with the addition of an optional battery power pack (DC power) 495 used to operate an internal motor 498 that turns the blade 420 inward to cut a target object. The exemplary cutter 400 shown in FIG. 28B is substantially the same as prior embodiments, with the addition of an optional electrical cord (AC power) 496 used to operate an internal motor 498 that turns the blade 420 inward to cut a target object. A button 497 or other activation mechanism is used to effectuate the motor 498 and the resulting motion of the cutting blade 420, both inward (to cut the target object) and outward (to remove the blade from the object). Further, the motor 498 may be programmed to electronically enforce a ratchet and/or nonratchet motion in the cutting blade 420 movement. Finally, a hybrid AC/DC combination cutter 400 is also possible that combines both DC power 495 and AC power 496, and is not shown for sake of brevity.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A cutting apparatus, comprising:
   a top handle including a contact surface;
   a bottom handle connected to said top handle;
   a position holder comprising a first end connected to said top handle, and a second end contacting a proximal end of a cutting blade;
   said cutting blade pivotally attached to said top handle or said bottom handle and said proximal end includes a toothed portion and a non-toothed portion configured to contact said position holder;
   a mechanism top bar comprising a first portion connected to said top handle, and a second portion connected to a slot of a bottom bar;
   said bottom bar connected to said cutting blade, including said slot comprising an arc shaped region and a linear region, said slot configured to receive a portion of said mechanism top bar;
   in a ratcheting configuration, said position holder engages said toothed portion, said mechanism top bar occupies said arc shaped region of said slot and when said top handle and said bottom handle are squeezed together said mechanism top bar moves along said arc shaped region and said position holder moves along said toothed portion incrementally; and
   in a non-ratcheting configuration, said mechanism top bar occupies said linear region of said slot and said position holder rides along said non-toothed portion.

2. The cutting apparatus in claim 1, further comprising toothed projections on said contact surface to promote stable placement of the shell between said contact surface and said cutting blade.

3. The cutting apparatus in claim 1, further comprising:
   said tooth portion includes a last tooth; and
   in said ratcheting configuration said position holder occupies said last tooth and moving said top handle and said bottom handle moves said mechanism top bar into said linear region and said position holder transitions to said non-toothed portion of said cutting blade transitioning from said ratcheting configuration to said non-ratcheting configuration.

4. The cutting apparatus in claim 3, wherein said bottom bar may be manually manipulated such that the mechanism top bar disengages said linear region to said arc shaped region transitioning said non-ratcheting configuration to a ratcheting configuration.

5. The cutting apparatus of claim 1, wherein said non-toothed portion is smooth, allowing said position holder to slide in said non-ratcheting configuration.

6. The cutting apparatus of claim 1, wherein said top handle includes a load that advances said cutting blade incrementally along said tooth portion in said ratcheting configuration.

7. The cutting apparatus of claim 1, further comprising a finger guard on said top handle or said bottom handle.

8. The cutting apparatus of claim 1, further comprising a loop mechanism on said contact surface that can lock said cutting blade in a closed configuration.

9. The cutting apparatus of claim 1, wherein said position holder holds said cutting blade on a tooth of said toothed portion in said ratcheting configuration and slides said cutting blade in said non-ratcheting configuration.

10. The cutting apparatus of claim 1, wherein in said ratcheting configuration a load can be placed on said top handle or said bottom handle advancing a toothed portion of said cutting blade in a ratcheting motion.

11. The cutting apparatus of claim 1, further comprising said toothed portion includes a last tooth, and upon engagement of said position holder with said last tooth, further movement of said top handle and said bottom handle causes said mechanism top bar to engage with said bottom bar resulting in said mechanism top bar and said bottom bar locking together, such that further cutting is achieved without the need for the toothed portion, transitioning said cutting apparatus to a scissor-like action to complete the cutting operation through said object.

12. The cutting apparatus of claim 1, further comprising a spring-loaded pin configured to engage said mechanism top bar into said linear portion during said non-ratcheting configuration, and in said ratcheting configuration said spring-loaded pin is disengaged.

13. The cutting apparatus of claim 1, further comprising a tab located on said position holder, wherein lifting said tabs raises both said position holder and a load over said toothed portion of said cutting blade, allowing said position holder and said load to disengage from said toothed portion, enabling said cutting blade to be reset.

14. The cutting apparatus of claim 13, further comprising a spring connected between said bottom handle and said cutting blade, wherein upon lifting said position holder and load via said position holder tabs, said spring is configured to push said cutting blade back to a fully open position.

* * * * *